(12) United States Patent
Yang et al.

(10) Patent No.: US 11,271,617 B2
(45) Date of Patent: Mar. 8, 2022

(54) NULL DATA PACKET-BASED IMPLICIT SOUNDING AND CALIBRATION IN A WIRELESS LOCAL AREA NETWORK

(71) Applicant: QUALCOMM Incorporated, San Diego, CA (US)

(72) Inventors: Lin Yang, San Diego, CA (US); Bin Tian, San Diego, CA (US); Sameer Vermani, San Diego, CA (US); Lochan Verma, San Diego, CA (US); Jialing Li Chen, San Diego, CA (US); Youhan Kim, Saratoga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 107 days.

(21) Appl. No.: 16/591,420

(22) Filed: Oct. 2, 2019

(65) Prior Publication Data

US 2020/0112350 A1    Apr. 9, 2020

Related U.S. Application Data

(60) Provisional application No. 62/756,443, filed on Nov. 6, 2018, provisional application No. 62/740,819, filed on Oct. 3, 2018.

(51) Int. Cl.
*H04B 7/0417* (2017.01)
*H04B 7/0456* (2017.01)
*H04W 84/12* (2009.01)

(52) U.S. Cl.
CPC ......... *H04B 7/0421* (2013.01); *H04B 7/0456* (2013.01); *H04W 84/12* (2013.01)

(58) Field of Classification Search
CPC .. H04B 7/0421; H04B 7/0456; H04B 7/0695; H04B 7/088; H04W 84/12
See application file for complete search history.

(56) References Cited

U.S. PATENT DOCUMENTS

| | | | | |
|---|---|---|---|---|
| 8,611,477 B1 * | 12/2013 | Nabar | ................ | H04L 25/0204 375/345 |
| 10,439,695 B1 * | 10/2019 | Zhang | ................. | H04B 7/0626 |
| 10,455,608 B2 * | 10/2019 | Shepard | ............... | H04B 7/0452 |
| 2007/0030829 A1 * | 2/2007 | Vimpari | ................ | H04W 52/58 370/335 |

(Continued)

*Primary Examiner* — Christine Ng
(74) *Attorney, Agent, or Firm* — Holland & Hart LLP

(57) ABSTRACT

This disclosure provides systems, devices, apparatus and methods, including computer programs encoded on storage media, for null data packet (NDP) based implicit sounding and calibration for a wireless local area network (WLAN). An AP may perform a calibration procedure with one or more stations (STAs) that involves NDP transmissions. The AP may calibrate an effective downlink channel response to an effective uplink channel to compensate for transmit and receive chain differences. The AP may initiate implicit sounding by transmitting a downlink message that includes an uplink NDP announcement frame to the one or more STAs, prompting uplink multi-user (MU) NDP transmission. The AP may estimate the uplink channel based on measuring the received NDPs and mirror the estimated uplink channel for reciprocal downlink channel estimation and precoding generation. The AP may perform MU multiple input multiple output (MIMO) downlink transmission that is precoded based on the channel estimation.

19 Claims, 36 Drawing Sheets

(56) References Cited

U.S. PATENT DOCUMENTS

| | | | |
|---|---|---|---|
| 2008/0080634 A1* | 4/2008 | Kotecha | H04B 7/0417 |
| | | | 375/267 |
| 2011/0019637 A1* | 1/2011 | Ojala | H04L 1/0026 |
| | | | 370/329 |
| 2011/0038283 A1* | 2/2011 | Yu | H04W 28/16 |
| | | | 370/277 |
| 2011/0158362 A1* | 6/2011 | Kim | H04L 1/0625 |
| | | | 375/347 |
| 2013/0010719 A1* | 1/2013 | Shapira | H04W 72/082 |
| | | | 370/329 |
| 2013/0188630 A1* | 7/2013 | Song | H04L 1/1671 |
| | | | 370/338 |
| 2015/0156794 A1* | 6/2015 | Kwon | H04L 25/0224 |
| | | | 370/329 |
| 2016/0080124 A1* | 3/2016 | Liang | H04W 24/10 |
| | | | 370/329 |
| 2016/0330732 A1* | 11/2016 | Moon | H04B 7/0617 |
| 2016/0338047 A1* | 11/2016 | Seok | H04W 8/26 |
| 2017/0006142 A1* | 1/2017 | Kwon | H04L 12/4633 |
| 2017/0279587 A1* | 9/2017 | Ghosh | H04L 5/0094 |
| 2019/0191323 A1* | 6/2019 | Venkatesan | H04W 74/006 |
| 2019/0281484 A1* | 9/2019 | Jiang | H04L 1/0026 |
| 2021/0084686 A1* | 3/2021 | Zhang | H04W 74/0816 |

\* cited by examiner

| Subfield in trigger frame | # of bits | Definition | Needed in NDPA-MU? |
|---|---|---|---|
| Trigger Type | 4 | Indicates the Trigger type | No |
| UL Length | 12 | The Length subfield of the Common info field indicates the value of the L-SIG Length field of the HE trigger-based PPDU that is the response to the Trigger frame | No except for Cat. opt 2. |
| More TF | 1 | If the More TF subfield is 1, then a subsequent Trigger frame follows the current Trigger frame. Otherwise the More TF subfield is 0. A STA which receives a Trigger frame with More TF indication = 0 could enter Power save for the rest of the TXOP. | No ? |
| CS Required | 1 | The CS Required subfield is set to 1 to indicate that the STAs identified in the User Info fields are required to use ED to sense the medium and to consider the medium state and the NAV in determining whether or not to respond. | Yes, ? 0 for short packet, 1 if >128us |
| UL BW | 2 | The Trigger frame content indicates the BW of the UL transmission. | Yes, but may be implicitly indicated by or same as UL NDPA |
| GI and HE type | 2 | This field also goes into the SIG-A of the HE-Trig PPDU. 0 (1x HE + 1.6 us CP), 1 (2x HE + 0.8 us CP), 2 (2x HE + 1.6 us CP), 3 (4x HE + 3.2 us GI). | Yes, but 1 bit only for 2x+0.8/1.6us(4x+3.2us CP) |
| MU-MIMO LTF Mode | 1 | Indicates the type of pilots in the LTF of the HE-Trig PPDU | No, only 1 mode allowed. Yes for IDF |
| Number of HE-LTF /mcdamble Periodicity | 3 | Indicates the number of HE-LTFs of the HE-Trig PPDU | Yes, may need 4 bits for 16x support |

| Subfield in trigger frame | # of bits | Definition | Needed in HDPA-MU? |
|---|---|---|---|
| HE SIRC | 1 | Indicates if the STA should transmit with STBC enabled or not. Set to 1 if space-time block coding is used and set to 0 otherwise. | No |
| LDPC Extra Symbol seg | 1 | Indicates the presence of extra OFDMA symbol for LDPC. Set to 1 if LDPC Extra Symbols is required and set to 0 otherwise. | No |
| AP Tx Power | 6 | The AP Tx Power subfield of the Common info field indicates the combined average power per 20 MHz bandwidth of all transmit antennas used to transmit the trigger frame at the HE AP. The range is −20dBm to 40dBm. | Yes for power control |
| Packet Extension | 3 | Indicates the a factor and the PE disambiguate | No |
| Spatial Reuse | 16 | These bits go into the SIG-A of the HE-Trig PPDU. 4 bits for each 20 MHz. | No? can be a fixed value in HE SIGA for UL MU sounding |
| Doppler | 1 | Indicates high Doppler mode of transmission. Note this mode is not defined in 11.0 | No |
| HE-SIGA2 Reserved | 9 | These bits go into the reserved field of the HE SIG-A of the HE-Trig PPDU. | Yes |

*Figure 5D*

| New subfield in NDPA-MU | # of bits | Definition | comments |
|---|---|---|---|
| EVM control | 4 | EVM control info can be signaled by the following, which might be BW dependent<br>Opt1: Designating MCS that maps to EVM requirement, but NDP modulation does not change<br>Opt2: Specific required EVM value<br>Opt3: Power backoff<br>Opt4: Target RSSI | Except Opt 2, EVM control info may need to be in the per user info field<br>Note: coarse EVM value is fine |
| Power mismatch control | 4 | Power mismatch control info can be signaled by the following, which might be BW dependent.<br>Opt1: LTF symbol repetition factor $K$, such that $N_{LTF,UL,NDP} = K \cdot N_{ss,total}$ where $N_{ss,total}$ is the total number of streams in UL SU/MU NDP with $\sum_i N_{ss}^i \le N_{ss,total}$. $N_{ss}^i$ is the number of stream transmitted by $i$ th user/STA<br>Opt2: Total number of streams for UL NDP or UL MU NDP can be set to be larger than actual total number of transmit streams, i.e., $N_{LTF,UL,NDP} = N_{ss,total} \gg \sum_i N_{ss}^i$<br>Opt3: Additional number of LTF symbols in UL SU/MU NDP, so that $N_{LTF,UL,NDP} = N_{LTF}^{add} + N_{ss,total}$ | If Opt 2, this field can be combined with # of LTF field |
| Calibration indication | 1 | Set to 1 if the AP scheduled sounding sequence is for calibration, indicating 1Tx/1Rx is required for transmitting/receiving | |

*Figure 5E*

| # of bits | Definition | Needed in NDPA-MU? |
|---|---|---|
| AID11 | 11 | The AID11 subfield of the User info field carries the least significant 11 bits of the AID of the STA for which the User info field is intended. | Yes; may need to work with disambiguation field for STA info field extension |
| Partial BW Info | 14 | The Partial BW Info subfield contains the RU Start Index and the RU End Index | Yes for STA dependent BW capability, 16 bits? |
| Feedback Type + Ng | 2 | The type of feedback (SU/MU), the tone grouping and quantization is determined by the Fields "Feedback Type and Ng" and "Codebook Size" | No except for CBf opt3 |
| Disambiguation | 1 | The Disambiguation subfield is set to 1 to prevent a VHT STA from wrongly determining it's AID in the HE STA info. | Yes; Similar to 11ac extended to 11ax, now 11ax->HE |
| Codebook size | 1 | The type of feedback (SU/MU), the tone grouping and quantization is determined by the Fields "Feedback Type and Ng" and "Codebook Size" | No except for CBf opt3 |
| Nc | 3 | Nc field indicates the number of columns Nc, in the Compressed Beamforming Feedback Matrix subfield minus 1 | No except for CBf opt3 |

| Subfield in trigger frame | # of bits | Definition | Needed in NDPA-MU? |
|---|---|---|---|
| Trigger Type | 4 | Indicates the Trigger type | No |
| UL Length | 12 | The Length subfield of the Common Info field indicates the value of the L-SIG Length field of the HE trigger-based PPDU that is the response to the Trigger frame | No except for Cali opt 2. |
| More TF | 1 | If the More TF subfield is 1, then a subsequent Trigger frame follows the current Trigger frame. Otherwise the More TF subfield is 0. A STA which receives a Trigger frame with More TF indication = 0 could enter Power save for the rest of the TXOP. | No ? |
| CS Required | 1 | The CS Required subfield is set to 1 to indicate that the STAs identified in the User Info fields are required to use ED to sense the medium and to consider the medium state and the NAV in determining whether or not to respond. | Yes, ? 0 for short packets, 1 if > 128us |
| UL BW | 2 | The Trigger frame content indicates the BW of the UL transmission. The bandwidth that goes into the SIG-A of the HE-Trig-PPDU, 0 (20MHz), 1(40MHz), 2(80MHz), 3(80+80/ 160 MHz). | Yes, but may be implicitly indicated by or same as UL NDPA |
| GI and LTF type | 2 | This field also goes into the SIG-A of the HE-Trig PPDU, 0 (1x LTF + 1.6 μs CP), 1(2x LTF + 0.8 μs CP), 2(2x LTF + 1.6 μs CP), 3 (4x LTF + 3.2 μs GI). | Yes, but 1 bit only for 2x+0.8/1.6μs (4x+3.2 is O) |
| MU-MIMO LTF Mode | 1 | Indicates the type of pilots in the LTF of the HE-Trig-PPDU (0 single stream pilots, 1 – Mask LTF) | No, only 1 mode allowed, Yes for HDF |
| Number of HE-LTF/midamble periodicity | 3 | Indicates the number of HE-LTFs of the HE-Trig-PPDU | Yes, may need 4 bits for 16ss support |

*Figure 6C*

| Subfield in trigger frame | # of bits | Definition | Needed in NDPA-MU? |
|---|---|---|---|
| LDPC STBC | 1 | Indicates if the STA should transmit with STBC enabled or not. Set to 1 if space time block coding is used and set to 0 otherwise. | No |
| LDPC Extra Symbol seg | 1 | Indicates the presence of extra OFDM symbol for LDPC. Set to 1 if LDPC Extra Symbol is required and set to 0 otherwise. | No |
| AP Tx Power | 6 | The AP Tx Power subfield of the Common Info field indicates the combined average power per 20 MHz bandwidth of all transmit antennas used to transmit the trigger frame at the HE AP. The range is -20dBm to 40dBm. | Yes for power control |
| Packet Extension | 3 | Indicates the a factor and the PE disambiguate | No |
| Spatial Reuse | 16 | These bits go into the SIG-A of the HE-Trig PPDU, 4 bits for each 20 MHz | No? can be a fixed value in HE-SIG-A for UL MU sounding |
| Doppler | 1 | Indicates high Doppler mode of transmission. Note this mode is not defined in D1.0 | No |
| HE-SIG-A2-Reserved | 9 | These bits go into the reserved field of the HE-SIG-A of the HE-Trig PPDU. | Yes |

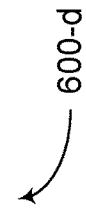

*Figure 6D*

| New subfield in NDPA-MU | # of bits | Definition | comments |
|---|---|---|---|
| EVM control | 4 | EVM control info can be signaled by the following, which might be BW dependent<br>Opt1: Designating MCS that maps to EVM requirement, but NDP modulation does not change<br>Opt2: Specific required EVM value<br>Opt3: Power backoff<br>Opt4: Target RSSI | Except Opt 2, EVM control info may need to be in the per user info filed<br>Note: coarse EVM value is fine |
| Power mismatch control | 4 | Power mismatch control info can be signaled by the following, which might be BW dependent<br>Opt1: LTF symbol repetition factor K, such that $N_{LTF,PE,NDP} = K \times N_{ss,total}$ where $N_{ss,total}$ is the total number of streams in UL SU/MU NDP with $\sum_i N^i_{ss} \le N_{ss,total}$, $N^i_{ss}$ is the number of streams transmitted by i-th user/STA<br>Opt2: Total number of streams for UL NDP or UL MU NDP can be set to be larger than actual total number of transmit streams, i.e., $N_{LTF,PE,NDP} = N_{ss,total} \gg \sum_i N^i_{ss}$<br>Opt3: Additional number of LTF symbols in UL SU/MU NDP, so that $N_{LTF,UL,NDP} = N^{old}_{LTF} + N^{add}_{ss,total}$ | If Opt 2, this field can be combined with # of LTF field |
| Calibration indication | 1 | Set to 1 if the AP scheduled sounding sequence is for calibration, indicating TX/RX is required for transmitting/receiving | |

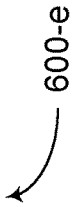

| | # of bits | Definition | Needed in NDPA-MU? |
|---|---|---|---|
| AID11 | 11 | The AID11 subfield of the User Info field carries the least significant 11 bits of the AID of the STA for which the User Info field is intended. | Yes, may need to work with disambiguation field for STA info field extension |
| Partial BW Info | 14 | The Partial BW Info subfield contains the RU Start Index and the RU End Index | Yes for STA dependent BW capability, 16 BWs? |
| Feedback Type + Ng | 2 | The type of feedback (SU/MU), the tone grouping and quantization is determined by the Fields "Feedback Type and Ng" and "Codebook Size" | No except for CaB op3 |
| Disambiguation | 1 | The Disambiguation subfield is set to 1 to prevent a VHT STA from wrongly determining it's AID in the HE STA Info. | Yes, Similar to 11ac extended to 11ax, new 11ax->EHT |
| Codebook size | 1 | The type of feedback (SU/MU), the tone grouping and quantization is determined by the Fields "Feedback Type and Ng" and "Codebook Size" | No except for CaB op3 |
| Nc | 3 | Nc field indicates the number of columns Nc, in the Compressed Beamforming Feedback Matrix subfield minus 1 | No except for CaB op3 |

| Subfield in trigger frame | # of bits | Definition | Needed in NDPA-M17 |
|---|---|---|---|
| Trigger Type | 4 | Indicates the Trigger type | No |
| UL Length | 12 | The Length subfield of the Common info field indicates the value of the L-SIG Length field of the HE trigger-based PPDU that is the response to the Trigger frame | No except for Cali opt.3 |
| More TF | 1 | If the More TF subfield is 1, then a subsequent Trigger frame follows the current Trigger frame. Otherwise the More TF subfield is 0. A STA which receives a Trigger frame with More TF indication = 0 could enter Power save for the rest of the TXOP. | No ? |
| CS Required | 1 | The CS Required subfield is set to 1 to indicate that the STAs identified in the User info fields are required to use ED to sense the medium and to consider the medium state and the NAV in determining whether or not to respond. | Yes ? 0 for short packet, 1 if > 128us |
| UL BW | 2 | The Trigger frame content indicates the BW of the UL transmission. The bandwidth that goes into the SIG-A of the HE-Trig PPDU, 0 (20MHz), 1 (40MHz), 2 (80MHz), 3 (80+80/160 MHz). | Yes, but may be implicitly indicated by or same as UL NDPA |
| GI and HE type | 2 | This field also goes into the SIG-A of the HE-Trig PPDU. 0 (1xLTF + 1.6 μs GI), 1 (2xLTF + 0.8 μs GI), 2 (2xLTF + 1.6 μs GI), 3 (4xLTF + 3.2 μs GI). | Yes, but 1 bit only for 2x+0.8/1.6us (4x+3.2 is 0) |
| MU-MIMO LTF Mode | 1 | Indicates the type of pilots in the LTF of the HE-Trig PPDU (0 single stream pilots, 1 = Mask LTF) | No, only 1 mode allowed, yes for IDF |
| Number of HE-LTF/midamble Periodicity | 3 | Indicates the number of HE-LTFs of the HE-Trig PPDU | Yes, may need 4 bits for 16xx support |

| Subfield in trigger frame | # of bits | Definition | Needed in NDPA-MU? |
|---|---|---|---|
| UL STBC | 1 | Indicates if the STA should transmit with STBC enabled or not. Set to 1 if space-time block coding is used and set to 0 otherwise. | No |
| LDPC Extra Symbol seg | 1 | Indicates the presence of extra OFDM symbol for LDPC. Set to 1 if LDPC Extra Symbol is required and set to 0 otherwise. | No |
| AP Tx Power | 6 | The AP Tx Power subfield of the Common Info field indicates the combined average power per 20 MHz bandwidth of all transmit antennas used to transmit the trigger frame at the HE AP. The range is -20dBm to 40dBm. | Yes for power control |
| Packet Extension | 3 | Indicates the a factor and the PE disambiguate. | No |
| Spatial Reuse | 16 | These bits go into the SIG-A of the HE-Trig PPDU, 4 bits for each 20 MHz. | No? can be a fixed value in HE-SIG-A for UL MU sounding |
| Doppler | 1 | Indicates high Doppler mode of transmission. Note this mode is not defined in D1.0 | No |
| HE-SIG-A3-Reserved | 9 | These bits go into the reserved field of the HE-SIG-A of the HE-Trig PPDU. | Yes |

| New subfield in MDPA-MU | # of bits | Definition | comments |
|---|---|---|---|
| EVM control | 4 | EVM control info can be signaled by the following, which might be BW dependent<br>Opt1: Designating MCS that maps to EVM requirement, but NDP modulation does not change<br>Opt2: Specific required EVM value<br>Opt3: Power backoff<br>Opt4: Target RSSI | Except Opt 2, EVM control info may need to be in the per user info field<br>Note: coarse EVM value is fine |
| Power mismatch control | 4 | Power mismatch control info can be signaled by the following, which might be BW dependent<br>Opt1: LTF symbol repetition factor $k$, such that $N_{LTF\_vs\_NDP} = k \cdot N_{ss\_total}$, where $N_{ss\_total}$ is the total number of streams in UL SU/MU NDP with $\sum_i N_{ss}^i \le N_{ss\_total}$, $N_{ss}^i$ is the number of stream transmitted by $i$-th user/STA<br>Opt2: Total number of streams for UL NDP or UL MU NDP can be set to be larger than actual total number of transmit streams, i.e., $N_{LTF\_vs\_NDP} = N_{ss\_total} \gg \sum_i N_{ss}^i$<br>Opt3: Additional number of LTF symbols in UL SU/MU NDP, so that $N_{LTF\_vs\_NDP} = N_{LTF}^{orig} + N_{ss\_total}$ | If Opt 2, this field can be combined with $n$ of LTF field |
| Calibration indication | 1 | Set to 1 if the AP scheduled sounding sequence is for calibration, indicating TX/RX is required for transmitting/receiving | |

*Figure 7E*

| # of bits | Definition | Needed in NDPA-MU? |
|---|---|---|
| AID12 | 12 | The AID12 subfield of the User Info field carries the least significant 12 bits of the AID of the STA for which the User Info field is intended. An AID12 subfield that is 0 indicates that the User Info field identifies an RU for random access | Yes |
| RU Allocation | 8 | RU Allocation subfield of the Per User Info field indicates the RU used by the HE trigger-based PPDU of the STA identified by User Identifier subfield. Note the RU allocation is different from SIG-B. | Yes, combine with partial BW info field |
| Coding Type | 1 | Set to 0 for BCC and set to 1 for LDPC | No |
| MCS | 4 | The MCS subfield of the Per User Info field indicates the MCS of the HE trigger-based PPDU response of the STA identified by User Identifier field | Maybe for EVM control |
| DCM | 1 | Set to 0 to indicate that DCM shall not be used, set to 1 to indicate DCM is used. | No |
| SS Allocation | 6 | The SS Allocation subfield of the Per User Info field indicates the spatial streams of the HE trigger-based PPDU response of the STA identified by User Identifier field. The field is defined as the start of spatial stream (3 bits) and the number of spatial stream (3 bits). | Yes for UL MU sounding of Cali opt 3; Reserved, otherwise |
| Target RSSI | 7 | Indicates the expected RSSI the AP is expecting the UL transmission from the STA. The resolution is 1dB and allowed range is -103dBm to -20dBm. A value of 127 indicates that the STA can transmit at it's highest power for that MCS. | Maybe for EVM control |

*Figure 7F*

| | | |
|---|---|---|
| CS Required | Common (1) | |
| UL BW | Common (2) | |
| GI and LTF type | Common (2) | need 1 bit only for 2x+0.8/1.6us (4x+3.2 is 0) |
| Number of HE-LTF/midamble Periodicity | Common (3) | may need 4 bits for 16ss support |
| AP Tx Power | Common (6) | |
| HE-SIGA2-Reserved | Common (10) | |
| UL Length | Common (12) | Only need for Cali Opt 3 |
| EVM control | | Common (4), except Opt 2, EVM control info may need to be in the per user info filed. Note: coarse EVM value is the Common (4). If Opt 2, this field can be combined with # of LTF field Common (1) |
| Power mismatch control | | |
| Calibration indication | | |
| AID12 | per STA (AID11+Disambiguation 1) | |
| RU Allocation | Per user (8) | Yes combine with partial BW info field |
| MCS | Per user (4) | May be for EVM control |
| SS Allocation | Per user (6) | |
| Target RSSI | Per user (7) | May be for EVM control |
| Partial BW Info | | for STA dependent BW capability, 16 bits? |
| Feedback Type + Ng | Per STA (14) | Only need for Cali Opt 3 |
| Codebook size | Per STA (2) | Only need for Cali Opt 3 |
| Nc | Per STA (1) | Only need for Cali Opt 3 |
| | Per STA (3) | |

NULL DATA PACKET-BASED IMPLICIT SOUNDING AND CALIBRATION IN A WIRELESS LOCAL AREA NETWORK

CROSS REFERENCE

The present application for patent claims the benefit of U.S. Provisional Patent Application No. 62/740,819 by YANG, et al., entitled "NULL DTA PACKET-BASED IMPLICIT SOUNDING AND CALIBRATION IN A WIRELESS LOCAL AREA NETWORK," filed Oct. 3, 2018, and to U.S. Provisional Patent Application No. 62/756,443 by YANG, et al., entitled, "NULL DATA PACKET-BASED IMPLICIT SOUNDING AND CALIBRATION IN A WIRELESS LOCAL AREA NETWORK" filed Nov. 6, 2018, assigned to the assignee hereof, and expressly incorporated by reference herein.

TECHNICAL FIELD

This disclosure relates generally to wireless communications and more specifically to null data packet (NDP) based implicit sounding and calibration for a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN. In a typical WLAN, each STA may be associated with only one AP at a time. To identify an AP with which to associate, a STA is configured to perform scans on the wireless channels of each of one or more frequency bands (for example, the 2.4 GHz band or the 5 GHz band). As a result of the increasing ubiquity of wireless networks, a STA may have the opportunity to select one of many WLANs within range of the STA or select among multiple APs that together form an extended BSS. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a WLAN, such as a Wi-Fi (that is, Institute of Electrical and Electronics Engineers (IEEE) 802.11) network may include APs that may communicate with one or more STAs or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

In some cases, an AP may communicate with one or more STAs using multi-user multiple-input multiple-output (MU-MIMO) techniques. That is, the AP may use beamforming to steer MU-MIMO transmissions to the one or more STAs and reduce signaling interference on the channel for beamformed signaling targeted to each STA of the one or more STAs. To send beamformed MU-MIMO packets, the AP may determine channel information according to an explicit sounding procedure that involves a number of packet exchanges between the AP and the one or more STAs (for example, target STAs). However, in some cases, an explicit sounding procedure may have significant signaling overhead and impose delays in updating channel information, which may degrade MU-MIMO performance between the AP and the one or more STAs. Therefore, improved sounding processes may be desired.

SUMMARY

An access point (AP) may perform an implicit sounding procedure for single-user beamforming (SU-BF) or multi-user (MU) multiple-input multiple-output (MIMO) (MU-MIMO) transmissions. The AP may perform the implicit sounding procedure according to a null data packet (NDP) based protocol design, to enhance efficiency in obtaining channel related information (for example, channel state information (CSI), channel quality information (CQI), etc.). As part of the implicit sounding procedure, the AP may transmit an MU NDP announcement frame (NDPA-MU) to one or more stations (STAs) served by the AP. The NDPA-MU may prompt each of the one or more STAs to transmit an uplink NDP. The AP may then receive the set of uplink NDPs transmitted by the one or more STAs and estimate the uplink channel based on measuring the received NDPs. The AP may mirror the estimated uplink channel for reciprocal downlink channel estimation and precoding generation. Upon determining the channel estimation, the AP may perform a SU-BF or MU-MIMO downlink transmission that is precoded based on the channel estimation. In the case of MU-MIMO downlink transmission, the transmission may be multiplexed to support extremely high throughput (EHT) and 802.11ax wireless local area network (WLAN) operations at the one or more STAs.

In some cases, prior to performing the implicit sounding process, the AP may perform an implicit sounding calibration process. Similarly, the AP may perform the calibration process according to an NDP based protocol design. To begin the calibration process, the AP may transmit an NDPA-MU to one or more STAs. The transmitted NDPA-MU may prompt each of the one or more STAs to transmit an uplink NDP to the AP. The AP may receive the set of uplink NDPs and perform uplink channel measurement, as part of an uplink MU sounding procedure. In association with the uplink channel measurement (such as, prior to or following), the AP may transmit a downlink NDPA (for example, NDPA-D) to the one or more STAs, followed by a downlink NDP. The one or more STAs may receive the NDPA-D and downlink NDP from the AP and perform downlink channel measurement. The AP may then transmit a downlink trigger frame to the one or more STAs requesting the downlink measurements from the one or more STAs (for example, as part of a downlink channel compressed beamforming feedback (CBF) transmission). The AP may receive the downlink measurements from the one or more STAs and calibrate an effective downlink channel response to an effective uplink channel response based at least in part on the uplink and downlink channel measurements, to compensate for hardware differences between transmit chains and receive chains of the AP and STAs.

A method of wireless communication at an AP is described. The method may include transmitting a downlink message directed to a plurality of STAs including an uplink null data packet announcement frame, the uplink null data packet announcement frame prompting each STA of the plurality of STAs to transmit an uplink null data packet, receiving a set of uplink null data packets from the plurality of STAs based on the uplink null data packet announcement frame, and performing an implicit sounding procedure or an implicit sounding calibration procedure based on the received set of uplink null data packets.

An apparatus for wireless communication at an AP is described. The apparatus may include a processor, memory in electronic communication with the processor, and instructions stored in the memory. The instructions may be executable by the processor to cause the apparatus to a downlink message directed to a plurality of STAs including an uplink null data packet announcement frame, the uplink null data packet announcement frame prompting each STA of the plurality of STAs to transmit an uplink null data packet, receive a set of uplink null data packets from the plurality of STAs based on the uplink null data packet announcement frame, and perform an implicit sounding procedure or an implicit sounding calibration procedure based on the received set of uplink null data packets.

Another apparatus for wireless communication at an AP is described. The apparatus may include means for transmitting a downlink message directed to a plurality of STAs including an uplink null data packet announcement frame, the uplink null data packet announcement frame prompting each STA of the plurality of STAs to transmit an uplink null data packet, receiving a set of uplink null data packets from the plurality of STAs based on the uplink null data packet announcement frame, and performing an implicit sounding procedure or an implicit sounding calibration procedure based on the received set of uplink null data packets.

A non-transitory computer-readable medium storing code for wireless communication at an AP is described. The code may include instructions executable by a processor to a downlink message directed to a plurality of STAs including an uplink null data packet announcement frame, the uplink null data packet announcement frame prompting each STA of the plurality of STAs to transmit an uplink null data packet, receive a set of uplink null data packets from the plurality of STAs based on the uplink null data packet announcement frame, and perform an implicit sounding procedure or an implicit sounding calibration procedure based on the received set of uplink null data packets.

In some examples of the method, apparatuses, and non-transitory computer-readable medium described herein, performing the implicit sounding calibration procedure may include operations, features, means, or instructions for performing uplink channel measurements on the set of uplink null data packets, receiving downlink channel measurements from the plurality of STAs and calibrating an effective downlink channel response to an effective uplink channel response based on the uplink channel measurements and the downlink channel measurements.

In some examples of the method, apparatuses, and non-transitory computer-readable medium described herein, performing the implicit sounding calibration procedure further may include operations, features, means, or instructions for transmitting a downlink null data packet announcement frame directed to the plurality of STAs, the downlink null data packet announcement frame prompting each STA of the plurality of STAs to measure a downlink null data packet, transmitting the downlink null data packet to the plurality of STAs following transmission of the downlink null data packet announcement frame and where the received downlink channel measurements may be based on the downlink null data packet.

Some examples of the method, apparatuses, and non-transitory computer-readable medium described herein may further include operations, features, means, or instructions for transmitting a trigger frame requesting the downlink channel measurements from the plurality of STAs and where the downlink measurements may be received based on the trigger frame.

In some examples of the method, apparatuses, and non-transitory computer-readable medium described herein, the downlink message includes the trigger frame, the uplink null data packet announcement frame, and the downlink null data packet announcement frame.

In some examples of the method, apparatuses, and non-transitory computer-readable medium described herein, the uplink null data packet announcement frame and downlink null data packet announcement frame may be transmitted as a single null data packet announcement frame.

Some examples of the method, apparatuses, and non-transitory computer-readable medium described herein may further include operations, features, means, or instructions for transmitting the uplink null packet data announcement frame and receiving the set of uplink null data packets occurs prior to transmitting the downlink null data packet announcement frame.

Some examples of the method, apparatuses, and non-transitory computer-readable medium described herein may further include operations, features, means, or instructions for transmitting the uplink null packet data announcement frame and receiving the set of uplink null data packets occurs after receiving the downlink channel measurements from the plurality of STAs.

In some examples of the method, apparatuses, and non-transitory computer-readable medium described herein, the downlink channel measurements include compressed beamforming feedback.

In some examples of the method, apparatuses, and non-transitory computer-readable medium described herein, the uplink null data packet announcement frame includes an indication for each STA of the plurality of STAs to use a single radio chain for transmit and receive operations during the implicit sounding calibration procedure.

In some examples of the method, apparatuses, and non-transitory computer-readable medium described herein, performing the implicit sounding procedure further may include operations, features, means, or instructions for performing uplink channel measurements on the set of uplink null data packets, computing a downlink precoding matrix based on the uplink channel measurements and performing a downlink transmission to at least one STA of the plurality of STAs based on the downlink precoding matrix.

In some examples of the method, apparatuses, and non-transitory computer-readable medium described herein, the downlink transmission includes a single user beamformed transmission or a MU-MIMO transmission.

Some examples of the method, apparatuses, and non-transitory computer-readable medium described herein may further include operations, features, means, or instructions for receiving an acknowledgement message from the at least one STA of the plurality of STAs in response to the downlink transmission and updating the uplink channel measurements based on the acknowledgment message.

In some examples of the method, apparatuses, and non-transitory computer-readable medium described herein, the uplink null data packet announcement frame including an indication for each STA of the plurality of STAs to use a fixed number of radio chains for transmit and receive operations during the implicit sounding procedure or during the implicit sounding calibration procedure and receiving the set of uplink null data packets may include operations, features, means, or instructions for receiving from each STA a number of spatial streams and long training fields (LTFs) based on the fixed number of radio chains for that STA.

Some examples of the method, apparatuses, and non-transitory computer-readable medium described herein may further include operations, features, means, or instructions for receiving from each STA of the plurality of STAs a radio parameter including one or more of: a maximum number of supported spatial streams, a number of radio chains common to the transmission and reception, or a bitmap indicating a number of transmit antennas or a number of receive antennas; where the fixed number of radio chains may be based on the received radio parameter.

In some examples of the method, apparatuses, and non-transitory computer-readable medium described herein, the uplink null data packet announcement includes scheduling information for the set of uplink null data packets.

In some examples of the method, apparatuses, and non-transitory computer-readable medium described herein, the set of uplink null data packets from the plurality of STAs may be received substantially simultaneously according to an uplink MU-MIMO transmission or a distributed orthogonal frequency division multiple access (OFDMA) transmission.

In some examples of the method, apparatuses, and non-transitory computer-readable medium described herein, the plurality of STAs share spatial streams in the uplink MU-MIMO transmission.

In some examples of the method, apparatuses, and non-transitory computer-readable medium described herein, the set of uplink null data packets may be received from the plurality of STAs sequentially in time.

In some examples of the method, apparatuses, and non-transitory computer-readable medium described herein, performing the implicit sounding procedure or the implicit sounding calibration procedure further may include operations, features, means, or instructions for transmitting power control information to one or more STAs of the plurality of STAs, the power control information configured to increase a transmit power of one or more radio chains of the plurality of STAs for uplink null data packets of the set of uplink null data packets.

In some examples of the method, apparatuses, and non-transitory computer-readable medium described herein, the power control information may be configured to match a total transmit power of the one or more STAs to a total transmit power of the AP.

In some examples of the method, apparatuses, and non-transitory computer-readable medium described herein, performing the implicit sounding procedure or the implicit sounding calibration procedure further may include operations, features, means, or instructions for transmitting error vector magnitude (EVM) control information to one or more STAs of the plurality of STAs, the control information including one or more of: a modulation and coding scheme (MCS) in conformance with an EVM requirement, an EVM parameter, a power backoff parameter, or a target received signal strength indicator (RSSI).

In some examples of the method, apparatuses, and non-transitory computer-readable medium described herein, performing the implicit sounding procedure or the implicit sounding calibration procedure further may include operations, features, means, or instructions for transmitting to one or more STAs of the plurality of STAs power mismatch control information indicating a number of additional LTF symbols to be included in headers uplink null data packets of the set of uplink null data packets.

In some examples of the method, apparatuses, and non-transitory computer-readable medium described herein, the power mismatch control information may include operations, features, means, or instructions for an LTF symbol repetition factor, a total number of spatial streams to transmit the set of uplink null data packets, or a number of LTF symbols in excess of a number of spatial streams to include in the headers of the set of uplink null data packets.

A method of wireless communication at a STA is described. The method may include receiving a downlink message including an uplink null data packet announcement frame from an AP, the uplink null data packet announcement frame prompting the STA to transmit an uplink null data packet and transmitting the uplink null data packet based on the uplink null data packet announcement frame, the transmitting part of an implicit sounding procedure or an implicit calibration procedure at the AP.

An apparatus for wireless communication at a STA is described. The apparatus may include a processor, memory in electronic communication with the processor, and instructions stored in the memory. The instructions may be executable by the processor to cause the apparatus to receive a downlink message including an uplink null data packet announcement frame from an AP, the uplink null data packet announcement frame prompting the STA to transmit an uplink null data packet and transmit the uplink null data packet based on the uplink null data packet announcement frame, the transmitting part of an implicit sounding procedure or an implicit calibration procedure at the AP.

Another apparatus for wireless communication at a STA is described. The apparatus may include means for receiving a downlink message including an uplink null data packet announcement frame from an AP, the uplink null data packet announcement frame prompting the STA to transmit an uplink null data packet and transmitting the uplink null data packet based on the uplink null data packet announcement frame, the transmitting part of an implicit sounding procedure or an implicit calibration procedure at the AP.

A non-transitory computer-readable medium storing code for wireless communication at a STA is described. The code may include instructions executable by a processor to receive a downlink message including an uplink null data packet announcement frame from an AP, the uplink null data packet announcement frame prompting the STA to transmit an uplink null data packet and transmit the uplink null data packet based on the uplink null data packet announcement frame, the transmitting part of an implicit sounding procedure or an implicit calibration procedure at the AP.

In some examples of the method, apparatuses, and non-transitory computer-readable medium described herein, the implicit sounding calibration procedure may include operations, features, means, or instructions for performing a downlink channel measurement of a downlink null data packet from the AP and transmitting the downlink channel measurement to the AP based on the performing.

In some examples of the method, apparatuses, and non-transitory computer-readable medium described herein, the implicit sounding calibration procedure further may include operations, features, means, or instructions for receiving a downlink null data packet announcement frame from the AP, the downlink null data packet announcement frame prompting the performing, receiving the downlink null data packet following receiving the downlink null data packet announcement frame and where the downlink channel measurement may be based on the received downlink null data packet.

Some examples of the method, apparatuses, and non-transitory computer-readable medium described herein may further include operations, features, means, or instructions for receiving a trigger frame requesting the downlink channel measurement and where the transmitting may be based on the trigger frame.

In some examples of the method, apparatuses, and non-transitory computer-readable medium described herein, the downlink message includes the trigger frame, the uplink null data packet announcement frame, and the downlink null data packet announcement frame.

In some examples of the method, apparatuses, and non-transitory computer-readable medium described herein, the uplink null data packet announcement frame and downlink null data packet announcement frame may be received as a single null data packet announcement frame.

Some examples of the method, apparatuses, and non-transitory computer-readable medium described herein may further include operations, features, means, or instructions for receiving the uplink null packet data announcement frame and transmitting the uplink null data packet occurs prior to receiving the downlink null data packet announcement frame.

Some examples of the method, apparatuses, and non-transitory computer-readable medium described herein may further include operations, features, means, or instructions for receiving the uplink null data packet announcement frame and transmitting the uplink null data packet occurs after transmitting the downlink channel measurement.

In some examples of the method, apparatuses, and non-transitory computer-readable medium described herein, the downlink channel measurement includes compressed beamforming feedback.

In some examples of the method, apparatuses, and non-transitory computer-readable medium described herein, the uplink null data packet announcement frame includes an indication for the STA to use a single radio chain for transmit and receive operations during the implicit sounding calibration procedure.

In some examples of the method, apparatuses, and non-transitory computer-readable medium described herein, the implicit sounding procedure further may include operations, features, means, or instructions for receiving a downlink transmission from the AP, the downlink transmission based on a downlink precoding matrix.

In some examples of the method, apparatuses, and non-transitory computer-readable medium described herein, the downlink transmission includes a single user beamformed transmission or a MU-MIMO transmission.

Some examples of the method, apparatuses, and non-transitory computer-readable medium described herein may further include operations, features, means, or instructions for transmitting an acknowledgement message to the AP in response to the downlink transmission.

In some examples of the method, apparatuses, and non-transitory computer-readable medium described herein, the uplink null data packet announcement frame includes an indication for the STA to use a fixed number of radio chains for transmit and receive operations during the implicit sounding procedure or during the implicit sounding calibration procedure and transmitting the uplink null data packet may include operations, features, means, or instructions for transmitting to the AP a number of spatial streams and LTFs based on the fixed number of radio chains.

Some examples of the method, apparatuses, and non-transitory computer-readable medium described herein may further include operations, features, means, or instructions for transmitting to the AP a radio parameter including one or more of: a maximum number of supported spatial streams, a number of radio chains common to the transmission and reception, or a bitmap indicating a number of transmit antennas or a number of receive antennas; where the fixed number of radio chains may be based on the radio parameter.

In some examples of the method, apparatuses, and non-transitory computer-readable medium described herein, the received uplink null data packet announcement includes scheduling information for the uplink null data packet.

In some examples of the method, apparatuses, and non-transitory computer-readable medium described herein, the uplink null data packet may be transmitted substantially simultaneously with uplink null data packet transmissions of a plurality of STAs according to an uplink MU-MIMO transmission or a distributed OFDMA transmission.

In some examples of the method, apparatuses, and non-transitory computer-readable medium described herein, the STA share spatial streams in the uplink MU-MIMO transmission with the plurality of STAs.

In some examples of the method, apparatuses, and non-transitory computer-readable medium described herein, the implicit sounding procedure or the implicit sounding calibration procedure further may include operations, features, means, or instructions for receiving power control information from the AP based on a power imbalance at the STA, the power control information configured to increase a transmit power of one or more radio chains.

In some examples of the method, apparatuses, and non-transitory computer-readable medium described herein, the power control information may be configured to match a total transmit power of the STA to a total transmit power of the AP.

In some examples of the method, apparatuses, and non-transitory computer-readable medium described herein, performing the implicit sounding procedure or the implicit sounding calibration procedure further may include operations, features, means, or instructions for transmitting EVM control information to one or more STAs of the plurality of STAs, the control information including one or more of: a MCS in conformance with an EVM requirement, an EVM parameter, a power backoff parameter, or a target RSSI.

In some examples of the method, apparatuses, and non-transitory computer-readable medium described herein, the implicit sounding procedure or the implicit calibration procedure further may include operations, features, means, or instructions for receiving from the AP power mismatch control information based on a power imbalance at the STA, the power mismatch control information indicating a number of additional LTF symbols to be included in a header of the uplink null data packet.

In some examples of the method, apparatuses, and non-transitory computer-readable medium described herein, the power mismatch control information may include operations, features, means, or instructions for an LTF symbol repetition factor, a total number of spatial streams to transmit the uplink null data packet, or a number of LTF symbols in excess of a number of spatial streams to include in the header of the uplink null data packet.

In some examples of the method, apparatuses, and non-transitory computer-readable medium described herein, the uplink null data packet announcement frame or the downlink null data packet announcement frame may include an indication of a single user implicit sounding procedure or a multi user implicit sounding procedure.

In some examples of the method, apparatuses, and non-transitory computer-readable medium described herein, the uplink null data packet announcement frame or the downlink null data packet announcement frame may be configured to include a common info field.

In some examples of the method, apparatuses, and non-transitory computer-readable medium described herein, the common info field may be included as part of an extended STA info field of the uplink null data packet announcement frame or an extended STA info field of the downlink null data packet announcement frame.

In some examples of the method, apparatuses, and non-transitory computer-readable medium described herein, an MU-MIMO transmission may multiplex EHT and 802.11ax WLAN transmissions.

BRIEF DESCRIPTION OF THE DRAWINGS

FIGS. 5C-5F illustrate tables showing the format of common info fields and STA info fields in accordance with aspects of the present disclosure.

FIGS. 6C-6F illustrate tables showing the format of common info fields and STA info fields in accordance with aspects of the present disclosure.

FIGS. 7C-7F illustrate tables showing the format of common info fields and STA info fields in accordance with aspects of the present disclosure.

FIG. 11B illustrates a table showing info fields in an NDPA-MU frame in accordance with aspects of the present disclosure.

DETAILED DESCRIPTION

Figure 1:
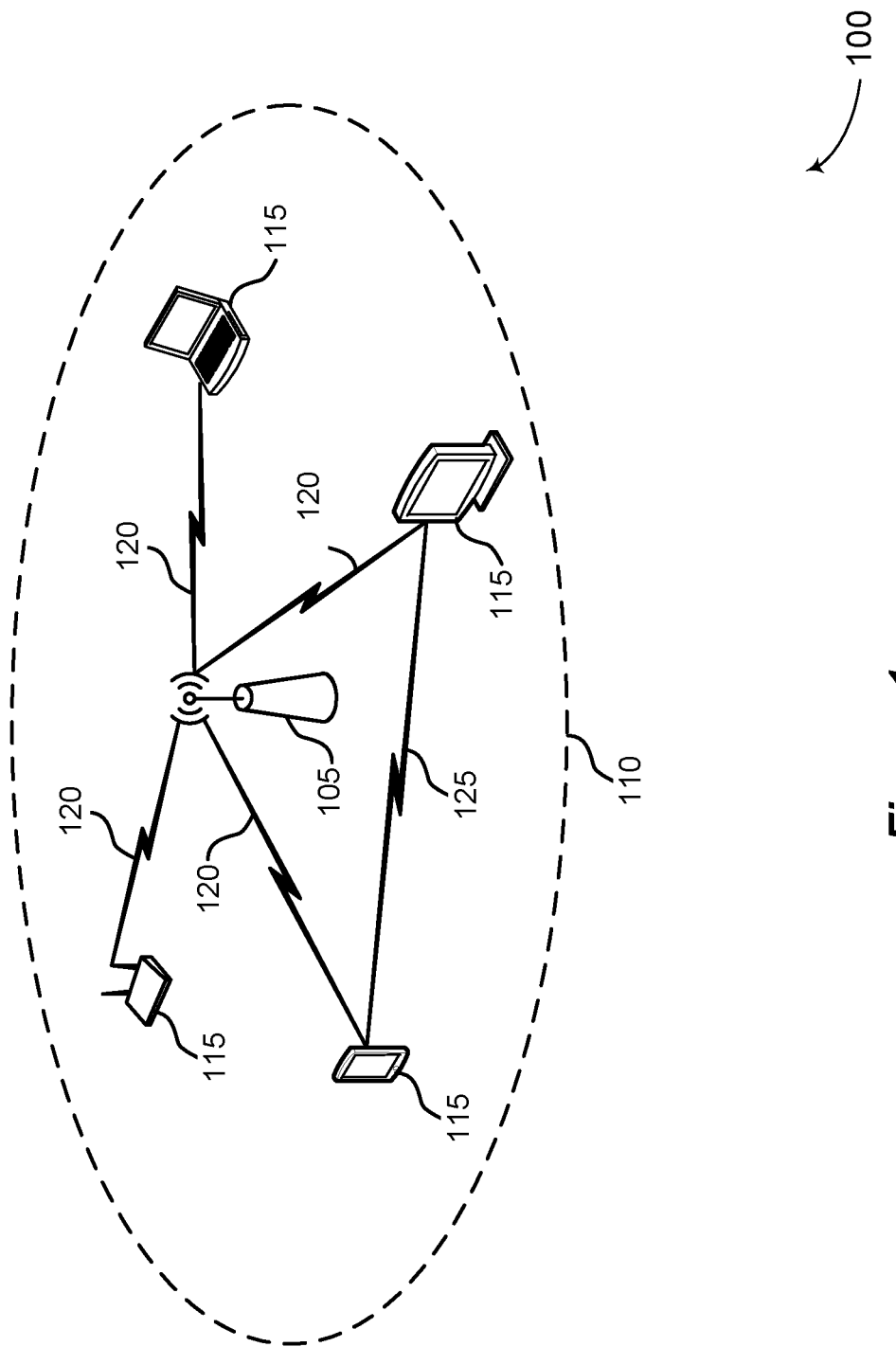
FIG. 1 illustrates an example of a system for wireless communications that supports null data packet (NDP)-based implicit sounding and calibration protocol for a wireless local area network (WLAN) in accordance with aspects of the present disclosure.

The following description is directed to implementations for the purposes of describing innovative aspects of this disclosure. However, the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

An access point (AP) may use a sounding procedure to determine channel information for enhanced single-user beamforming (SU-BF) or multi-user MU multiple-input multiple-output (MIMO) (MU-MIMO) beamformed communications. Sounding procedures may be classified into two types: implicit and explicit. Implicit sounding may refer to a channel sounding procedure that involves channel measurements in a reverse direction for channel estimation associated with both uplink and downlink communication. In contrast, an explicit channel sounding procedure may involve channel measurements in the same direction as a future data transmission on the channel resources. According to an explicit sounding procedure, the AP may transmit measurement signaling (for example, in the form of a null data packet (NDP)), via a number of spatial streams equivalent to the number of transmit antennas at the AP. The received NDP enables one or more STAs to process the spatial streams and provide channel feedback corresponding to the transmit antennas. For example, the one or more STAs that receive the NDP may process the associated long training fields (LTFs) to estimate the downlink channel, then send back a beamforming report with encoded channel information for the set of antennas. A similar procedure may be performed for channel measurement of uplink channel resources, as part of uplink beamformed communications between the one or more STAs and the AP.

Explicit channel sounding processes generally involve multiple packets being sent and received between the AP and one or more STAs. Due to the signaling exchange associated with an explicit channel sounding procedure, the AP and the one or more STAs may experience significant signaling overhead. Further, due to the message exchange for an explicit channel sounding procedure, channel information may not be updated frequently, which may degrade SU-BF or MU-MIMO performance.

Various implementations relate generally to NDP-based-implicit sounding and calibration in a WLAN, such as a next generation WiFi network, which also may be referred to as an extremely high throughput (EHT) network. Some implementations more specifically relate to a calibration procedure including uplink MU sounding, downlink MU sounding, and triggered downlink channel feedback. According to the techniques described herein, an AP may reduce signaling overhead by performing an implicit sounding procedure for uplink and downlink channel estimation using uplink MU-MIMO, and more specifically, without using a downlink data payload or downlink NDP. Some implementations more specifically relate to AP-initiated implicit sounding and uplink channel estimation for reciprocal downlink channel estimation and precoding generation associated with beamformed transmission. An AP may perform a calibration procedure with one or more STAs that involves NDP transmissions. The AP may calibrate an effective downlink channel response to an effective uplink channel to compensate for transmit and receive chain differences. The AP may initiate implicit sounding by transmitting a downlink message that includes an uplink NDP announcement frame to the one or more STAs, prompting uplink MU NDP transmission. The AP may estimate the uplink channel based on measuring the received NDPs and mirror the estimated uplink channel for reciprocal downlink channel estimation and precoding generation. The AP may perform MU-MIMO downlink transmission that is precoded based on the channel estimation.

The AP may perform the implicit sounding procedure according to an NDP-based protocol design, to enhance efficiency in obtaining channel related information (for example, channel state information (CSI), channel quality information (CQI), etc.). The AP may perform the implicit sounding procedure in a controlled sequence, to control null data packet transmission from one or more STAs with timing and frequency precorrection and at appropriate time intervals, transmission power, and a number of transmission streams and LTFs for transmission. The implicit sounding procedure can be implemented to realize one or more of the following potential advantages. In some implementations, the described techniques can reduce signaling overhead, simplify STA processing duties, and account for changes in channel characteristics. In particular, because the implicit sounding procedure may be associated with less NDP signaling than the explicit sounding procedure, signaling overhead may be reduced, processing duties may be minimized, and wireless devices may be more inclined to perform the implicit sounding procedure to identify updated channel information, resulting in improved throughput.

In some aspects, the AP may transmit an MU NDP announcement frame (for example, NDPA-MU) to one or more STAs served by the AP. The NDPA-MU may prompt the one or more STAs to transmit an uplink NDP in response. In some cases, the NDPA-MU may be configured to include separate indications for MU and SU sounding within the frame structure. In some cases, the NDPA-MU may further include an indication to the one or more STAs to use radio chains common for transmission and reception in performing the uplink implicit sounding. Based on reception of the NDPA-MU, the one or more STAs may transmit a set of uplink NDPs. The AP may receive the set of NDPs and perform uplink channel estimation. Upon determining the channel estimation, the AP may perform a SU-BF or MU-MIMO beamformed downlink transmission that is precoded based on the channel estimation. In the case of MU-MIMO downlink transmission, the transmission may be multiplexed to support EHT and 802.11ax wireless local area network (WLAN) operations at the one or more STAs.

The AP may rely on reciprocity between the uplink channel and the downlink channel as part of the implicit sounding procedure to perform the beamformed downlink transmission and configure the precoding matrix based on the channel estimation. The downlink channel may include the transmit chains of the AP, the over-the-air (OTA) downlink channel, and the receive chains of the STAs involved in the sounding process. The uplink channel may include the transmit chains of the STAs, the OTA uplink channel, and the receive chains of the AP. The OTA uplink and downlink channels are reciprocal due to physics. But for implicit sounding to work properly, the transmit and receive chains of the AP must also be reciprocal (for example, have the same responses) following calibration.

According to the techniques described herein, an AP may ensure chain reciprocity by performing a calibration process using MU sounding procedure. The calibration process may provide information about the responses of the AP's transmit and receive chains so that the AP can adjust the transmit chain to match the response of the receive chain (or the AP may use the mismatch information in generating a beamforming/precoding matrix for downlink SU-BF or MU-MIMO). Similar to the implicit sounding procedure, the AP may perform the implicit sounding calibration procedure according to an NDP based protocol design, to enhance efficiency. The calibration process may involve the AP transmitting an NDPA-MU to one or more STAs served by the AP. The NDPA-MU may prompt the one or more STAs to transmit an NDP. In some cases, the NDPA-MU may include an indication (for example, a calibration bit) for the one or more STAs to each use a single (for example, same) transmit/receive chain for the calibration process. The one or more STAs may provide an NDP in response, where the AP may receive the set of NDPs and perform uplink channel measurement, as part of an MU uplink sounding procedure.

In association with the uplink channel measurement procedure for calibration (for example, before or after), the AP may transmit a downlink NDP announcement frame (for example, NDPA-D) followed by a downlink NDP to the one or more STAs. The one or more STAs may receive the NDPA-D and downlink NDP and perform downlink channel measurement. The AP may transmit a downlink trigger frame to the one or more STAs to initiate feedback signaling associated with the downlink channel measurement. Based on the trigger frame, the one or more STAs may transmit downlink channel compressed beamforming feedback (CBF) to the AP, so that the AP may receive the measured downlink channel measurements of the one or more STAs. The AP may then calibrate an effective downlink channel response to an effective uplink channel response based on the uplink channel measurements and downlink channel measurements, to compensate for potential hardware differences between transmit and receive chains of the AP (that is, to compensate for effective uplink channel and effective downlink channel disparity).

Features of the disclosure introduced above are further described below in the context of a wireless communication system. Specific examples are then described of calibration processes that use MU sounding transmissions and implicit sounding processes that use MU sounding transmissions. These and other features of the disclosure are further illustrated by and described with reference to apparatus diagrams, system diagrams, and flowcharts that relate to MU sounding based calibration and implicit sounding techniques.

FIG. 1 illustrates an example of a wireless communication system 100 that supports NDP based implicit sounding and calibration in a WLAN. According to some aspects, the wireless communication system 100 can be an example of a wireless local area network (and will hereinafter be referred to as WLAN 100). For example, the WLAN 100 can be a network implementing at least one of the IEEE 802.11 family of standards. The WLAN 100 may include numerous wireless devices such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a BSS. FIG. 1 additionally shows an example coverage area 120 of the AP 105, which may represent a basic service area (BSA) of the WLAN 100. While only one AP 105 is shown, the WLAN 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical (PHY) layer and medium access control (MAC) layer. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, where multiple operators may have a license to operate in the same or overlapping frequency band or bands.

In some cases, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct wireless communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other --P2P group connections.

In some cases, some types of STAs 115 or APs 105 may be configured for EHT operations and support functionality on a dynamic channel bandwidth spectrum. The dynamic channel bandwidth spectrum may be a portion of frequency spectrum that includes frequency bands of the above radio frequency (RF) spectrum, including frequency bands traditionally used for Wi-Fi technology or emerging 6 GHz band. Each band (for example, the 5 GHz band) may contain multiple channels (such as, each spanning 20 MHz in frequency, 40 MHz in frequency, 80 MHz in frequency, etc.), each of which may be usable by configured STAs 115 or APs 105. Based on the enhanced functionality supported by EHT modes of operation, supported extensions to available channel bandwidth spectrum (for example 320 MHz, 160+160 MHz, etc.) may be possible.

Some types of STAs 115 may provide for automated communication. Automated wireless devices may include those implementing --IoT communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some types of APs 105 may provide for AP coordination using over-the-air signaling. Different levels of coordination may be supported by the APs 105, with associated synchronization. For example, in some cases, one or more APs 105 may support coordination without synchronization (in some cases known as level-1 synchronization) where the APs 105 may coordinate to share load information, user-management, admission control, and BSS transition management, such as handover. In some cases, one or more APs 105 may support coordination with loose synchronization (in some cases known as level-2 synchronization) where APs 105 may coordinate for interference management and simultaneous transmission on a transmit opportunity (TXOP) by TXOP basis. In some cases, one or more APs 105 may support coordination with tight (for example, symbol level) synchronization (in some cases known as level-3 synchronization) where APs 105 may perform coordinated beamforming and transmit null packets to STAs 115 served on other BSSs, to reduce interference. In other cases, one or more APs 105 may support coordination with tight (for example, sub-symbol level) synchronization (in some cases known as level-4 synchronization) where APs 105 may coordinate for joint --MIMO wireless systems transmission, where an STA 115 may be served by multiple APs 105.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on CSI associated with the channels over which the AP 105 may communicate with the STA 115. That is, based on this CSI, the AP 105 may appropriately weight the transmissions from each antenna (for example, or antenna port) such that the desired beamforming effects are achieved. In some cases, these weights may be determined before beamforming can be employed. For example, the transmitter (for example, the AP 105) may transmit one or more sounding packets to the receiver in order to determine CSI.

WLAN 100 may further support MIMO wireless systems. Such systems may use a transmission scheme between a transmitter (for example, AP 105) and a receiver (for example, a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals. In downlink MU-MIMO, an AP 105 may simultaneously send multiple streams to one or more STAs 115 by taking advantage of spatial diversity in transmission resources and multiple antennas. In uplink MU-MIMO, the data transmissions of one or more STAs 115 may be coordinated so that they are simultaneously received at the AP 105 over multiple spatial streams.

To implement SU-BF or MU-MIMO techniques, an AP 105 may need to have information about the characteristics of the downlink and uplink channels (for example, how the channel affects a packet, in terms of phase, amplitude, frequency, etc.). For example, the AP 105 may determine the properties of the downlink and uplink channels so that it can beamform (for example, direct) the signals for STAs 115 so the signal intended for one STA does not severely interfere with the signal intended for another STA.

Determining the properties of a channel may also be referred to herein as estimating the channel. An AP 105 may estimate a channel by obtaining information indicative of the impact a channel has on a packet over propagation. This information may be derived by measuring known training symbols within a sounding packet. For example, a device that receives a sounding packet may measure the LTF symbols in the packet to determine the effects of the channel on the packet. Implicit sounding may per performed by any one of an AP 105 or STA 115 for measuring uplink or downlink packets. In some cases, it may be beneficial to perform implicit sounding for downlink beamforming channel measurement in comparison to uplink beamforming channel measurement due to more downlink antennas for beamformed communication, resulting in improved antenna gain and power gain. For example, as described herein, for implicit sounding an AP 105 may estimate an uplink channel by measuring uplink packets and may estimate the downlink channel by assuming (for example, in implicit sounding) that the downlink channel is reciprocal to the uplink channel. The AP 105 may perform the implicit sounding procedure in a controlled sequence, to control null data packet transmission from one or more STAs 115 at appropriate time intervals, transmission power, and a number of transmission streams and LTFs for transmission. Further, the controlled sequence may promote frequency or timing pre-correction to reduce impairments for a calibration process, such as offsets (for example, frequency, power, etc.).

Two channels are reciprocal if the channel response and transmit chain response in the downlink direction match the channel response and receive chain response in the uplink direction. An AP 105 may employ a calibration process utilizing MU sounding to estimate the mismatch between the response of the receive chains and transmit chains. The AP 105 may take the mismatch into account of when beamforming downlink SU-BF or MU-MIMO transmissions. Over the calibration process, the AP 105 may send an NDP to a number of STA(s) for measurement. The NDPs include the same number of LTFs as the number of transmission chains of the AP 105. When the STAs 115 report the downlink channel information derived from measuring the LTFs, the AP 105 may use the channel information to calculate correction matrices. These correction matrices may be applied at the transmitter (or the receiver) to correct for the amplitude and phase differences between the transmit and receive chains of the AP 105. Additionally, or alternatively, the correction matrices may be used in the beamforming matrix computation for the downlink SU-BF MU-MIMO transmission.

To perform the calibration process, an AP 105 may compute the complete channel response ($H_{UL}$) for the uplink channel and the complete channel response ($H_{DL}$) for the downlink channel. The complete channel response H for a channel may represented or computed as H=USV*, where U represents the unitary matrix, S represents the signal strength (for example, signal-to-noise ratio (SNR)) in terms of Eigen values, and V represents the Eigen vectors of the channel response H (so V* may be the conjugate transpose, or Hermitian transpose, of V). Once the complete channel responses $H_{UL}$ and $H_{DL}$ are computed, the AP 105 may complete the calibration process using any number of methods, including the least squares calibration method.

While an AP 105 may be able to estimate the uplink channel H by measuring an uplink MU sounding directly, the AP 105 may rely on a STA 115 to report downlink channel information in order to estimate the downlink channel. But in some cases, a STA 115 (for example, a legacy STA) may provide only some of the parameters needed to compute $H_{DL}$. For example, the STA 115 may report S and V but not U. In such cases, the AP 105 may take actions that compensate for the lack of U. For example, because the U matrix degrades to a number when a single chain is used for transmitting and receiving, the AP 105 may select STAs 115 that only have (or use) a single chain for communication. Or the AP 105 may instruct STAs 115 to only use a single chain over the calibration process. Alternatively, the AP 105 may select non-legacy STAs that include the U matrix in their reports (in some cases, the non-legacy STAs may even include the entire downlink channel response $H_{DL}$ in their reports).

WLAN PDUs may be transmitted over a radio frequency spectrum band, which in some examples may include multiple sub-bands or frequency channels. In some cases, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiver to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

Figure 2:
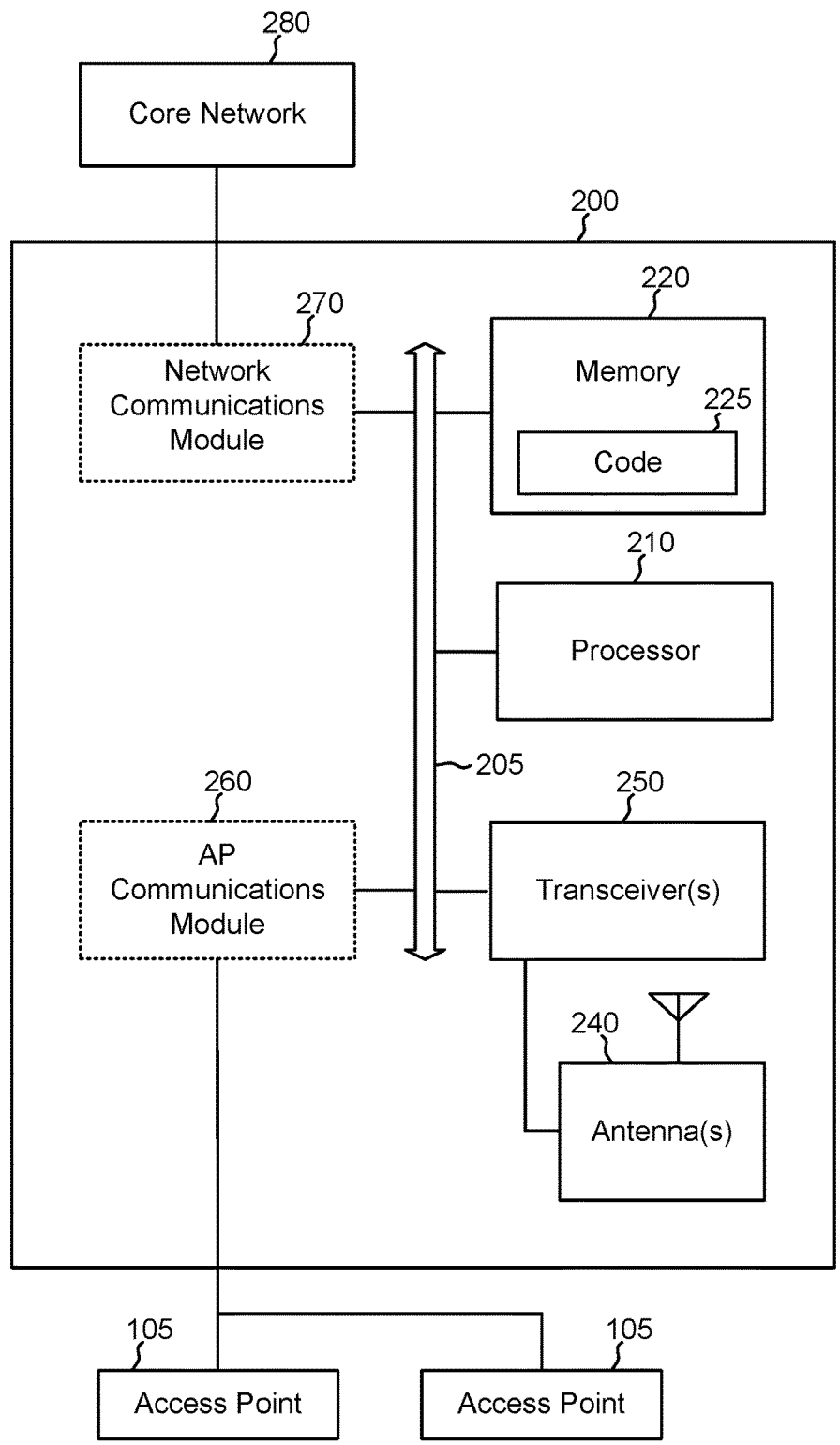
FIG. 2 illustrates an example of a block diagram of an example access point (AP) that supports NDP-based implicit sounding and calibration for a WLAN in accordance with aspects of the present disclosure.

FIG. 2 illustrates a block diagram of an example AP 200 that supports NDP based implicit sounding and calibration for a WLAN. For example, the AP 200 may be an example of aspects of the AP 105 described with reference to FIG. 1.

The AP 200 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 200 includes a processor 210, a memory 220, at least one transceiver 250 and at least one antenna 240. In some implementations, the AP 200 also includes one or both of an AP communications module 260 and a network communications module 270. Each of the components (or "modules") described with reference to FIG. 2 can communicate with one another, directly or indirectly, over at least one bus 205.

The memory 220 can include random-access memory (RAM) and read-only memory (ROM). The memory 220 also can store processor or computer-executable software code 225 containing instructions that, when executed by the processor 210, cause the processor to perform various functions described herein for wireless communication, including generation and transmission of a downlink frame and reception of an uplink frame.

The processor 210 can include a hardware device such as, for example, a central processing unit (CPU), a microcontroller, an application-specific integrated circuit (ASIC), or a programmable logic device (PLD) such as a field programmable gate array (FPGA), among other possibilities. The processor 210 processes information received through the transceiver 250, the AP communications module 260, and the network communications module 270. The processor 210 also can process information to be sent to the transceiver 250 for transmission through the antenna 240, information to be sent to the AP communications module 260, and information to be sent to the network communications module 270. The processor 210 can generally be configured to perform various operations related to generating and transmitting a downlink frame and receiving an uplink frame.

The transceiver 250 can include a modem to modulate packets and provide the modulated packets to the antenna 240 for transmission, as well as to demodulate packets received from the antenna 240. The transceiver 250 can be implemented as at least one RF transmitter and at least one separate RF receiver. The transceiver 250 can communicate bi-directionally, via the antenna 240, with at least one STA 115 as, for example, shown with reference to FIG. 1. Although only one transceiver 250 and one antenna 240 are shown with reference to FIG. 2, the AP 200 can typically include multiple transceivers 250 and antennas 240. For example, in some AP implementations, the AP 200 can include multiple transmit antennas (each with a corresponding transmit chain) and multiple receive antennas (each with a corresponding receive chain). The AP 200 may communicate with a core network 280 through the network communications module 270. The system also may communicate with other APs, such as APs 105, using the AP communications module 260.

Figure 3:
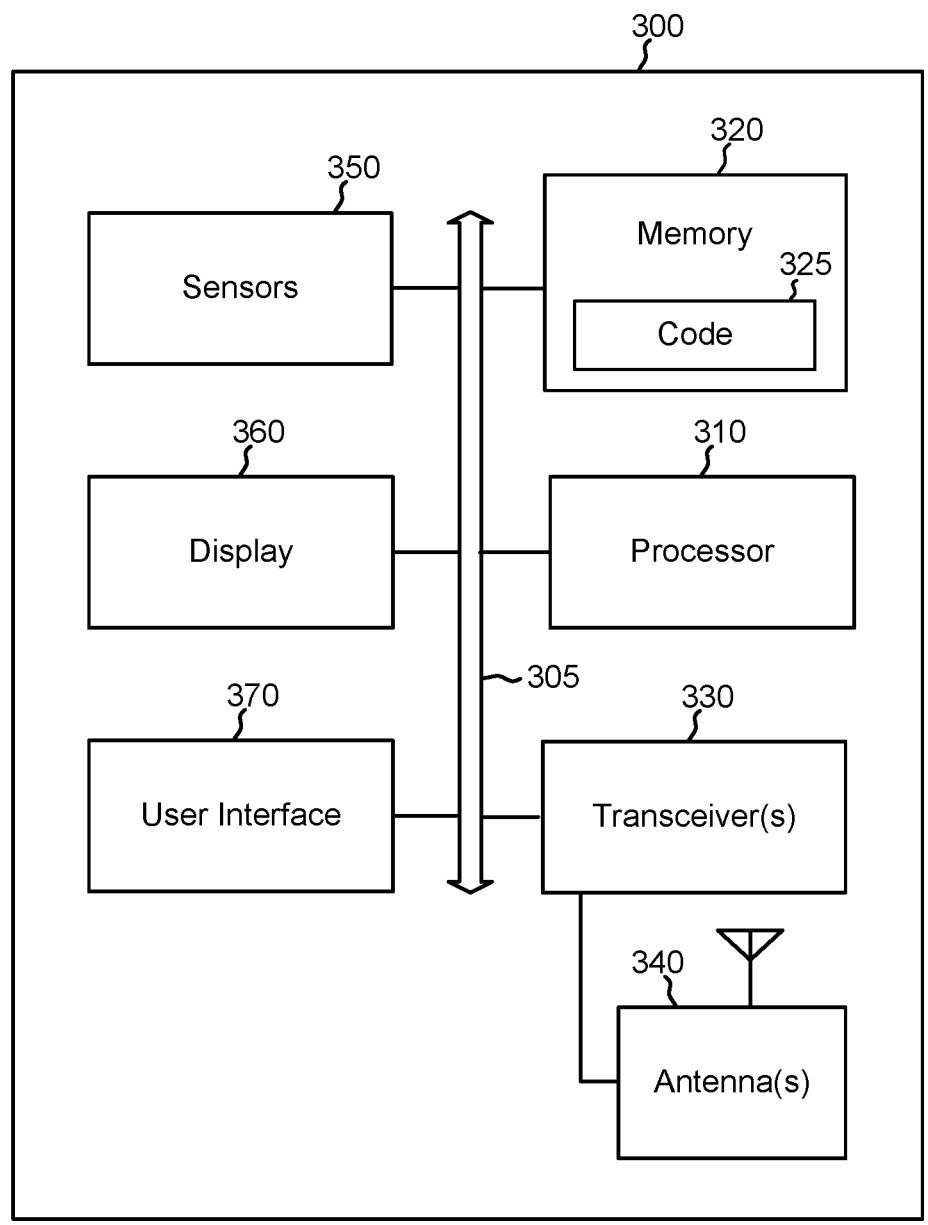
FIG. 3 illustrates an example of a block diagram of an example station (STA) that supports NDP-based implicit sounding and calibration for a WLAN in accordance with aspects of the present disclosure.

FIG. 3 illustrates a block diagram of an example STA 300 that supports NDP based implicit sounding and calibration for a WLAN. For example, the STA 300 may be an example of aspects of the STA 115 described with reference to FIG. 1. The STA 300 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 300 includes a processor 310, a memory 320, at least one transceiver 330 and at least one antenna 340. In some implementations, the STA 300 additionally includes one or more of sensors 350, a display 360 and a user interface (UI) 370 (such as a touchscreen or keypad). Each of the components (or "modules") described with reference to FIG. 3 can communicate with one another, directly or indirectly, over at least one bus 305.

The memory 320 can include RAM and ROM. The memory 320 also can store processor-or computer-executable software code 325 containing instructions that, when executed, cause the processor 310 to perform various functions described herein for wireless communication, including reception of a downlink frame and generation and transmission of an uplink frame.

The processor 310 includes an intelligent hardware device such as, for example, a CPU, a microcontroller, an ASIC or a PLD such as an FPGA, among other possibilities. The processor 310 processes information received through the transceiver 330 as well as information to be sent to the transceiver 330 for transmission through the antenna 340. The processor 310 can be configured to perform various operations related to receiving a downlink frame and generating and transmitting an uplink frame.

The transceiver 330 can include a modem to modulate packets and provide the modulated packets to the antenna 340 for transmission, as well as to demodulate packets received from the antenna 340. The transceiver 330 can be implemented as at least one RF transmitter and at least one separate RF receiver. The transceiver 330 can communicate bi-directionally, via the antenna 340, with at least one AP 105 as, for example, shown with reference to FIG. 1. Although only one transceiver 330 and one antenna 340 are shown with reference to FIG. 3, the STA 300 can include two or more antennas. For example, in some STA implementations, the STA 300 can include multiple transmit antennas (each with a corresponding transmit chain) and multiple receive antennas (each with a corresponding receive chain).

Figure 4:
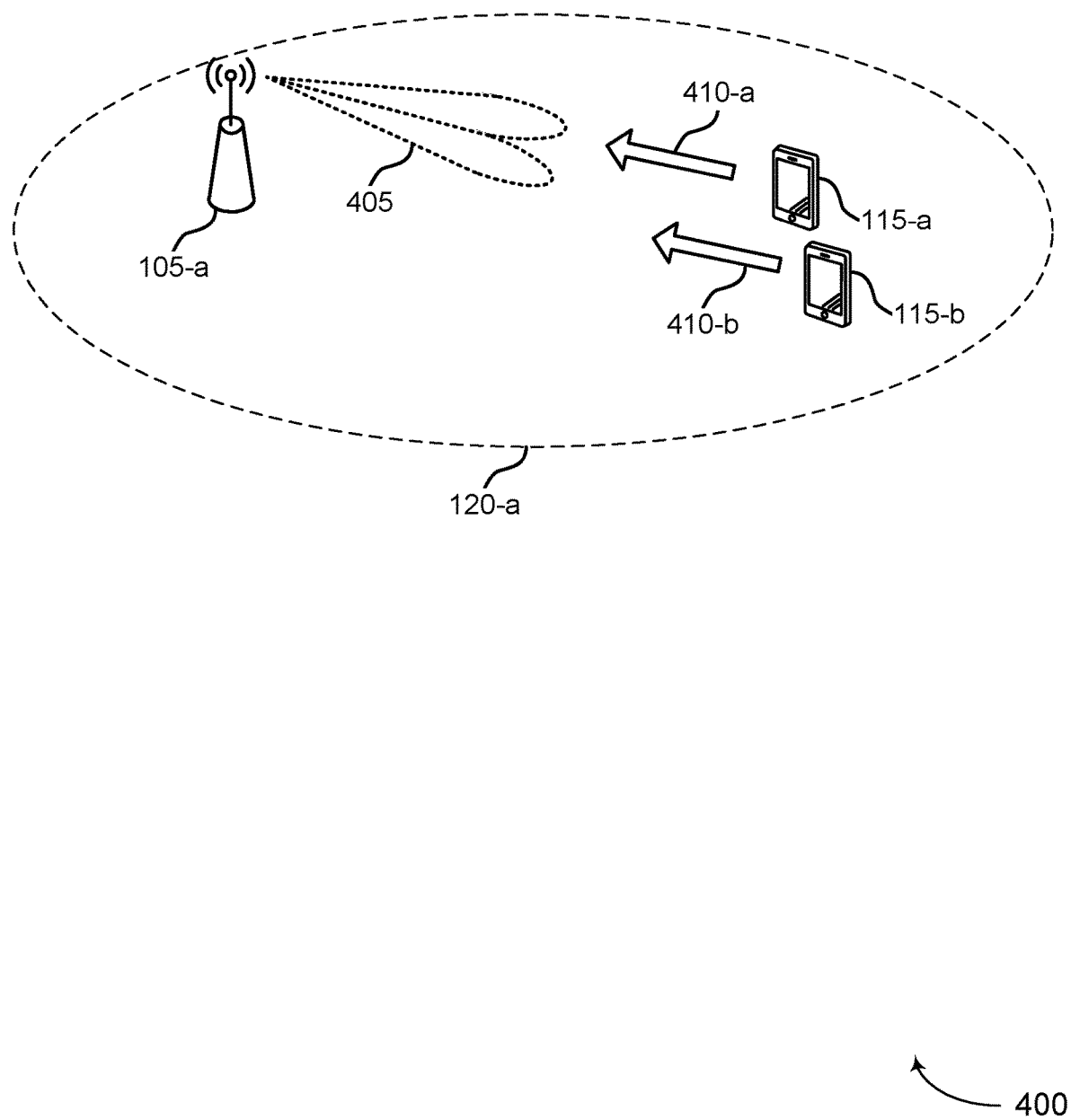
FIG. 4 illustrates an example of a wireless communications system that supports NDP-based implicit sounding and calibration for a WLAN in accordance with aspects of the present disclosure.

FIG. 4 illustrates an example of a wireless communications system 400 that supports NDP based implicit sounding and calibration for a WLAN. Wireless communications system 400 may include AP 105-a, STA 115-a, and STA 115-b, which may be examples of the corresponding devices described with reference to FIG. 1. AP 105-a may communicate with wireless devices inside a coverage area 120-a. AP 105-a may communicate using a variety of techniques, including beamforming, single-user MIMO (SU-MIMO), and MU-MIMO. For example, AP 105-a may use beamforming to steer downlink MIMO transmissions to the STAs 115 and reduce signaling interference on the channel for targeted downlink signaling to the STAs 115.

As illustrated, AP 105-a may communicate with STA 115-b and STA 115-c using SU-BF or MU-MIMO techniques. The AP 105-a may also use beamforming to send MU-MIMO transmissions. For example, the AP 105-a may send a beamformed MU-MIMO transmission 405 to STA 115-a and STA 115-b. STAs 115 may also send uplink MU-MIMO transmissions (for example, uplink MU-MIMO transmission 410-a and uplink MU-MIMO transmission 410-b) to AP 105-a. The uplink MU-MIMO transmissions 410 may be aligned in time or frequency (for example, the uplink MU-MIMO transmissions 410 may be sent over the same time or frequency resources).

Prior to performing a beamformed transmission (for example, the beamformed MU-MIMO transmission 405) over a channel, AP 105-a may first perform a calibration procedure. According to the techniques described herein, AP 105-a may perform a calibration process to match the response of the transmit and receive antenna chains at the AP 105-a. AP 105-a may perform the calibration procedure according to an NDP based protocol design. The calibration procedure may include an uplink MU NDPA (for example, an NDPA-MU) and a downlink NDPA (for example, an NDPA-D) transmission by the AP 105-a, for uplink channel measurement at AP 105-a and downlink channel measurements at each of STAs 115-a and 115-b. The AP 105-a may then receive the downlink channel measurements through CBF feedback transmission and calibrate an effective downlink channel response to an effective uplink channel response based on the measurements. A STA 115 that participates in the calibration and sounding processes may use the same set of transmit and receive chains for both processes.

Following the calibration procedure, the AP 105-a may determine channel information according to an implicit sounding procedure. The AP 105-a (as a beamformer) may perform the implicit sounding procedure according to an NDP based protocol design, to enhance efficiency in obtaining channel related information (for example, CSI, CQI, etc.). Specifically, the AP 105-a may initiate an uplink MU sounding procedure and receive uplink NDPs from STA 115-a and 115-b, for uplink channel measurement and estimation. As part of the implicit sounding procedure, the AP 105-a may mirror the estimated uplink channel for reciprocal downlink channel estimation and precoding generation. That is, the AP 105-a may use the uplink channel estimation to determine a beamforming steering matrix that is used to direct transmissions (for example, the beamformed MU-MIMO transmission 405) toward the target device(s) (as beamformee(s)). The transmissions may be directed by applying weights to antennas within an antenna array so that constructive and destructive interference focuses the energy of the transmission in a particular direction.

Figure 5A:
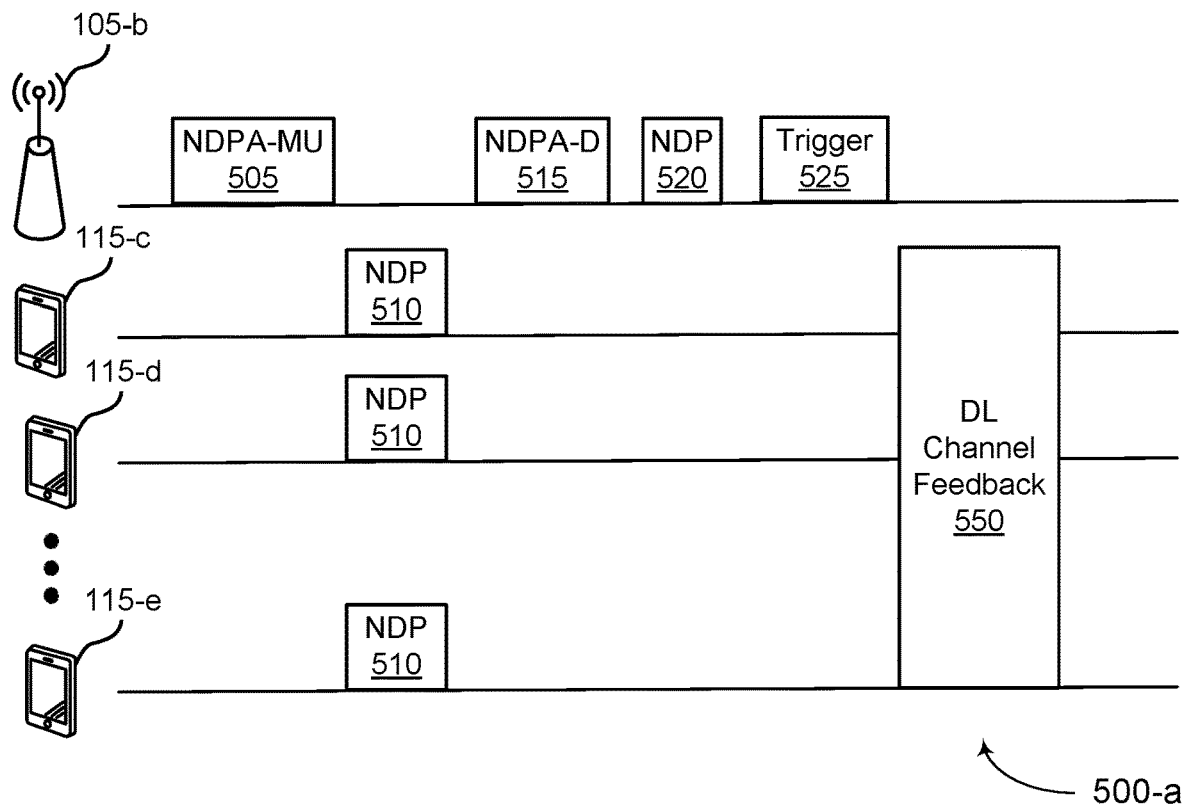
FIGS. 5A and 5B illustrate examples of implicit sounding calibration procedures that support NDP-based implicit sounding and calibration for a WLAN in accordance with aspects of the present disclosure.
Figure 5B:
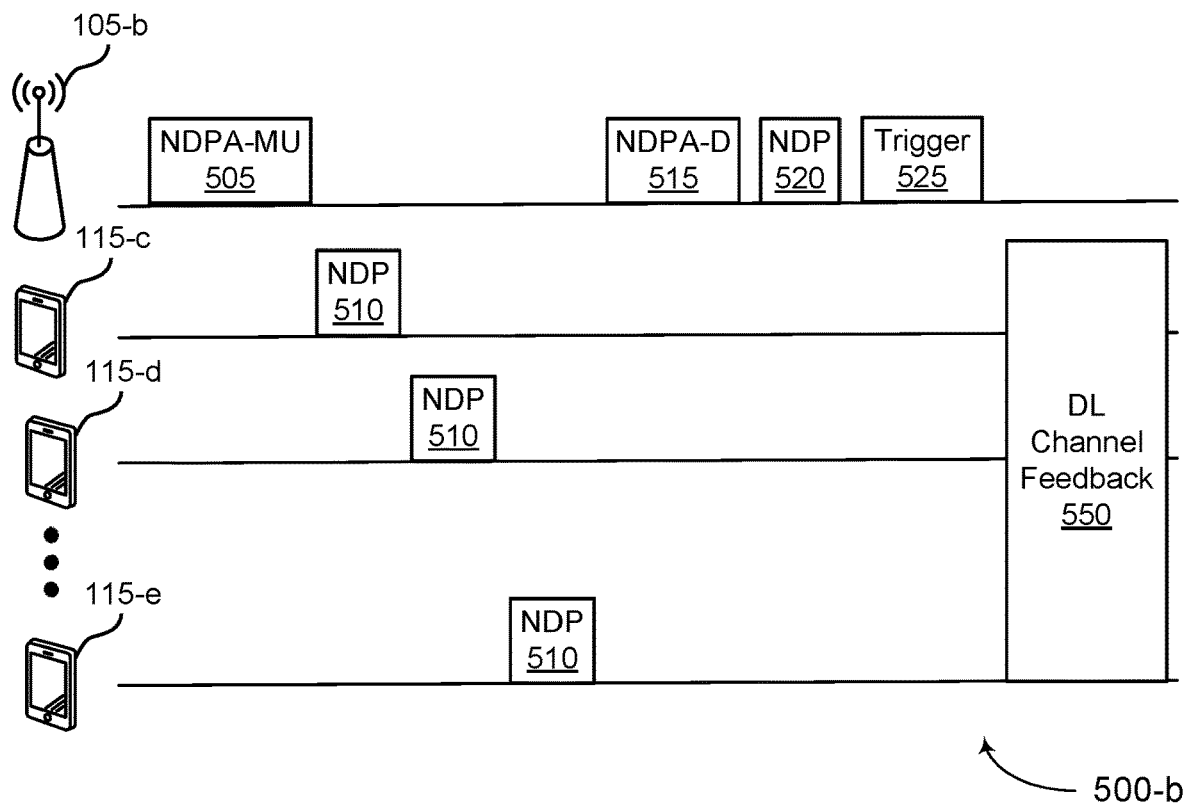

FIGS. 5A and 5B illustrate examples of implicit sounding calibration procedures 500-a and 500-b that support NDP based implicit sounding and calibration for a WLAN. The implicit sounding calibration procedures 500 may be performed by an AP 105-b, and at least STAs 115-c, 115-d, and 115-e may participate in the procedures. The implicit sounding calibration procedures 500-a or 500-b may be performed by the AP 105-b prior to initiating an implicit sounding procedure using an NDP-based protocol design. The implicit sounding calibration procedures 500 may include both an uplink MU NDPA transmission 505 (for example, an NDPA-MU) and a downlink NDP transmission (for example, an NDPA-D 515), an uplink NDP transmission 510, a downlink NDP transmission 520, a trigger frame 525, and a downlink channel feedback report 550. The AP 105-b may calibrate an effective downlink channel response to an effective uplink channel response based at least in part on uplink and downlink channel measurements of the uplink NDP transmission 510 and the downlink NDP transmission 520, to compensate for hardware differences associated with transmit chains and receive chains of the AP.

In some cases, as illustrated in the implicit sounding calibration procedure 500-a, the AP 105-b may initiate uplink MU sounding by which the AP 105-b may simultaneously receive a set of uplink NDP transmissions 510 from the STAs 115 via uplink MU-MIMO or distributed OFDMA. For example, the AP 105-b may transmit NDPA-MU 505 to one or more STAs 115, including STAs 115-c, 115-d, and 115-e, as part of an uplink MU sounding procedure. In some cases, NDPA-MU 505 may be configured (referred to as, calibration option 1) to include separate indications for MU and SU sounding within the frame structure. For example, in some cases the AP 105-b may configure the NDPA-MU 505 where a pair of bits within the sounding dialog token field of NDPA-MU 505 may contain indications for SU or MU sounding associated with EHT operation. In the case of sounding dialog token field design for 802.11ax systems, the AP 105-*b* may use the reserved bit (for example, B0) in the sounding token dialog field as well as a most significant bit (MSB) of the sounding dialog token number subfield (for example, B7). In the case of sounding dialog token field design for 802.11az systems, the AP 105-*b* may use a ranging bit (for example, B0) as well as a reserved bit (for example, B7) of the sounding dialog token field. Based on the indication, the AP 105-*b* may indicate, via a modified sounding dialog token field, indications for MU or SU sounding within NDPA-MU 505. In other cases, the AP 105-*b* may provide SU or MU sounding indication via the sounding dialog token field or a special STA info field of NDPA-MU 505.

Additionally, or alternatively, the AP 105-*b* may format NDPA-MU 505 to include a common info field. The common info field may be signaled as an explicit field within NDPA-MU 505 or as part of a special STA info field within NDPA-MU 505 or an extended sounding dialog token field, with a calibration bit in the common info field to indicate a common transmit/receive antenna. Additionally, or alternatively, the AP 105-*c* may extend one or more STA info fields of NDPA-MU 505 to be similar to a user info field of a trigger frame, with an extended bit allocation for uplink sounding indication.

The AP 105-*b* may remove one or more unnecessary subfields (for example, padding in a trigger frame) of the NDPA-MU 505 to reduce signaling overhead (such as, redundant fields) associated with implicit sounding calibration procedure 500-*a*. For example, as reproduced below, the AP 105-*c* may configure NDPA-MU 505 to include a common info field, and format the common info field according to table 500-*c* in FIG. 5C or table 500-*d* in FIG. 5D or both, in order to reduce field redundancy and signaling overhead.

As described, the AP 105-*b* may configure NDPA-MU 505 and cut off one or more redundant subfields of the transmission, including at least a trigger type subfield, an uplink length subfield, a more trigger frame subfield, an MU-MIMO LTF mode subfield, an uplink space time block coding subfield, a packet extension subfield, a spatial reuse subfield, and a doppler subfield. For example, by performing the configuration, the AP 105-*b* may reduce the total number of common information bits within NDPA-MU 505 to a range of approximately 29-33 bits.

Additionally, or alternatively, the AP 105-*b* may format the common info field of configured NDPA-MU 505 to include one or more new subfields for indication. For example, as reproduced below, the AP 105-*b* may format the common info field according to table 500-*e* in FIG. 5E, for additional indication.

The AP 105-*b* may extend one or more STA info fields of NDPA-MU 505 and remove one or more subfields, to reduce redundancy and signaling overhead. For example, as reproduced below, the AP 105-*b* may format the one or more STA info fields according to table 500-*f* in FIG. 5F, to reduce redundant subfields.

As described, the AP 105-*b* may configure NDPA-MU 505 and cut off one or more redundant subfields of the one or more STA info fields, including at least a feedback type subfield, a codebook size subfield, and a $N_C$ subfield to indicate the number of columns for compressed beamforming feedback. As detailed above, the AP 105-*b* may extend one or more STA info fields of NDPA-MU 505 to be similar to a user info field of a trigger frame, with an extended bit allocation for uplink sounding indication. For example, by performing the configuration, the AP 105-*b* may configure NDPA-MU 505 to include a total number of STA info bits of approximately 38 bits for calibration option 1. NDPA-MU 505 may prompt each of the STAs 115 to perform an uplink NDP transmission 510 as part of an uplink MU NDP transmission to the AP 105-*b*.

In some cases, one or more of the one or more STAs 115 may use a different number of radio chains for transmit operations relative to a number of radio chains for receive operations. The radio chain difference at the one or more STAs 115 may promote distortion to the implicit sounding calibration procedure 500-*a*. For example, STA 115-*c* may be configured to use 2 receive chains for reception operations and 1 transmit chain for transmit operation, including the uplink NDP transmission 510. The AP 105-*b* may have difficulty transforming the received uplink NDP transmission 510 from the single transmit antenna operated by STA 115-*c* to an accurate downlink channel estimate for the configured 2 receive antennas at STA 115-*c*. In resolution to the potential transmit chain/receive chain mismatch at the one or more STAs 115 (for example STA 115-*c*), NDPA-MU 505 may be configured to include a calibration bit indicating to the one or more STAs 115 (the beamformees) to use a single (that is, same) transmit/receive chain for the uplink and downlink sounding procedures of the implicit sounding calibration procedure 500-*a*. The single transmit/receive chain may be used by the STAs 115 for performing singular value decomposition (SVD) to generate feedback reporting (for example, the downlink channel feedback report 550). Further, NDPA-MU 505 may include scheduling information for the set of uplink NDP transmissions 510 by the STAs 115. Specifically, common information and per-info field user info fields of NDPA-MU 505 may include accommodation or scheduling indication for the uplink NDP transmission 510.

Each of STAs 115 may receive NDPA-MU 505 and perform uplink NDP transmission 510 for uplink MU sounding. NDP transmission by the STAs 115 (for example, at least STAs 115-*c*, 115-*d*, and 115-*e*) may be performed simultaneously as part of an MU NDP transmission according to uplink MU-MIMO or distributed OFDMA. For uplink MU-MIMO, the STAs 115 may share spatial streams for transmission of uplink NDP transmission 510. For distributed OFDMA, the STAs 115 may share frequency resources based on the AP 105-*b* interpolating channel measurements on difference subcarriers of a frequency bandwidth. The AP 105-*b* may receive the uplink NDP transmissions 510 from at least STAs 115-*c*, 115-*d*, and 115-*e* for uplink MU sounding procedure and measure the received set of uplink NDP transmissions 510. The AP 105-*b* may then perform uplink channel estimation based on the measurements and trigger a downlink sounding procedure.

In other cases, as illustrated in the implicit sounding calibration procedure 500-*b*, the AP 105-*b* may initiate uplink MU sounding by which the AP 105-*b* may receive the set of uplink NDP transmissions 510 from the STAs 115 sequentially as multiple SU NDP transmissions. For example, the AP 105-*b* may transmit the NDPA-MU 505 to one or more STAs 115, including STAs 115-*c*, 115-*d*, and 115-*e*, as part of an uplink MU sounding procedure. In some cases, NDPA-MU 505 may be configured to include separate indications for MU and SU sounding within the frame structure. For example, in some cases the AP 105-*b* may configure the NDPA-MU 505 such that a pair of bits within the sounding dialog token field of NDPA-MU 505 may contain indications for SU or MU sounding associated with EHT operation. In other cases, the AP 105-*b* may provide SU or MU sounding indication via the sounding dialog token field or a special STA info field of NDPA-MU 505. Additionally, or alternatively, the AP 105-*b* may format NDPA-MU 505 to include a common info field. The common info field may be signaled as an explicit field within NDPA-MU 505 or as part of a special STA info field within NDPA-MU 505. For example, the AP 105-*b* may extend one or more STA info fields of NDPA-MU 505 to be similar to a user info field of a trigger frame, with an extended bit allocation for uplink sounding indication. The NDPA-MU 505 may prompt each of the STAs 115 to perform an uplink NDP transmission 510 as part of sequential SU NDP transmissions to AP 105-*b*.

As detailed with refence to the implicit sounding calibration procedure 500-*a*, in some cases, one or more of the one or more STAs 115 may use a different number of radio chains for transmit operations relative to a number of radio chains for receive operations. In resolution to the potential transmit chain/receive chain mismatch at the one or more STAs 115, the NDPA-MU 505 may be configured to include a calibration bit indicating to the one or more STAs 115 (for example, the beamformees) to use a single (that is, same) transmit/receive chain for the uplink and downlink sounding procedures of the implicit sounding calibration procedure 500-*b*. The single transmit/receive chain may be used by the STAs 115 for performing SVD to generate feedback reporting (for example, the downlink channel feedback report 550). Further, the NDPA-MU 505 may include scheduling information for the set of uplink NDP transmissions 510 by the STAs 115.

Each of the STAs 115 may receive the NDPA-MU 505 and perform the uplink NDP transmission 510 for uplink MU sounding. NDP transmission by the STAs 115 (for example, at least STAs 115-*c*, 115-*d*, and 115-*e*) may be performed sequentially based on the scheduling information of the NDPA-MU 505. For example, STA 115-*c* may first perform an uplink NDP transmission 510 as a SU NDP transmission, followed by an uplink NDP transmission 510 by STA 115-*d* and an uplink NDP transmission 510 transmitted by STA 115-*e*. Each of the SU NDP transmissions may be separated by a short interframe space (SIFs) duration. In some cases, sequential SU NDP transmission for uplink MU sounding procedure may promote a larger temporal gap for uplink MU sounding in comparison to synchronous transmission (for example, uplink MU-MIMO or uplink OFDMA), particularly for a multiple STAs 115.

Following sequential SU NDP transmission by the STAs 115, the AP 105-*b* may receive the uplink NDP transmissions 510 in sequential order and perform uplink measurement. The AP 105-*b* may then perform uplink channel estimation based on the measurements and trigger a downlink sounding procedure.

For each of implicit sounding calibration procedures 500-*a* and 500-*b*, the AP 105-*b* may perform triggered downlink sounding procedure with the participating beamformees (for example, at least STAs 115-*c*, 115-*d*, 115-*e*). The AP 105-*b* may transmit NDPA-D 515 to the STAs 115, prompting measurement of subsequent downlink NDP transmission 520. NDPA-D 515 may be configured to include a calibration bit indicating to the one or more STAs 115 to use a single (that is, same) transmit/receive chain for the uplink and downlink sounding procedures. The single transmit/receive chain may be used by the STAs 115 for performing SVD to generate feedback reporting (for example, the downlink channel feedback report 550). Following transmission of NDPA-D 515, AP 105-*b* may perform the downlink NDP transmission 520 to the STAs 115 for downlink channel measurement.

Each of STAs 115-*c*, 115-*d*, and 115-*e* may receive the NDPA-D 515 and the downlink NDP transmission 520 from the AP 105-*b* and perform measurement of the downlink NDP transmission 520 for downlink channel measurement. The STAs 115 may then receive a trigger frame 525 from the AP 105-*b* for initiating transmission of downlink channel feedback reports 550. The trigger frame 525 may be configured to include one or more bits to indicate calibration procedure. Additionally, or alternatively, the trigger frame 525 may include one or more additional bits to indicate implicit sounding. Based on the trigger frame 525, the STAs 115 may transmit a downlink channel feedback report 550, as CBF. The downlink channel feedback report 550 may be uplink MU-MIMO or OFDMA transmissions and may include downlink channel information as determined from the measurements of the downlink NDP transmission 520 (or the downlink channel feedback reports 550 may include the measurement information). The AP 105-*b* may receive the downlink channel feedback reports 550 and process the included measurement information. The AP 105-*b* may then estimate the downlink channel based on the measurement information. The AP 105-*b* may calibrate an effective downlink channel response to an effective uplink channel response based at least in part on uplink and downlink channel estimations, to compensate for hardware differences associated with transmit chains and receive chains of the AP 105-*b*.

In some cases, one or more STAs 115 of the one or more STAs may have a power mismatch with the AP 105-*b* for performing the implicit sounding calibration procedures 500. In particular, the AP 105-*b* may use a downlink transmit power per antenna or LTF for downlink sounding that is disparate from the uplink transmit power per antenna or LTF for the one or more STAs 115, such as STA 115-*d*.

For example, the AP 105-*b* may support 8 transmit antennas for downlink sounding transmission over 8 LTFs. STA 115-*d* may support 2 transmit antennas for uplink NDP transmission over 2 LTFs. As such, each uplink receive antenna may estimate a 2×1 channel for uplink transmission by STA 115-*d* through the 2 LTFs, corresponding to a 2P transmit power. Each downlink receive antenna may estimate an 8×1 channel for downlink transmission by the AP 105-*b* through the 8 LTFs, corresponding to an 8P transmit power. As described, P may denote a per-transmit-chain power at the AP 105-*b* and STA 115-*d*. Based on the disparity in per-transmission-chain power between AP 105-*b* and STA 115-*d*, a power mismatch in channel estimation quality may be present.

In some cases, the AP 105-*b* may transmit power control information to each of the one or more STAs 115 of the power mismatch (for example, STA 115-*d*). The AP 105-*b* may transmit the power control information as a bit indication in NDPA transmission (for example, NDPA-MU 505, NDPA-D 515) or as a separate message. The AP 105-*b* may configure the transmit power control information to boost the per-transmit-chain power for uplink transmission of the set of uplink NDP transmissions 510 or the feedback report 550. The configuration may specify that a total transmit power of the one or more STAs 115 matches the total transmit power of the AP 105-*b*. Each of the one or more STAs 115 may receive the transmit control information and reduce power backoff at the power amplifier, increasing output.

In other cases, the AP 105-*b* may transmit power mismatch control information to each of the one or more STAs 115 of the power mismatch (for example, STA 115-*d*). The AP 105-*b* may transmit the power control information as a bit indication in an NDPA transmission (for example, NDPA-MU 505, NDPA-D 515) or as a separate message. The AP 105-*b* may configure the transmit power mismatch control information to include an indication to transmit additional LTF symbols in the header for transmissions of the uplink NDP transmissions 510 or downlink channel feedback reports 550. For example, the power mismatch control information may include one or more of an LTF symbol repetition factor, a total number of spatial streams that may be implemented by the one or more STAs 115, or a number of LTF symbols that the one or more STAs 115 may include in excess of supported spatial streams. Additional LTF symbols may permit increased redundancy for the set of uplink NDP transmissions 510 or downlink channel feedback reports 550, to compensate for the power mismatch.

In some cases, increasing the per-transmit-chain power may introduce distortion to signal transmission by the one or more STAs 115, and potentially violate EVM requirements for channel estimation (that is, minimum acceptable modulation and coding scheme (MCS) accuracy of the transmitter for uplink transmission at the STAs 115). As such, the AP 105-*b* may configure the transmit control information to maintain EVM as part of increasing the per-transmit-chain power at the STAs 115. For example, the EVM control information may contain one or more of a MCS in conformance with the EVM requirement, an EVM parameter, a power backoff parameter, or a target received signal strength indicator (RSSI). In addition, as illustrated, the AP 105-*b* may separate the procedure for NDP sounding (for example, receiving the set of uplink NDP transmissions 510, and performing downlink NDP transmission 520) from the downlink channel feedback (for example, CBF) 520 to support channel estimation EVM control (that is, due to NDP having different EVM requirements than CBF, as CBF may be transmitted with a lower backoff power to enhance decoding success).

As disclosed herein, the AP 105-*b* may perform uplink MU sounding for implicit sounding calibration procedures 500-*a* and 500-*b* prior to the triggered downlink sounding (for example, NDPA-D 515 and downlink NDP transmission 520) and reception of the downlink channel feedback reports 550. In other cases, the AP 105-*b* may perform the uplink MU sounding following the triggered downlink sounding. The AP 105-*b* may initiate the implicit sounding calibration procedure within a limited temporal duration, to reduce OTA channel variation.

Figure 6A:
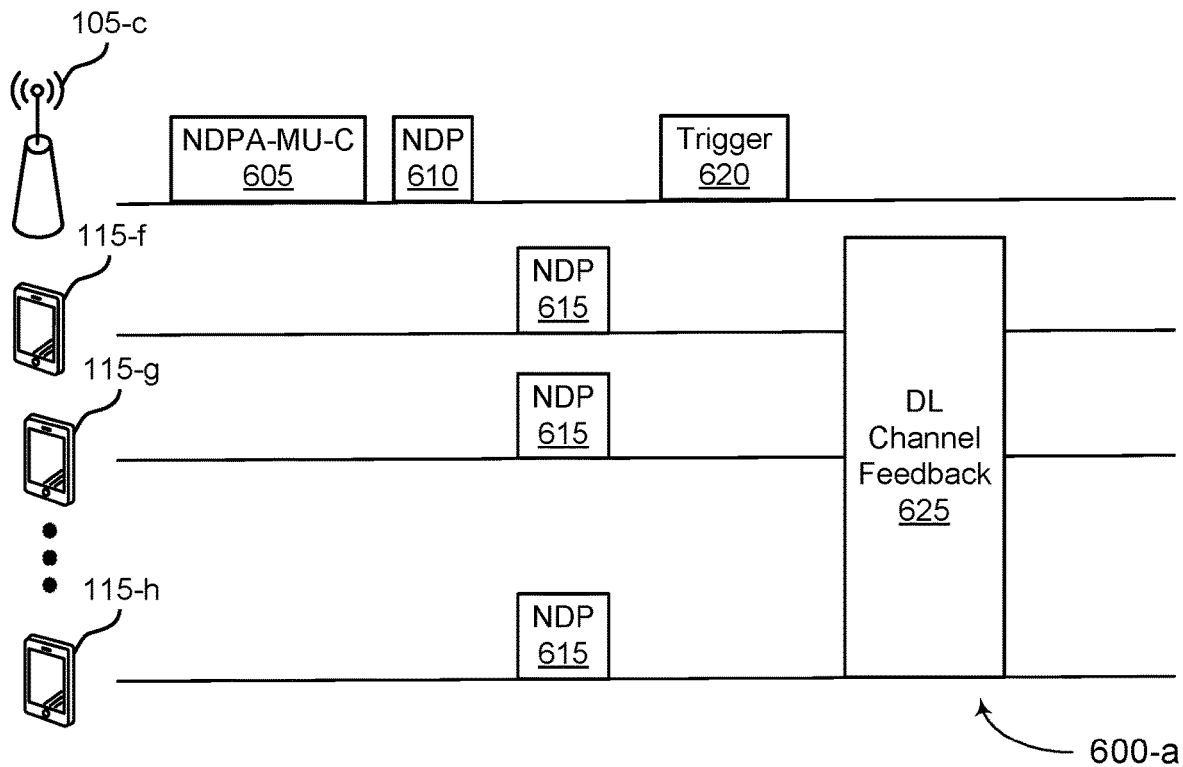
FIGS. 6A and 6B illustrate examples of implicit sounding calibration procedures that support NDP-based implicit sounding and calibration for a WLAN in accordance with aspects of the present disclosure.
Figure 6B:
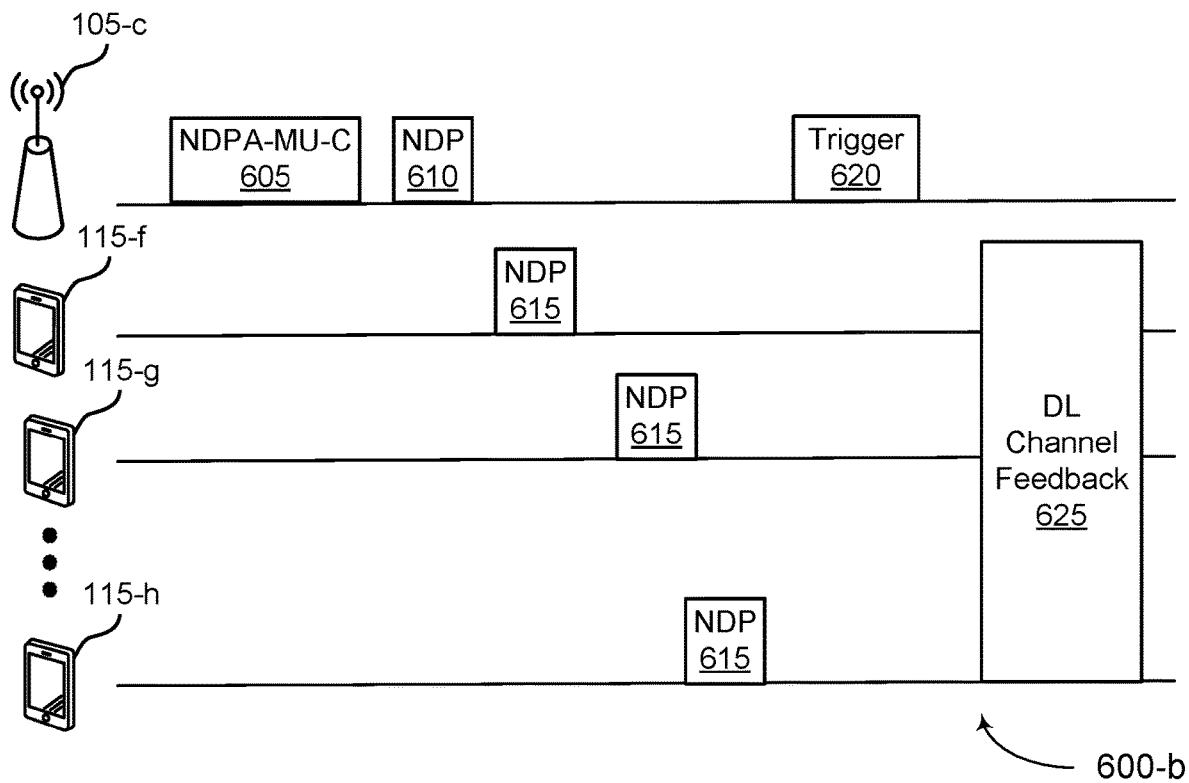

FIGS. 6A and 6B illustrate examples of implicit sounding calibration procedures 600-*a* and 600-*b* that support NDP based implicit sounding and calibration for a WLAN. The implicit sounding calibration procedures 600 may be performed by an AP 105-*c*, and at least STAs 115-*f*, 115-*g*, and 115-*h* may participate in the procedures. Implicit sounding calibration procedures 600-*a* and 600-*b* may describe variants to implicit sounding calibration procedures 500-*a* and 500-*b*, as described with reference to FIGS. 5A and 5B.

The implicit sounding calibration procedures 600-*a* or 600-*b* may be performed by the AP 105-*c* prior to initiating an implicit sounding procedure using an NDP-based protocol design. The implicit sounding calibration procedures 600 may include a combined MU NDPA transmission (for example, NDPA-MU-C 605), a downlink NDP transmission 610, an uplink NDP transmissions 615, a trigger frame 620, and a downlink channel feedback report 625. Combining NDPA-MU and NDPA-D transmissions into NDPA-MU-C 605 may reduce signaling overhead and improve efficiency for implicit sounding calibration on a channel. The AP 105-*b* may calibrate an effective downlink channel response to an effective uplink channel response based at least in part on uplink and downlink channel measurements of the downlink NDP transmission 610 and the uplink NDP transmission 615, to compensate for hardware differences associated with transmit chains and receive chains of the AP.

For example, as illustrated in the implicit sounding calibration procedure 600-*a* of FIG. 6A, the AP 105-*c* may transmit NDPA-MU-C 605 to one or more STAs 115, including at least STAs 115-*f*, 115-*g*, and 115-*h*. In some cases, The NDPA-MU-C 605 may be configured (referred to as, calibration option 2) to include separate indications for MU and SU sounding within the frame structure. In other cases, the AP 105-*c* may provide SU or MU sounding indication via a modified sounding dialog token field or a special STA info field of the NDPA-MU-C 605. Additionally, or alternatively, the AP 105-*c* may format NDPA-MU-C 605 to include a common info field. The common info field may be signaled as an explicit field within NDPA-MU-C 605 or as part of a special STA info field within NDPA-MU-C 605 or an extended sounding token dialog field, with a calibration bit in a common info field to indicate a common transmit/receive antenna. Additionally, or alternatively, the AP 105-*c* may extend one or more STA info fields of NDPA-MU-C 605 to be similar to a user info field of a trigger frame, with an extended bit allocation for uplink sounding indication.

The AP 105-*c* may remove one or more unnecessary subfields (for example, padding of a trigger frame) of the NDPA-MU-C 605 to reduce signaling overhead (such as, redundant fields) associated with implicit sounding calibration procedure 600-*a*. For example, as reproduced below, the AP 105-*c* may configure NDPA-MU-C 605 to include a common info field, and format the common info field according to table 600-*c* in FIG. 6C or table 600-*d* in FIG. 6D or both, in order to reduce field redundancy and signaling overhead.

As described, the AP 105-*c* may configure NDPA-MU-C 605 and cut off one or more redundant subfields of the transmission, including at least a trigger type subfield, an uplink length subfield, a more trigger frame subfield, a MU-MIMO LTF mode subfield, an uplink space time block coding subfield, a packet extension subfield, a spatial reuse subfield, and a doppler subfield. For example, by performing the configuration, the AP 105-*c* may reduce the total number of common information bits within NDPA-MU-C 605 to a range of approximately 29-33 bits.

Additionally, or alternatively, the AP 105-*c* may format the common info field of configured NDPA-MU-C 605 to include one or more new subfields for indication. For example, as reproduced below, the AP 105-*c* may format the common info field according to table 600-*e* in FIG. 6E, for additional indication.

As described, the AP 105-*c* may configure NDPA-MU-C 605 and include one or more new fields including a power mismatch control subfield and a calibration indication subfield. In some cases, the common info field may include an EVM control subfield. In other cases, the EVM control subfield may be included in the per user information subfield. The one or more new subfields may include indication and support for uplink MU sounding as part of the implicit sounding calibration procedure 600-*a*.

The AP 105-c may extend one or more STA info fields of NDPA-MU-C 605 and remove one or more subfields, to reduce redundancy and signaling overhead. For example, as reproduced below, the AP 105-c may format the one or more STA info fields according to table 600-f in FIG. 6F, to reduce redundant subfields.

As described, the AP 105-c may configure NDPA-MU-C 605 and cut off one or more redundant subfields of the one or more STA info fields, including at least a feedback type subfield, a codebook size subfield, and a $N_C$ subfield to indicate the number of columns for compressed beamforming feedback. As detailed above, the AP 105-c may extend one or more STA info fields of NDPA-MU-C 605 to be similar to a user info field of a trigger frame, with an extended bit allocation for uplink sounding indication. For example, by performing the configuration, the AP 105-c may configure NDPA-MU-C 605 to include a total number of STA info bits of approximately 38 bits for calibration option 2.

Following configuration and transmission of the NDPA-MU-C 605 to the one or more STAs 115, the NDPA-MU-C 605 may prompt the AP 105-c to perform a downlink NDP transmission 610 to the one or more STAs 115 for downlink channel measurement followed by reception of the set of uplink MU NDPs 615. Additionally, the NDPA-MU-C 605 may prompt the one or more STAs 115 to transmit an uplink NDP transmission 615 to the AP 105-c simultaneously as MU NDP transmission followed by reception of NDP transmission 610. The AP 105-c may simultaneously receive a set of uplink NDP transmissions 615 from the STAs 115 via uplink MU-MIMO or distributed OFDMA.

The AP 105-c may measure the set of uplink NDP transmissions 615 for uplink channel estimation, and transmit a trigger frame 620 to the one or more STAs. The trigger frame 620 may be configured to include one or more bits to indicate calibration procedure. Additionally, or alternatively, the trigger frame 620 may include one or more additional bits to indicate implicit sounding. Based on the trigger frame 620, the STAs 115 may transmit a downlink channel feedback report 625, as CBF. The downlink channel feedback report 625 may be uplink MU-MIMO or OFDMA transmissions and may include downlink channel information as determined from the measurements of the downlink NDP transmission 610 (or the downlink channel feedback reports 625 may include the measurement information). The AP 105-c may receive the downlink channel feedback reports 625 and process the included measurement information. The AP 105-c may then estimate the downlink channel based on the measurement information.

In other examples, as illustrated in the implicit sounding calibration procedure 600-b of FIG. 6B, the AP 105-c may transmit NDPA-MU-C 605 to one or more STAs 115, including at least STAs 115-f, 115-g, and 115-h. The NDPA-MU-C 605 may be configured (referred to as, calibration option 2) for uplink sounding procedure associated with uplink MU indication. In some cases, the AP 105-c may format NDPA-MU-C 605 to include a common info field. The common info field may be signaled as an explicit field within NDPA-MU-C 605 or as part of a special STA info field within NDPA-MU-C 605. For example, the AP 105-c may extend one or more STA info fields of NDPA-MU-C 605 to be similar to a user info field of a trigger frame, with an extended bit allocation for uplink sounding indication. As described, with reference to the one or more tables provided for implicit sounding calibration procedure 600-a, the AP 105-c may remove one or more redundant subfields of the common info field or STA info field within NDPA-MU-C 605. Additionally, or alternatively, AP 105-c may add one or more new fields. Based on the configuration, the common info field may be formatted to include approximately a range of 29-33 bits and the total STA info bits may be approximately 38 bits within NDPA-MU-C 605.

Following configuration and transmission of the NDPA-MU-C 605 to the one or more STAs 115, NDPA-MU-C 605 may prompt the AP 105-c to perform a downlink NDP transmission 610 to the one or more STAs 115 for downlink channel measurement followed by reception of the set of uplink NDPs 615. Additionally, NDPA-MU-C 605 may prompt the one or more STAs 115 to transmit the set of uplink NDP transmissions 615 to the AP 105-c sequentially as multiple SU NDP transmissions, based on the scheduling information of NDPA-MU-C 605, followed by reception of downlink NDP transmission 610. For example, STA 115-f may first perform an uplink NDP transmission 615 as a SU NDP transmission, followed by an uplink NDP transmission 615 by STA 115-g and an uplink NDP transmission 615 by STA 115-h. Each of the SU NDP transmissions may be separated by a SIFs duration. In some cases, the order of NDP 610 and the set of uplink NDPs 615 may be switched.

The AP 105-c may measure the set of uplink NDP transmissions 615 for uplink channel estimation, and transmit a trigger frame 620 to the one or more STAs. Based on trigger frame 620, the STAs 115 may transmit a downlink channel feedback report 625, as CBF. The downlink channel feedback report 625 may be uplink MU-MIMO or OFDMA transmissions and may include downlink channel information as determined from the measurements of the downlink NDP transmission 610. The AP 105-b may receive the downlink channel feedback reports 625 and process the included measurement information. The AP 105-b may then estimate the downlink channel based on the measurement information.

Figure 7A:
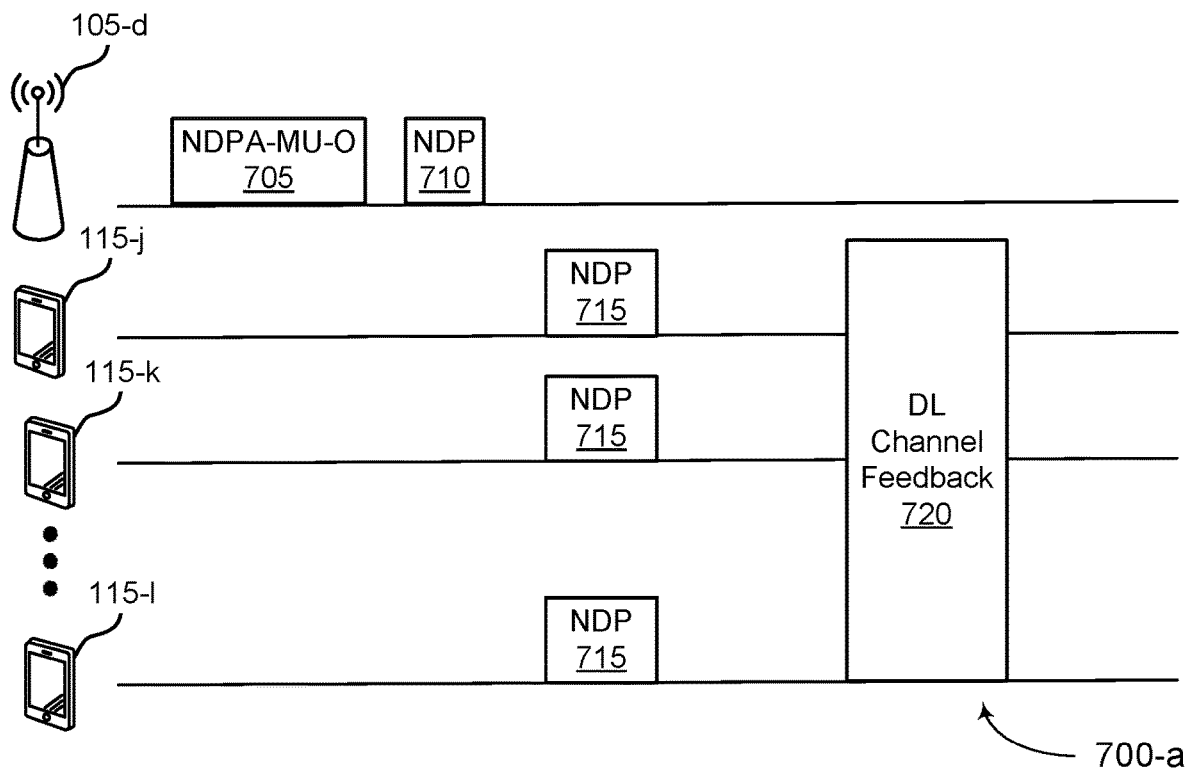
FIGS. 7A and 7B illustrate examples of implicit sounding calibration procedures that support NDP-based implicit sounding and calibration for a WLAN in accordance with aspects of the present disclosure.
Figure 7B:
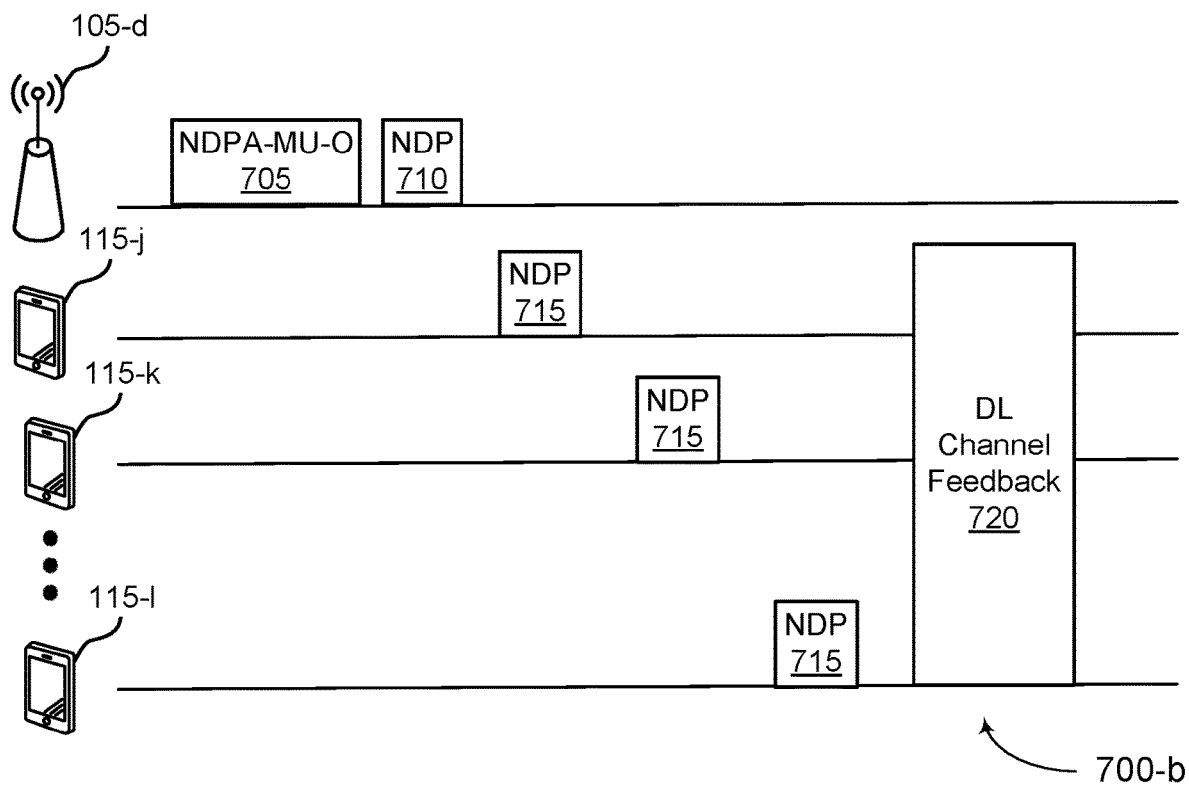

FIGS. 7A and 7B illustrate examples of implicit sounding calibration procedures 700-a and 700-b that support NDP based implicit sounding and calibration for a WLAN. The implicit sounding calibration procedures 700 may be performed by an AP 105-d, and at least STAs 115-j, 115-k, and 115-1 may participate in the procedures. Implicit sounding calibration procedures 700-a and 700-b may describe variants to implicit sounding calibration procedures 500-a and 500-b, as well as implicit sounding calibration procedures 600-a and 600-b, as described with reference to FIGS. 5A, 5B, 6A, and 6B.

The implicit sounding calibration procedures 700-a or 700-b may be performed by the AP 105-d prior to initiating an implicit sounding procedure using NDP based protocol design. The implicit sounding calibration procedures 700 may include a combined trigger frame containing NDPA transmission (for example, an NDPA-MU-O 705), downlink NDP transmission 710, uplink NDP transmissions 715, and a downlink channel feedback report 720 for downlink channel measurement. In some cases, The NDPA-MU-O 705 may be configured (referred to as, calibration option 3) to include separate indications for MU and SU sounding within the frame structure. In other cases, the AP 105-d may provide SU or MU sounding indication via a modified sounding dialog token field or a special STA info field of the NDPA-MU-O 705 or an extended sounding token dialog field, with a calibration bit a in a common info field to indicate a common transmit/receive antenna. In some cases, the AP 105-d may format the common info field of the combined trigger frame within NDPA-MU-O 705. Additionally, or alternatively, the AP 105-c may format the NDPA-MU-O 705 and extend one or more STA info fields (for example, of an included NDPA frame) of the combined trigger frame or configure one or more user info fields of the combined trigger frame for uplink sounding indication.

The AP 105-d may remove one or more unnecessary subfields (for example, padding of a trigger frame) of the NDPA-MU-O 705 to reduce signaling overhead (such as, redundant fields) associated with implicit sounding calibration procedure 700-a. For example, as reproduced below, the AP 105-d may format the common info field of the combined trigger frame according to table 700-c in FIG. 7C or table 700-d in FIG. 7D or both, in order to reduce field redundancy and signaling overhead.

As described, the AP 105-d may configure NDPA-MU-O 705 and cut off one or more redundant subfields of the transmission, including at least a trigger type subfield, a more trigger frame subfield, a MU-MIMO LTF mode subfield, an uplink space time block coding subfield, a packet extension subfield, a spatial reuse subfield, and a doppler subfield. For example, by performing the configuration, the AP 105-d may reduce the total number of common information bits within NDPA-MU-O 705 to a range of approximately 41-45 bits.

Additionally, or alternatively, the AP 105-d may format the common info field of configured NDPA-MU-O 705 to include one or more new subfields for indication. For example, as reproduced below, the AP 105-d may format the common info field according to table 700-e in FIG. 7E, for additional indication.

As described, the AP 105-d may configure NDPA-MU-O 705 and include one or more new fields including a power mismatch control subfield and a calibration indication subfield. In some cases, the common info field may include an EVM control subfield. In other cases, the EVM control subfield may be included in the per user information subfield. The one or more new subfields may include indication and support for uplink MU sounding as part of the implicit sounding calibration procedure 700-a.

The AP 105-d may format one or more user info fields of the combined trigger frame of NDPA-MU-O 705 and remove one or more subfields, to reduce redundancy and signaling overhead. For example, as reproduced below, the AP 105-d may format the one or more user info fields according to table 700-f in FIG. 7F, to reduce redundant subfields.

As described, the AP 105-d may configure NDPA-MU-O 705 and cut off one or more redundant subfields of the one or more STA info fields, including at least a coding type subframe and a dual subcarrier modulation (DCM) subframe. As detailed above, the AP 105-c may configure NDPA-MU-O 705 include a formatted combined trigger frame containing a common info field, one or more user info fields, and one or more STA info fields. For example, by performing the configuration, the AP 105-c may configure NDPA-MU-O 705 to include a total number of STA info bits of approximately 44 bits for calibration option 3.

Following configuration and transmission of the NDPA-MU-C 605 to the one or more STAs 115, the NDPA-MU-O 705 may prompt the AP 105-c to perform a downlink NDP transmission 710 to the one or more STAs 115 for downlink channel measurement. Additionally, the NDPA-MU-O 705 may prompt the one or more STAs 115 to transmit an uplink NDP transmission 715 to the AP 105-c simultaneously as an MU NDP transmission or sequentially as multiple SU NDP transmissions. NDPA-MU-O 705 may trigger the STAs 115 to transmit the downlink channel feedback report 720, as CBF. The downlink channel feedback report 720 may be uplink MU-MIMO or OFDMA transmissions and may include downlink channel information as determined from the measurements of the downlink NDP transmission 710.

The NDPA-MU-O 705 may reduce signaling overhead and improve efficiency for implicit sounding calibration on a channel, by minimizing the temporal gap between downlink channel estimation and uplink channel estimation for implicit sounding calibration procedure. In some cases, the order of downlink NDP 710 and the set of one or more uplink NDPs 715 may be switched. The AP 105-d may calibrate an effective downlink channel response to an effective uplink channel response based at least in part on uplink and downlink channel measurements, to compensate for hardware differences associated with transmit chains and receive chains of the AP.

Figure 8A:
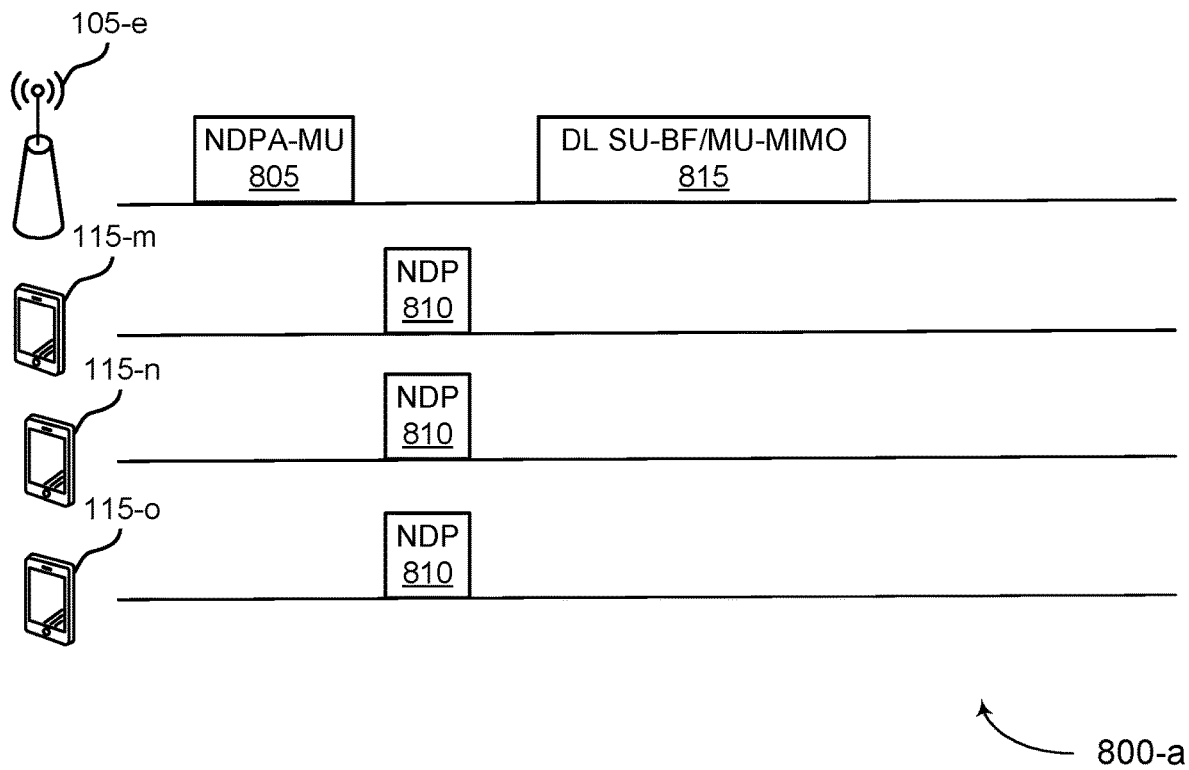
FIGS. 8A and 8B illustrate examples of implicit sounding procedures that support NDP-based implicit sounding and calibration for a WLAN in accordance with aspects of the present disclosure.
Figure 8B:
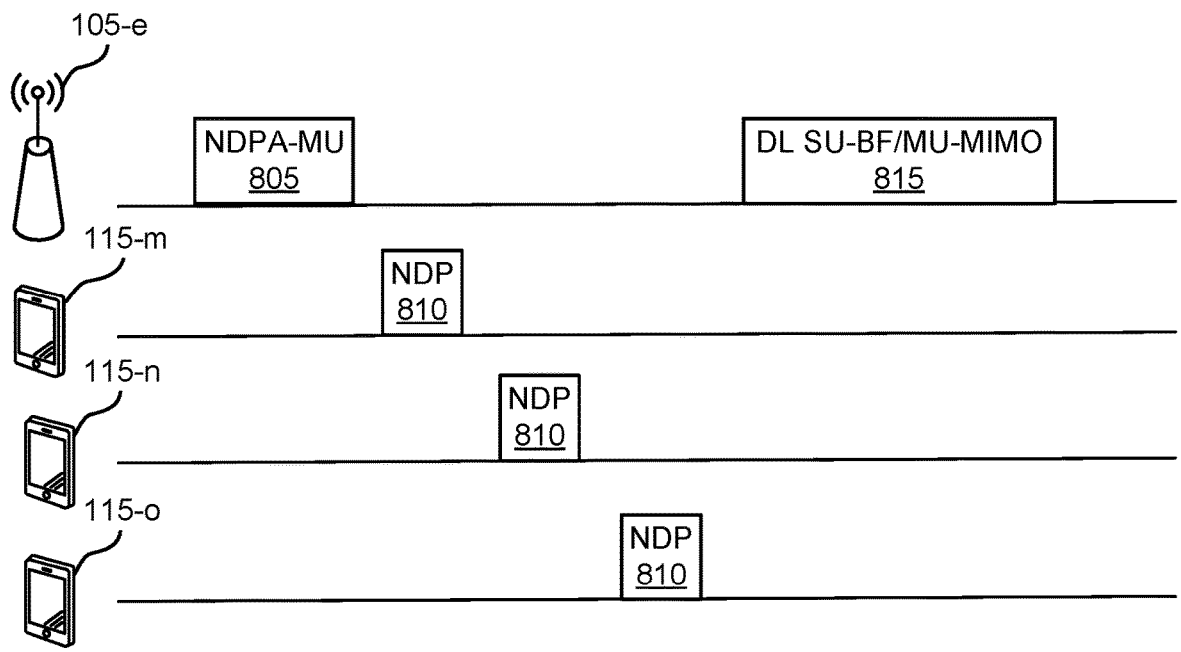

FIGS. 8A and 8B illustrate examples of implicit sounding procedures 800-a and 800-b that support NDP based implicit sounding and calibration for a WLAN. The implicit sounding procedures 800 may be performed by an AP 105-e, and at least STAs 115-m, 115-n, and 115-o may participate in the procedures. The implicit sounding procedures 800-a or 800-b may be performed by the AP 105-e following an implicit sounding calibration procedure, as described with reference to FIGS. 5-7. The implicit sounding procedures 800 may include an uplink MU NDPA transmission (for example, NDPA-MU 805), uplink NDP transmissions 810, and downlink data transmission 815 (that is, as SU-BF or MU-MIMO). In some cases, NDPA-MU 805 may be configured to include separate indications for MU and SU sounding within the frame structure. For example, in some cases the AP 105-e may configure the NDPA-MU 805 such that a pair of bits within the sounding dialog token field of NDPA-MU 805 may contain indications for SU or MU sounding associated with EHT operation. In other cases, the AP 105-e may provide SU or MU sounding indication via the sounding dialog token field or a special STA info field of NDPA-MU 805. Additionally, or alternatively, the AP 105-e may format NDPA-MU 805 to include a common info field. The common info field may be signaled as an explicit field within NDPA-MU 805 or as part of a special STA info field within NDPA-MU 805. For example, the AP 105-e may extend one or more STA info fields of NDPA-MU 805 to be similar to a user info field of a trigger frame, with an extended bit allocation for uplink sounding indication.

The AP 105-e may transmit NDPA-MU 805 to the one or more STAs 115 and receive the set of uplink NDP transmissions 810 by the one or more STAs 115 in response. The AP 105-e may then estimate the uplink channel based on measuring the received uplink NDP transmissions 810. The AP 105-e may mirror the estimated uplink channel for reciprocal downlink channel estimation and precoding generation. Upon determining the channel estimation, The AP 105-e may perform the downlink data transmission 815 that is precoded based on the channel estimation.

In some cases, as illustrated in the implicit sounding procedure 800-a of FIG. 8A, the AP 105-e may initiate uplink MU sounding by which the AP 105-e may simultaneously receive a set of uplink NDP transmissions 810 from the STAs 115 via uplink MU-MIMO or distributed OFDMA. For example, AP 105-e may transmit NDPA-MU 805 to one or more STAs 115, including STAs 115-m, 115-n, and 115-0, as part of an uplink MU implicit sounding procedure. The NDPA-MU 805 may prompt each of the STAs 115 to transmit an uplink NDP transmission 810 as part of an uplink MU NDP transmission to AP 105-e. The NDPA-MU 805 may include scheduling information for the set of uplink NDP transmissions 810 by the STAs 115.

As part of the uplink MU sounding procedure, the AP 105-e may configure uplink signaling at the one or more STAs 115 based on potential transmit chain/receive chain mismatch at the one or more STAs 115. The AP 105-e may receive from each of the one or more STAs 115 a radio parameter including at least one of a maximum number of spatial streams supported by each STA 115 for implicit sounding, a number of common transmit/receive chains for implicit sounding, or a bitmap indication of a number of transmit antennas and a number of receive antennas by each STA 115. Based on the reception, the AP 105-e may indicate in an NDPA-MU 805 to perform an uplink NDP transmission 810 over the same number of spatial streams as configured transmit chains supported.

For example, in some cases, the number of transmit chains at each of the one or more STAs 115 may be equal to the number of receive chains at the respective STAs 115. The number of spatial streams used by the one or more STAs 115 for uplink transmission would be equal to the number of spatial streams received by each of the one or more STAs 115 over the implicit sounding procedure, and transmit chain/receive chain mismatch would not be present.

In other cases, one or more of the one or more STAs 115 may use a different number of radio chains for transmit operations relative to a number of radio chains for receive operations. The radio chain difference at the one or more STAs 115 may promote distortion to the implicit sounding procedure 800-a of FIG. 8A based on the transmit chain/receive chain mismatch at the one or more STAs 115.

For example, at least one of the one or more STAs 115 (for example, STA 115-m) may use fewer transmit chains than receive chains. The AP 105-e may compute a precoding matrix for downlink beamformed signaling based on the uplink NDP transmission 810 from transmit antennas of STA 115-m. The additional receive antennas at STA 115-m may improve receive diversity at STA 115-m and may be implemented to perform MU interference nulling based on difference in LTF symbol reception for messages received at STA 115-m.

In other examples, at least one of the one or more STAs 115 (for example, STA 115-n) may use more transmit chains than receive chains. Because STA 115-n supports greater receive granularity than transmit granularity for implicit sounding, AP 105-e may not be capable of computing the complete channel response ($H_{UL}$) for the uplink channel and the complete channel response ($H_{DL}$) for the downlink channel. In resolution to the transmit chain/receive chain mismatch at STA 115-n, the AP 105-e may configure one or more new capability bits for implicit sounding in NDPA-MU 805. The one or more new capability bits may indicate to the one or more STAs 115, including STA 115-n, to perform uplink sounding procedure using common transmit/receive chains for transmission and reception (for example, so long as the maximum number of spatial streams is at least as large as the number of spatial streams for implicit sounding and the number of spatial streams for implicit sounding is at least as large as the number of spatial streams for beamforming). The AP 105-e may use the number of common transmit/receive chains to determine a number of spatial streams and LTFs for reception of the uplink NDP transmission 810.

Each of the one or more STAs 115 may receive NDPA-MU 805 and perform uplink NDP transmission 810 for uplink MU sounding. NDP transmission by the STAs 115 (for example, at least STAs 115-m, 115-n, and 115-o) may be performed simultaneously as part of an MU NDP transmission according to uplink MU-MIMO or distributed OFDMA. For uplink MU-MIMO, the STAs 115 may share spatial streams for the set of uplink NDP transmissions 810. For distributed OFDMA, the STAs 115 may share frequency resources based on AP 105-e interpolating channel measurements on difference subcarriers of a frequency bandwidth. The AP 105-e may receive the uplink NDP transmissions 810 from at least STAs 115-m, 115-n, and 115-o for uplink MU sounding procedure and measure the received uplink NDP transmissions 810. The AP 105-b may then perform uplink channel estimation based on the measurements and mirror the estimated uplink channel for reciprocal downlink channel estimation and precoding generation.

In other cases, as illustrated in the implicit sounding procedure 800-b of FIG. 8B, the AP 105-e may initiate uplink MU sounding by which the AP 105-e may receive the set of uplink NDP transmissions 810 from the STAs 115 sequentially as multiple SU NDP transmissions. For example, the AP 105-e may transmit NDPA-MU 805 to one or more STAs 115, including STAs 115-m, 115-n, and 115-o, as part of an uplink MU sounding procedure. NDPA-MU 805 may prompt each of the STAs 115 to perform an uplink NDP transmission 810 as part of sequential SU NDP transmissions to the AP 105-e.

As detailed with refence to the implicit sounding procedure 800-a of FIG. 8A, in some cases, one or more of the one or more STAs 115 may use a different number of radio chains for transmit operations relative to a number of radio chains for receive operations. The AP 105-e may receive from each of the one or more STAs 115 a radio parameter including at least one of a maximum number of spatial streams supported by each STA 115 for implicit sounding, a number of common transmit/receive chains for implicit sounding, or a bitmap indication of a number of transmit antennas and a number of receive antennas by each STA 115. AP 105-e may receive the set of radio parameters from the one or more STAs 115 as part of an association procedure prior to transmission of NDPA-MU 805. Based on the reception, the AP 105-e may transmit one or more new capability bits indicating to the one or more STAs 115 to use common transmit/receive chains for the uplink and downlink sounding procedures of implicit sounding procedure 800-b.

Following the association procedure, AP 105-e may transmit NDPA-MU 805 to the one or more STAs 115. Each of the STAs 115 may receive the NDPA-MU 805 and perform uplink NDP transmission 810 for uplink MU sounding. NDP transmission by the STAs 115 (for example, at least STAs 115-m, 115-n, and 115-o) may be performed sequentially based on the scheduling information of the NDPA-MU 805. For example, STA 115-m may first perform an uplink NDP transmission 510 as a SU NDP transmission, followed by an uplink NDP transmission 510 by STA 115-n and an uplink NDP transmission 510 by STA 115-o. Each of the SU NDP transmissions may be separated by a SIFs duration. In some cases, sequential SU NDP transmission for uplink MU sounding procedure may promote a larger temporal gap for uplink MU sounding in comparison to synchronous transmission (for example, uplink MU-MIMO or uplink OFDMA), particularly for a multiple STAS 115.

The AP 105-e may receive the uplink NDP transmissions 810 from at least STAs 115-m, 115-n, and 115-o for uplink MU sounding procedure and measure the received NDPs 810. AP 105-b may then perform uplink channel estimation based on the measurements and mirror the estimated uplink channel for reciprocal downlink channel estimation (for example, generate a channel estimation matrix from the uplink NDP transmissions 810). The AP 105-e may then generate a channel precoding matrix for downlink transmission based on the computed channel estimation matrix.

Based on the downlink channel estimation, the AP 105-e may then use beamforming to perform the downlink data transmission 815 to the one or more STAs 115. In some cases, the downlink data transmission 815 may be a SU-BF transmission in accordance with the precoding generation. In other cases, the downlink data transmission 815 may be a MU-MIMO beamformed transmission to the one or more STAs 115. In the case of MU-MIMO downlink transmission, the transmission may be multiplexed to support EHT and 802.11ax WLAN operations at the one or more STAs. AP 105-e may perform the downlink multiplexing according to one or more user assumptions, including whether EHT users support implicit beamforming, whether EHT users support explicit beamforming, or whether 802.11ax users support explicit beamforming. Based on the one or more assumptions, the AP 105-e may perform multiplexing, including one or more calibration configurations (for example NDPA-MU, NDPA-MU-C, or NDPA-MU-O, as described with reference to FIGS. 5, 6, and 7).

For example, in some cases, AP 105-e may assume implicit beamforming for EHT users and explicit beamforming for 802.11ax users and perform multiplexing on downlink MU MIMO using a proposed sequence for a first calibration option (for example NDPA-MU, as described with reference to FIGS. 5A and 5B). In other cases, AP 105-e may assume explicit beamforming for EHT users and explicit beamforming for 802.11ax users and perform multiplexing on downlink MU MIMO using an existing sequence with super stream for 16 spatial stream support. In other cases, AP 105-e may assume implicit beamforming for EHT users and explicit beamforming for EHT users and perform multiplexing on downlink MU MIMO using a proposed sequence for a first calibration option (for example NDPA-MU, as described with reference to FIGS. 5A and 5B). In other cases, AP 105-e may assume implicit beamforming for EHT users and perform multiplexing on downlink MU MIMO using a proposed implicit beamforming sequence. In other cases, AP 105-e may assume explicit beamforming for EHT users and perform multiplexing on downlink MU MIMO using an existing sequence for 802.11ax operations, including 16 spatial stream support. In other cases, AP 105-e may assume explicit beamforming for 802.11ax users and perform multiplexing on downlink MU MIMO using an existing 802.11ax sequence.

Following the downlink data transmission 815, subsequent uplink sounding or other message exchanges, such as uplink block acknowledgement transmissions from the one or more STAs 115 may be received by the AP 105-e. The AP 105-e may process the one or more block acknowledgement messages and update the uplink channel measurement based on the processing. The AP 105-e may then mirror the updated uplink channel for reciprocal downlink channel estimation and update the precoding matrix.

In some cases, the one or more STAs 115 may have a power mismatch with the AP 105-e for performing the implicit sounding procedures 800. In particular, the AP 105-e may use a downlink transmit power per antenna or LTF for downlink sounding that is disparate from the uplink transmit power per antenna or LTF for the one or more STAs 115, such as STA 115-n.

The AP 105-e may transmit power control information to each of the one or more STAs 115 of the power mismatch (for example, STA 115-n). In some cases, the AP 105-e may transmit the power control information as a bit indication in NDPA-MU 805 or as a separate message. The AP 105-e may configure the transmit power control information to boost the per-transmit-chain power for uplink transmission of the set of uplink NDP transmissions 810. The configuration may specify that a total transmit power of the one or more STAs 115 matches the total transmit power of the AP 105-e. Each of the one or more STAs 115 may receive the transmit control information and reduce power backoff at the power amplifier, increasing output.

In other cases, the AP 105-e may transmit power mismatch control information to each of the one or more STAs 115 of the power mismatch (for example, STA 115-n). The AP 105-e may transmit the power control information as a bit indication in NDPA-MU 805 or as a separate message. The AP 105-e may configure the transmit power mismatch control information to include an indication to transmit additional LTF symbols in the header for the uplink NDP transmissions 810. For example, the power mismatch control information may include one or more of an LTF symbol repetition factor, a total number of spatial streams that may be implemented by the one or more STAs 115, or a number of LTF symbols that the one or more STAs 115 may include in excess of supported spatial streams. Additional LTF symbols may permit increased redundancy for the set of uplink NDP transmissions 810, to compensate for the power mismatch.

In some cases, increasing per-transmit-chain power may introduce distortion to signal transmission, and potentially violate EVM requirements (that is, minimum acceptable MCS accuracy of the transmitter for uplink transmission at the STAs 115). As such, the AP 105-e may configure the transmit control information to maintain EVM as part of increasing the per-transmit-chain power at the STAs 115. For example, the power control information may contain one or more of a MCS in conformance with the EVM requirement, an EVM parameter, a power backoff parameter, or a target RSSI.

Figure 9:
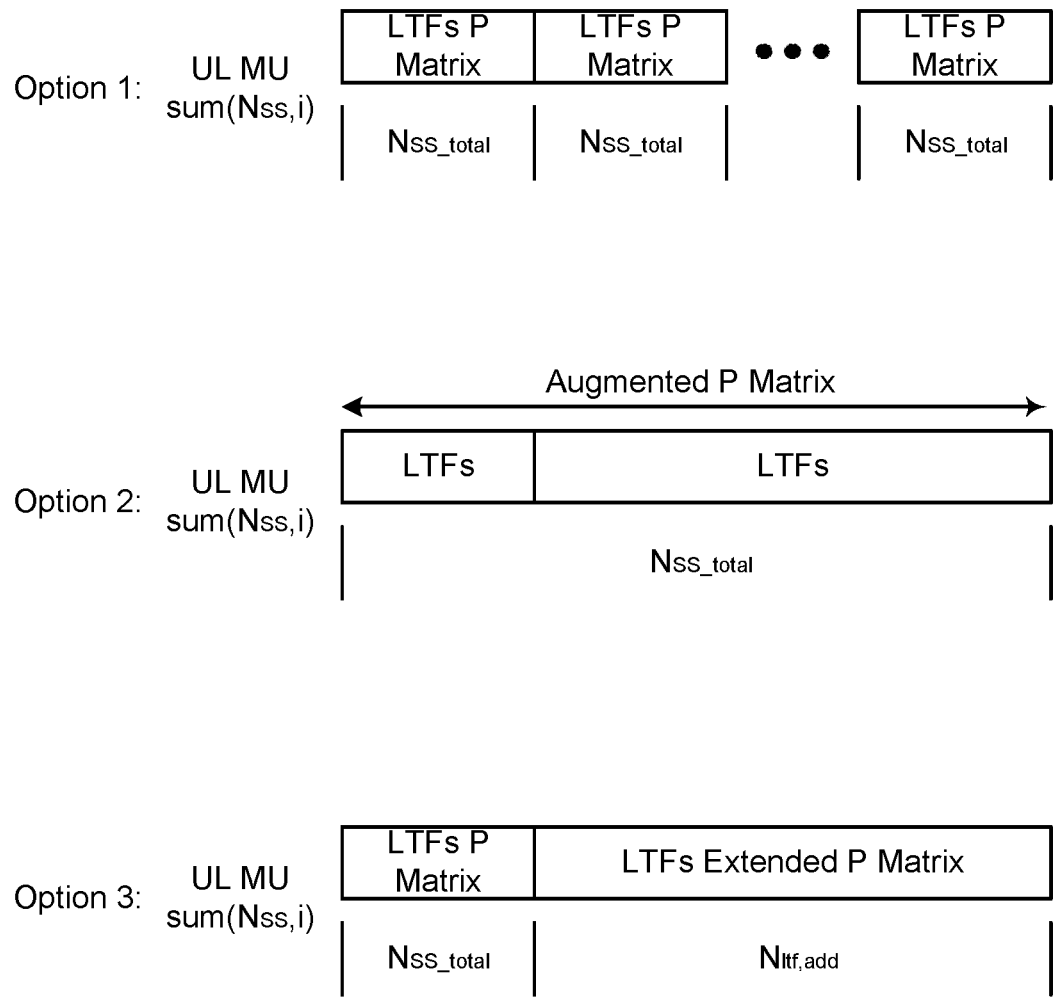
FIG. 9 illustrates one or more power mismatch control information signaling operations that support NDP-based implicit sounding and calibration for a WLAN in accordance with aspects of the present disclosure.

FIG. 9 illustrates one or more power mismatch control information signaling operations that support NDP based implicit sounding and calibration for a WLAN. An AP (for example, AP 105-e of FIGS. 8A and 8B) may signal the power mismatch control information in accordance with the one or more signaling operations as part of an implicit sounding procedure, as described with reference to FIGS. 8A and 8B.

As described, implicit sounding procedure and implicit sounding calibration procedure may include power mismatch control for transmit power at one or more participating STAs 115, with reference to FIGS. 5-8. Power mismatch may be mitigated by including additional LTF symbols in the set of NDPs for implicit sounding. Power mismatch control may be signaled by an AP 105 according to one of the following methods, which may be channel bandwidth dependent.

In some cases, the power mismatch control information may include an LTF symbol repetition factor (such as, K) for the total number of signal streams (described as, $N_{SS\_total}$) for uplink NDP transmission by each of the participating STAs 115, where the number of LTFs for uplink NDP transmission (described as, $N_{LTF,UL\_NDP}$) may be represented by $K*N_{SS\_total}$. In other cases, the power mismatch control information may include an indication for the total number of streams for uplink NDP transmission (for example, uplink SU NDP, uplink MU NDP) may be set to a larger value than the actual total number of signal streams (for example, $N_{LTF,UL\_NDP} > N_{SS\_total}$). In other cases, the power mismatch control information may include an additional number of LTF symbols (for example $N_{LTF\_add}$) for uplink NDP transmission, so that $N_{LTF,UL\_NDP} = N_{LTF\_add} + N_{SS\_total}$.

Figure 10:
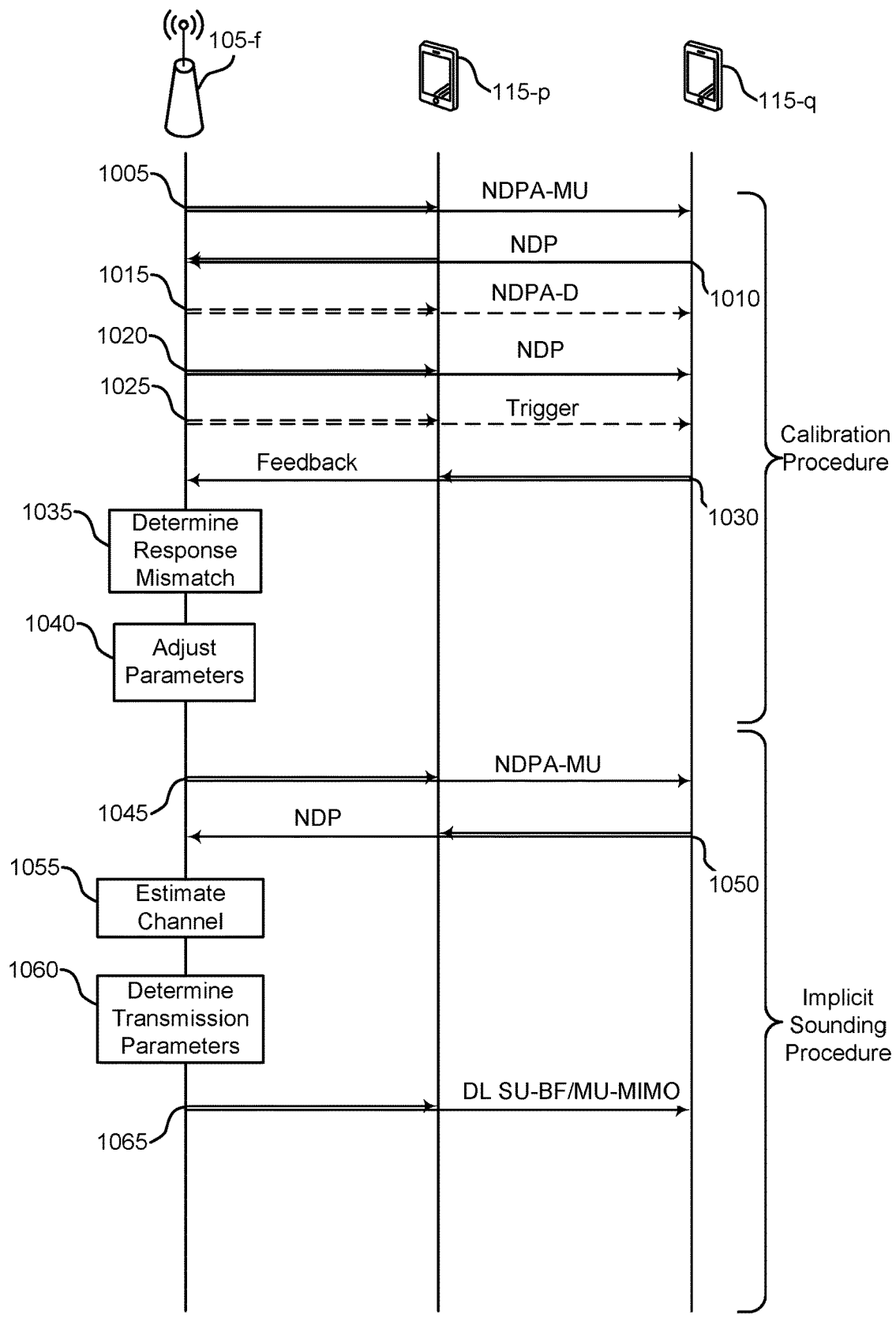
FIG. 10 illustrates a process for implicit sounding calibration procedure and implicit sounding procedure that supports NDP-based implicit sounding and calibration for a WLAN in accordance with aspects of the present disclosure.

FIG. 10 illustrates a process 1000 for implicit sounding calibration procedure and implicit sounding procedure that supports NDP based implicit sounding and calibration for a WLAN. The process 1000 may include an NDP-based calibration procedure, as described with reference to FIGS. 5A and 5B. The process 1000 may further include an AP initiated implicit sounding procedure using NDP based protocol design, to determine a downlink channel estimation and precoding generation, as described with reference to FIGS. 8A and 8B. The calibration procedure and implicit sounding procedure may be performed by an AP 105-f, with one or more STAs 115 (for example, STAs 115-p and 115-q) participating. Although described with reference to two STAs 115, the implicit sounding processes of process 1000 may be implemented with any quantity (for example, any number, one to N) of STAs 115.

The AP 105-f may initiate the implicit sounding calibration procedure and transmit an NDPA-MU 1005 to the one or more STAs 115 (for example, at least STAs 115-p and 115-q). The NDPA-MU 1005 may prompt the one or more STAs 115 to perform an uplink NDP transmission 1010 as part of an uplink MU sounding procedure. In some cases, AP 105-f may receive the set of uplink NDP transmissions 1010 simultaneously as part of an uplink MU NDP transmission by the one or more STAs 115. The AP 105-f may receive the set of uplink NDP transmissions 1010 via uplink MU-MIMO on shared spatial streams for transmission or distributed OFDMA on shared frequency resources. In other cases, the AP 105-f may receive the set of uplink NDP transmissions 1010 sequentially as SU NDP transmissions separated by SIFs durations. The set of uplink NDP transmissions 1010 may be sequentially transmitted by the one or more STAs 115 based on scheduling information of NDPA-MU 1005.

The AP 105-f may perform uplink measurement of the received set of uplink NDP transmissions 1010 and determine an uplink channel estimate based on the measurement. Following uplink channel estimation, the AP 105-f may perform triggered downlink MU sounding procedure and transmit an NDPA-D 1015 to the one or more STAs 115 (for example, at least STAs 115-p and 115-q). The AP 105-f may then perform a downlink NDP transmission 1020 to the one or more STAs 115, such that the one or more STAs 115 may perform downlink measurement of the downlink NDP transmission 1020 for downlink channel estimation. Each of the one or more STAs 115 may receive the NDPA-D 1015 and the downlink NDP transmission 1020 and perform measurement for downlink channel estimation based on the reception.

The AP 105-f may transmit a trigger frame 1025 to the one or more STAs 115 for initiating feedback report transmission by the one or more STAs 115. The trigger frame 1025 may be configured to include one or more bits to indicate calibration procedure. Additionally, or alternatively, the trigger frame 1025 may include one or more additional bits to indicate implicit sounding. The STAs 115 may receive the trigger frame 1025 and transmit downlink channel feedback report 1030. In some cases, the downlink channel feedback report 1030 may be configured as CBF messaging. The downlink channel feedback report 1030 may be uplink MU-MIMO or OFDMA transmissions and may include downlink channel information as determined from the measurements of the downlink NDP transmission 1020 (or the downlink channel feedback report 1030 may include the measurement information).

The AP 105-f may receive the downlink channel feedback report 1030 from the one or more STAs 115 and process the included measurement information. The AP 105-f may then estimate the downlink channel based on the measurement information. Based on the estimation of the downlink channel and the estimation of the uplink channel, at 1035, the AP 105-f may determine an OTA effective channel response mismatch for uplink and downlink communications on the channel.

At 1040, the AP 105-f may then adjust parameters associated with transmit/receive chains at AP 105-f. That is, the AP 105-f may calibrate an effective downlink channel response to an effective uplink channel response based at least in part on uplink and downlink channel estimations, to compensate for hardware differences associated with transmit chains and receive chains of the AP 105-f.

As shown, the AP 105-f may perform uplink MU sounding for implicit sounding calibration procedures prior to the triggered downlink sounding (for example, by sending the NDPA-D 1015 and the downlink NDP transmission 1020) and downlink channel feedback reports 1030. In other cases, the AP 105-f may perform the uplink MU sounding following the triggered downlink sounding and reception of downlink channel feedback reports 1030. In some cases, the AP 105-f may transmit the NDPA-MU 1005 and the NDPA-D 1015 as a combined transmission (for example, NDPA-MU-C) or as a combined trigger frame with trigger frame 1025. The AP 105-f may initiate the implicit sounding calibration procedure within a limited temporal duration, to reduce OTA channel variation. In addition, as illustrated, the AP 105-f may separate procedure for NDP sounding (for example, receiving the set of uplink NDP transmissions 1010, performing the downlink NDP transmission 1020) from the downlink channel feedback report 1030 (for example, as CBF feedback) to support channel estimation EVM control (that is, due to the NDP having different EVM requirements than CBF, as CBF may be transmitted with a lower backoff power to enhance decoding success).

Following the implicit sounding calibration procedure, the AP 105-f may initiate implicit sounding procedure to determine a downlink channel estimation and precoding generation for beamformed downlink signaling on the channel. The AP 105-f may transmit an NDPA-MU 1045 to the one or more STAs 115 (for example, at least STAs 115-p and 115-q). The NDPA-MU 1045 may prompt the one or more STAs 115 to perform an uplink NDP transmission 1050 as part of an uplink MU sounding procedure. In some cases, the AP 105-f may receive the set of uplink NDP transmissions 1050 simultaneously as part of an uplink MU NDP transmission by the one or more STAs 115. The AP 105-f may receive the set of uplink NDP transmissions 1050 via uplink MU-MIMO on shared spatial streams for transmission or distributed OFDMA on shared frequency resources. In other cases, the AP 105-f may receive the set of uplink NDP transmissions 1050 sequentially as SU NDP transmissions separated by SIFs durations. The set of uplink NDP transmissions 1050 may be sequentially transmitted by the one or more STAs 115 based on scheduling information in the NDPA-MU 1045.

At 1055, the AP 105-f may perform an uplink measurement of the received set of uplink NDP transmissions 1050 and determine an uplink channel estimate based on the measurement. At 1060, the AP 105-f may mirror the estimated uplink channel for reciprocal downlink channel estimation and precoding matrix generation. That is, the AP 105-f may use the uplink channel estimation to determine a beamforming steering matrix that is used to direct downlink transmissions toward the one or more STAs 115. The transmissions may be directed by applying weights to antennas within an antenna array so that constructive and destructive interference focuses the energy of the transmission in a particular direction. The AP 105-f may perform reciprocal downlink channel estimation based on the determined effective channel mismatch of the implicit sounding calibration procedure.

The AP 105-f may then use beamforming to transmit a downlink data transmission 1065 to the one or more STAs 115. In some cases, the downlink data transmission 1065 may be a SU-BF transmission in accordance with the precoding generation. In other cases, the downlink data transmission 1065 may be a MU-MIMO beamformed transmission to the one or more STAs 115.

Figure 11A:
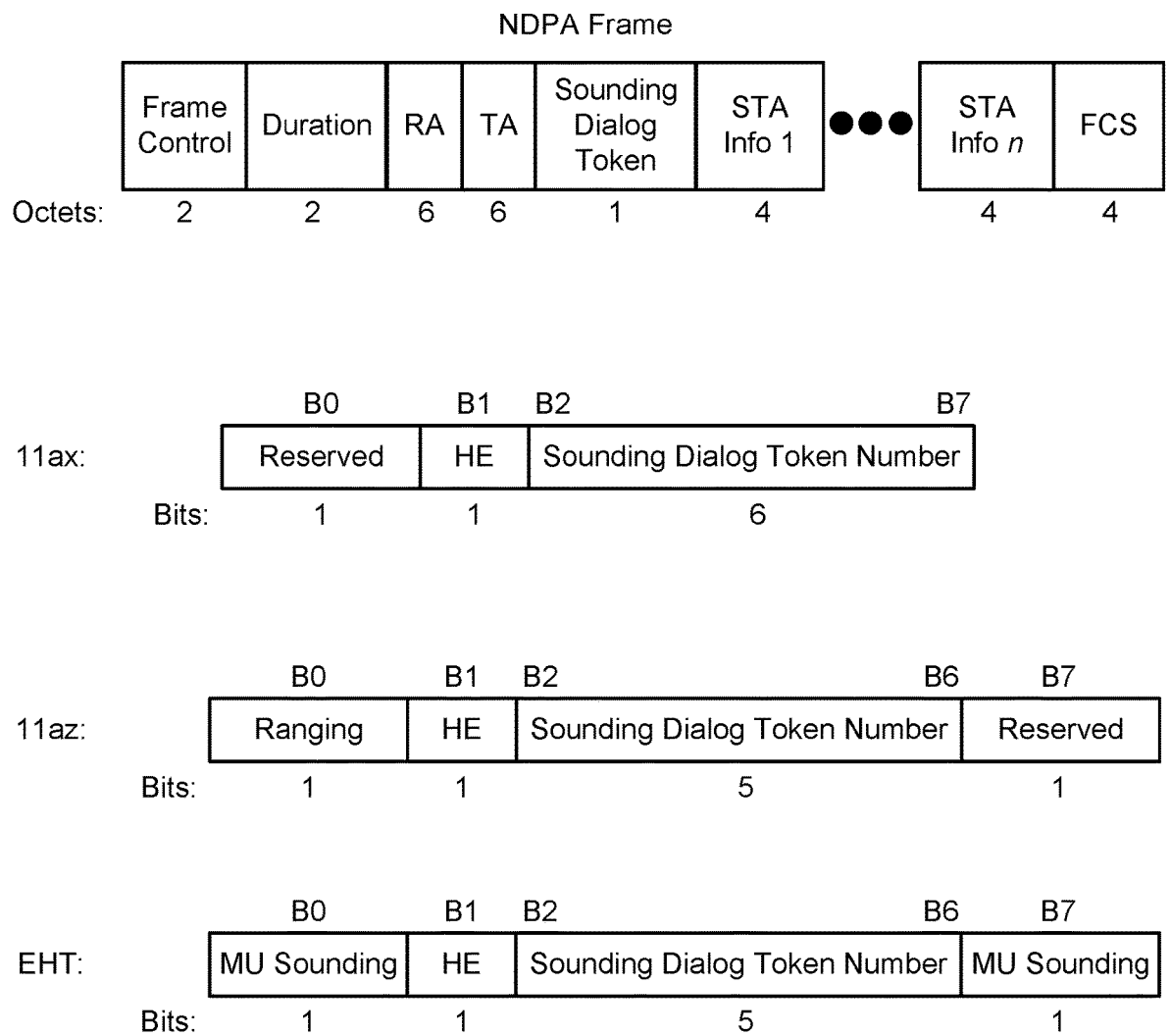
FIG. 11A illustrates an example of an NDPA-MU frame and included sounding dialog token field that support NDP based implicit sounding and calibration for a WLAN in accordance with aspects of the present disclosure.
Figure 11A:

FIG. 11A illustrates an example of an NDPA-MU frame and included sounding dialog token field of the NDPA-MU frame 1100-a that support NDP based implicit sounding and calibration for a WLAN. As shown, the NDPA-MU frame may be formatted to support WLAN operations associated with EHT, 11ax, or 11az operation. An AP (for example, AP 105-e of FIGS. 8A and 8B) may signal the NDPA-MU frame as part of an implicit sounding calibration procedure or implicit sounding procedure, as described with reference to FIGS. 8A and 8B. In some cases, the NDPA-MU frame may be configured to include separate indications for MU and SU sounding within the frame structure. For example, in some cases an AP may configure the NDPA-MU where a pair of bits within the sounding dialog token field of NDPA-MU may contain indications for SU or MU sounding associated with EHT operation. In the case of 802.11ax sounding dialog token field design, an AP may use the reserved bit (for example, B0) in the sounding token dialog field as well as an MSB of the sounding dialog token number subfield (for example, B7). In the case of 11az sounding dialog token field design, the AP may use a ranging bit (for example, B0) as well as a reserved bit (for example, B7) of the sounding dialog token field. Based on the indication, the AP may indicate, via the sounding dialog token field, indications for MU or SU sounding within NDPA-MU. In other cases, the AP may provide SU or MU sounding indication via the sounding dialog token field or a special STA info field of NDPA-MU.

Additionally, or alternatively, the AP may format NDPA-MU to include a common info field. The common info field may be signaled as an explicit field within the NDPA-MU or as part of a special STA info field within the NDPA-MU. For example, the AP may extend one or more STA info fields of the NDPA-MU to be similar to a user info field of a trigger frame, with an extended bit allocation for uplink sounding indication. The AP may remove one or more unnecessary subfields (for example, padding) of the NDPA-MU to reduce signaling overhead (such as, redundant fields). Additionally, the AP may include one or more new fields for signaling indication within the NDPA-MU.

The AP may support one or more configurations for the NDPA-MU. For example, as reproduced below, the AP may configure one or more info fields of the NDPA-MU to include these indications as illustrated in table 1100-b of FIG. 11B.

One or more information subfields of the NDPA-MU may be combined. For example, each of a number of HE-LTE/midamble periodicity subfield and power mismatch control subfield may be combined as part of a common info field. In other examples, an MCS subfield and target RSSI subfield may be combined within a user information subfield. In other examples, a feedback type+$N_g$ subfield, a codebook size subfield, and an $N_C$ subfield may be combined as part of a STA info field. In other examples, a resource unit allocation subfield and partial bandwidth info subfield may be combined. Each of the described combinations may be based on the calibration configuration or sequence for performing implicit sounding calibration procedure and implicit sounding procedure.

Figure 12:
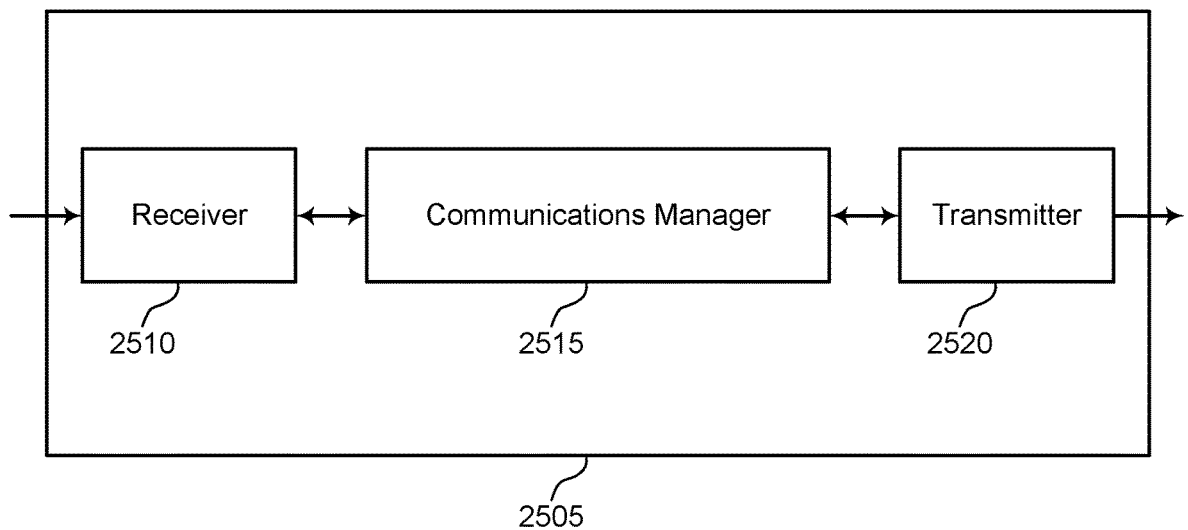
FIGS. 12 and 13 show block diagrams of devices that support NDP-based implicit sounding and calibration for a WLAN in accordance with aspects of the present disclosure.

FIG. 12 shows a block diagram of a device 1205 that supports NDP-based implicit sounding and calibration for a WLAN in accordance with aspects of the present disclosure. The device 1205 may be an example of aspects of an AP (such as AP 105 of FIG. 1) as described herein. The device 1205 may include a receiver 1210, a communications manager 1215, and a transmitter 1220. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to NDP-based implicit sounding and calibration for a WLAN, etc.). The receiver 1210 may pass the received information, or information derived from it, to other components of the device 1205. The receiver 1210 may be an example of aspects of the transceiver 1520 described with reference to FIG. 15. The receiver 1210 may utilize a single antenna or a set of antennas.

The communications manager 1215 may transmit a downlink message directed to a set of STAs that includes an uplink NDP announcement frame, the uplink NDP announcement frame prompting each STA of the set of STAs to transmit an uplink NDP, receive a set of uplink NDPs from the set of STAs based on the uplink NDP announcement frame, and perform an implicit sounding procedure or an implicit sounding calibration procedure based on the received set of uplink NDPs. The communications manager 1215 may be an example of aspects of the communications manager 1510 described herein.

The communications manager 1215, or its sub-components, may be implemented in hardware, code (for example, software or firmware) executed by a processor, or any combination thereof. Further, —the communications manager 1215, or its sub-components, may be physically located at different locations, including being distributed such that portions of functions are implemented at different physical locations by one or more physical components. In some examples, the communications manager 1215, or its sub-components, may be a separate and distinct component in accordance with various aspects of the present disclosure. —

The transmitter 1220 may transmit signals generated by other components of the device. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
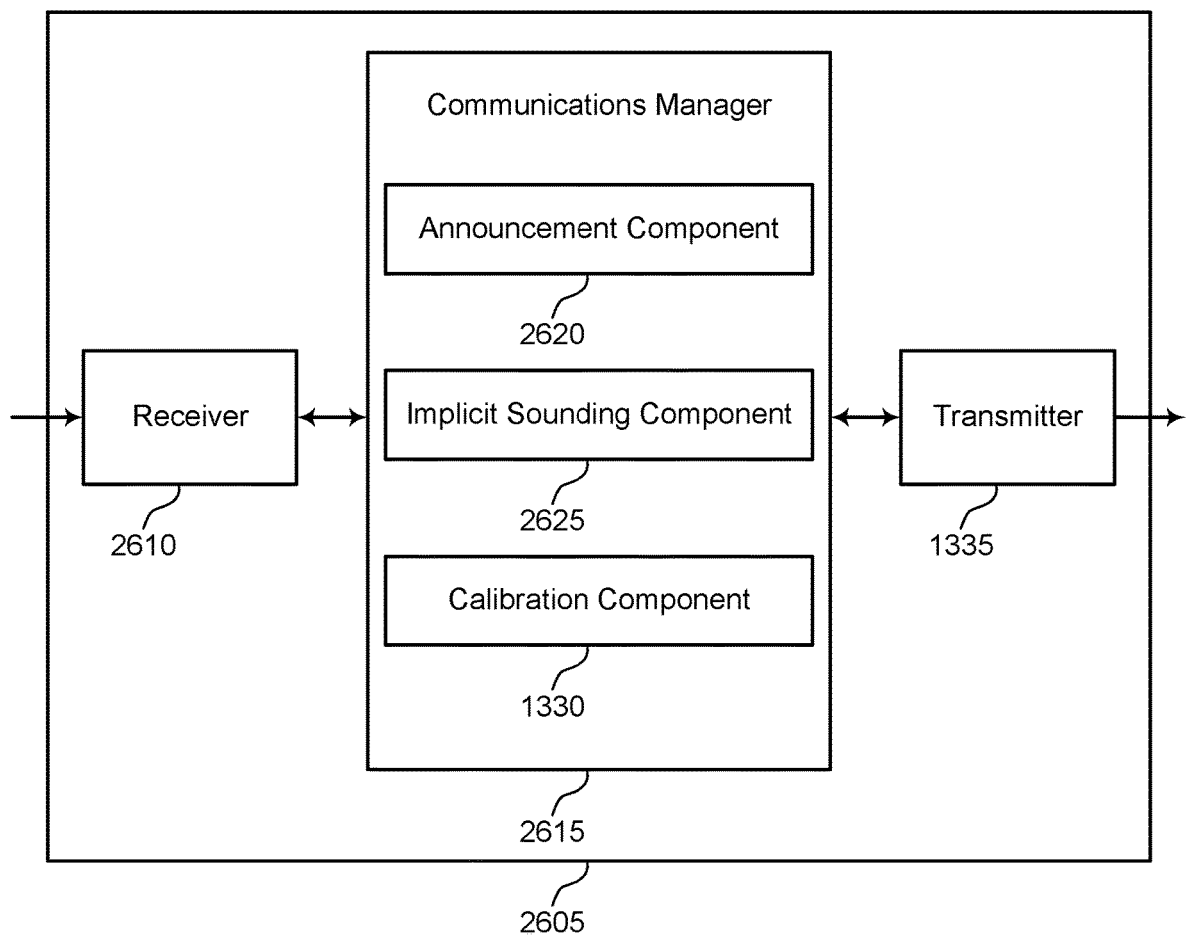

FIG. 13 shows a block diagram of a device 1305 that supports NDP-based implicit sounding and calibration for a WLAN in accordance with aspects of the present disclosure. The device 1305 may be an example of aspects of a device 1205 or an AP 105 as described herein. The device 1305 may include a receiver 1310, a communications manager 1315, and a transmitter 1335. The communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to NDP-based implicit sounding and calibration for a WLAN, etc.). The receiver 1310 may pass the received information, or information derived from it, to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an announcement frame component 1320 and an implicit sounding component 1325. The communications manager 1315 may be an example of aspects of the communications manager 1510 described herein.

The announcement component 1320 may transmit a downlink message directed to a plurality of STAs that includes an uplink NDP announcement frame, the uplink NDP announcement frame prompting each STA of the set of STAs to transmit an uplink NDP.

The implicit sounding component 1325 may receive a set of uplink NDPs from the set of STAs based on the uplink NDP announcement frame and perform an implicit sounding procedure or an implicit sounding calibration procedure based on the received set of uplink NDPs.

The calibration component 1330 may calibrate an effective downlink channel response to an effective uplink channel response based at least in part on the uplink channel measurements and the downlink channel measurements.

The transmitter 1335 may transmit signals generated by other components of the device. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
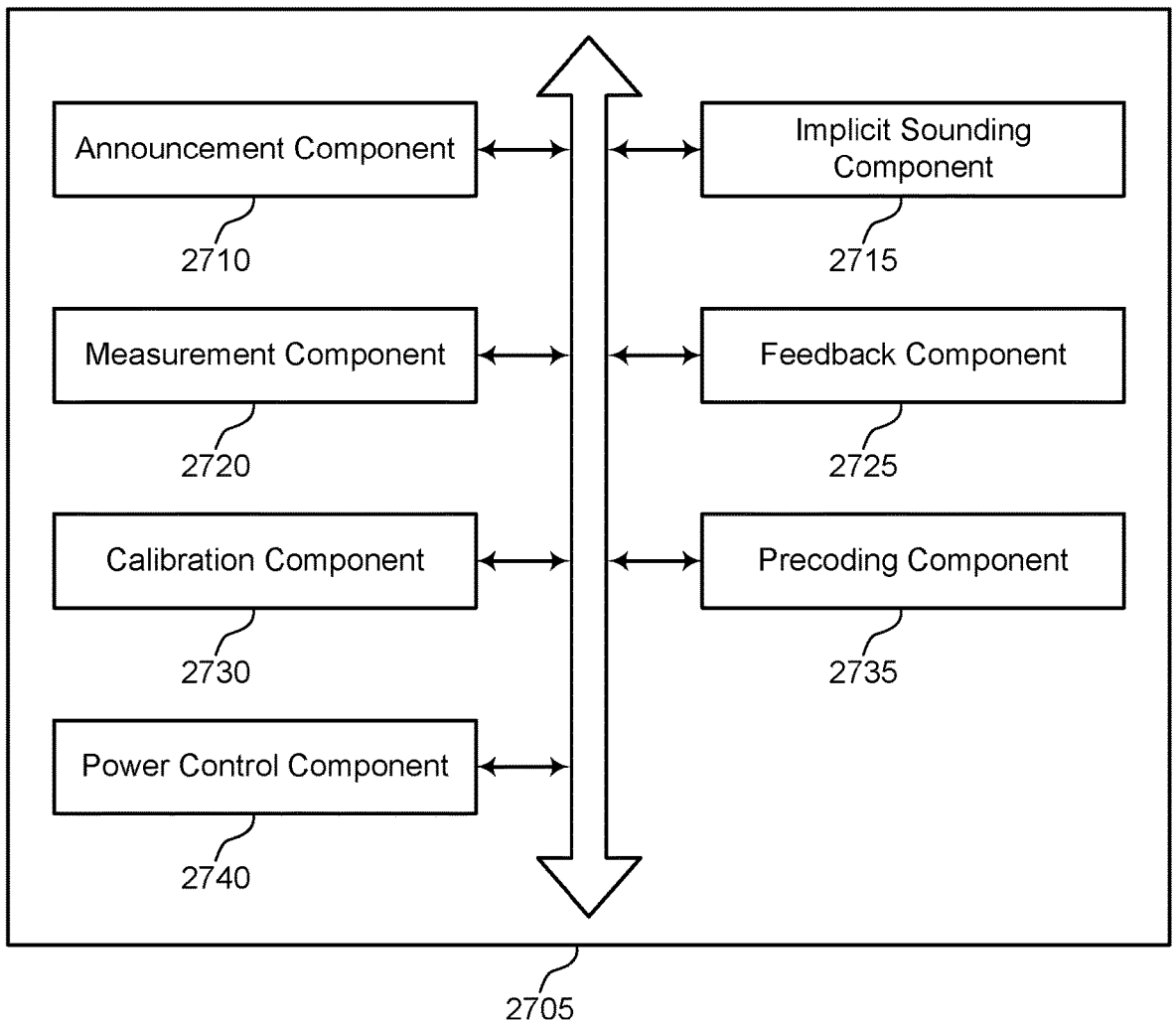
FIG. 14 shows a block diagram of a communications manager that supports NDP-based implicit sounding and calibration for a WLAN in accordance with aspects of the present disclosure.

FIG. 14 shows a block diagram of a communications manager 1405 that supports NDP-based implicit sounding and calibration for a WLAN in accordance with aspects of the present disclosure. The communications manager 1405 may be an example of aspects of a communications manager 1215, a communications manager 1315, or a communications manager 1510 described herein. The communications manager 1405 may include an announcement component 1410, an implicit sounding component 1415, a measurement component 1420, a feedback component 1425, a calibration component 1430, a precoding component 1435, and a power control component 1440. Each of these modules may communicate, directly or indirectly, with one another (for example, via one or more buses).

The announcement component 1410 may transmit a downlink message directed to a plurality of STAs that includes an uplink NDP announcement frame, the uplink NDP announcement frame prompting each STA of the set of STAs to transmit an uplink NDP.

In some examples, the announcement component 1410 may transmit a downlink NDP announcement frame directed to the set of STAs, the downlink NDP announcement frame prompting each STA of the set of STAs to measure a downlink NDP.

In some cases, the uplink NDP announcement frame includes an indication for each STA of the set of STAs to use a single radio chain for transmit and receive operations during the implicit sounding calibration procedure. In some cases, the uplink NDP announcement frame includes an indication for each STA of the set of STAs to use a fixed number of radio chains for transmit and receive operations during the implicit sounding procedure or during the implicit sounding calibration procedure. In some cases, the uplink NDP announcement includes scheduling information for the set of uplink NDPs.

The implicit sounding component 1415 may receive a set of uplink NDPs from the set of STAs based on the uplink NDP announcement frame.

In some examples, the implicit sounding component 1415 may perform an implicit sounding procedure or an implicit sounding calibration procedure based on the received set of uplink NDPs. In some examples, the implicit sounding component 1415 may transmit the downlink NDP to the set of STAs following transmission of the downlink NDP announcement frame. In some examples, the implicit sounding component 1415 may transmit a trigger frame requesting the downlink channel measurements from the set of STAs. In some examples, the implicit sounding component 1415 may where the downlink measurements are received based on the trigger frame.

In some examples, the implicit sounding component 1415 may transmit the uplink null packet data announcement frame and receiving the set of uplink NDPs occurs prior to transmitting the downlink NDP announcement frame. In some examples, the implicit sounding component 1415 may transmit the uplink null packet data announcement frame and receiving the set of uplink NDPs occurs after receiving the downlink channel measurements from the set of STAs. In some examples, the implicit sounding component 1415 may perform a downlink transmission to at least one STA of the set of STAs based on the downlink precoding matrix. In some examples, receiving the set of uplink NDPs includes receiving from each STA a number of spatial streams and LTFs based on the fixed number of radio chains for that STA.

In some examples, the implicit sounding component 1415 may receive from each STA of the set of STAs a radio parameter including one or more of: a maximum number of supported spatial streams, a number of radio chains common to the transmission and reception, or a bitmap indicating a number of transmit antennas or a number of receive antennas; where the fixed number of radio chains is based on the received radio parameter.

In some cases, the trigger frame includes the uplink NDP announcement frame and the downlink NDP announcement frame. In some cases, the uplink NDP announcement frame and downlink NDP announcement frame are transmitted as a single NDP announcement frame. In some cases, the downlink transmission includes a single user beamformed transmission or a --MU-MIMO transmission. In some cases, the set of uplink NDPs from the set of STAs are received substantially simultaneously according to an uplink ---MU-MIMO transmission or a distributed OFDMA transmission. In some cases, the set of STAs share spatial streams in the uplink MU-MIMO transmission. In some cases, the set of uplink NDPs are received from the set of STAs sequentially in time. In some cases, the order of the set of uplink NDPs and the downlink NDPs may be switched.

The measurement component 1420 may perform uplink channel measurements on the set of uplink NDPs. In some examples, the measurement component 1420 may update the uplink channel measurements based on the acknowledgment message.

The feedback component 1425 may receive downlink channel measurements from the set of STAs.

In some examples, the feedback component 1425 may where the received downlink channel measurements are based on the downlink NDP. In some examples, the feedback component 1425 may receive an acknowledgement message from the at least one STA of the set of STAs in response to the downlink transmission. In some cases, the downlink channel measurements include compressed beamforming feedback.

The calibration component 1430 may calibrate an effective downlink channel response to an effective uplink channel response based on the uplink channel measurements and the downlink channel measurements.

The precoding component 1435 may compute a downlink precoding matrix based on the uplink channel measurements.

The power control component 1440 may transmit power control information to one or more STAs of the set of STAs, the power control information configured to increase a transmit power of one or more radio chains of the set of STAs for uplink NDPs of the set of uplink NDPs.

In some examples, the power control component 1440 may transmit error vector magnitude (EVM) control information to one or more STAs of the set of STAs, the control information including one or more of: a MCS in conformance with an EVM requirement, an EVM parameter, a power backoff parameter, or a target RSSI.

In some examples, the power control component 1440 may transmit to one or more STAs of the set of STAs power mismatch control information indicating a number of additional LTF symbols to be included in headers uplink NDPs of the set of uplink NDPs. In some cases, the power control information is configured to match a total transmit power of the one or more STAs to a total transmit power of the AP. In some cases, an LTF symbol repetition factor, a total number of spatial streams to transmit the set of uplink NDPs, or a number of LTF symbols in excess of a number of spatial streams to include in the headers of the set of uplink NDPs.

Figure 15:
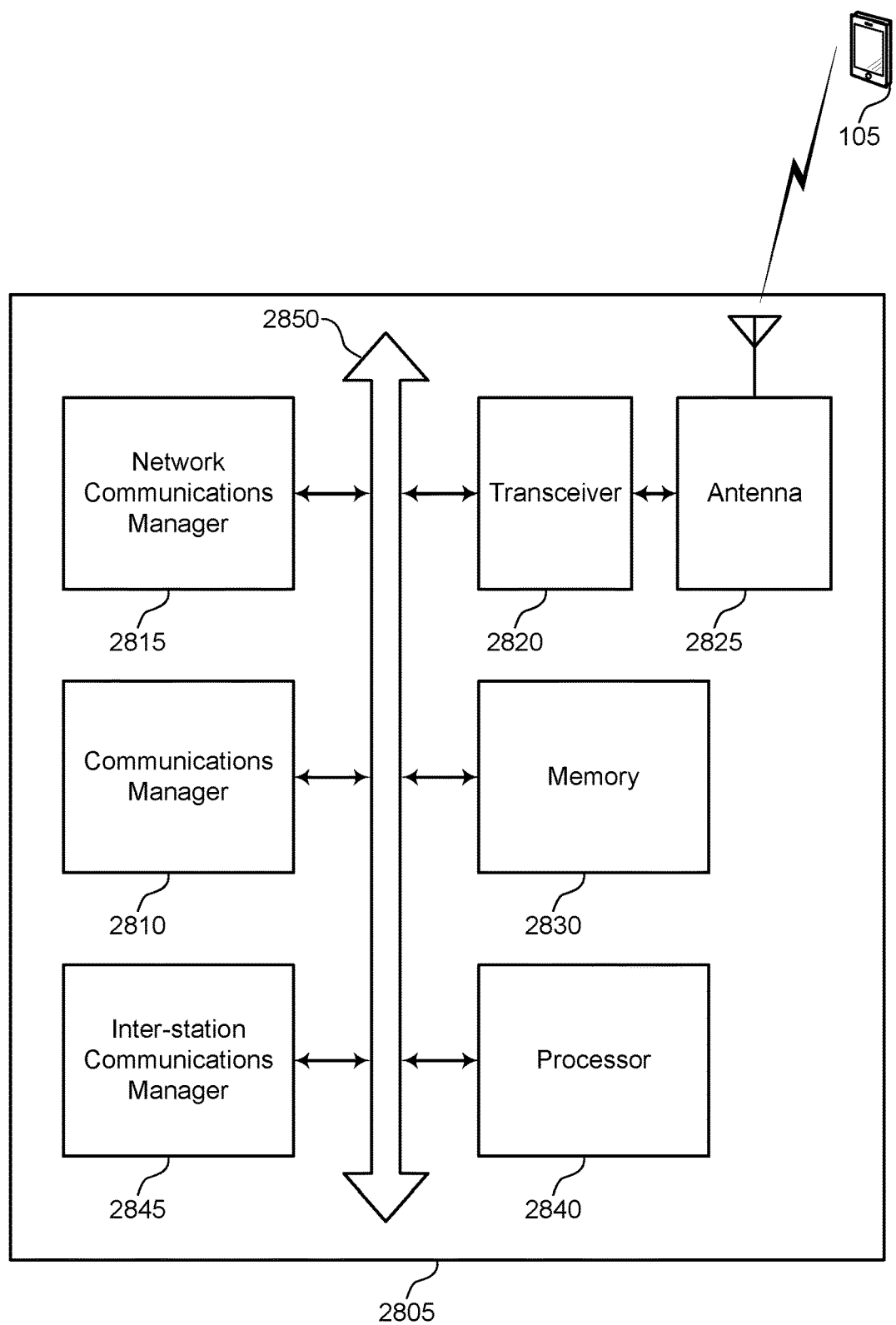
FIG. 15 shows a diagram of a system including a device that supports NDP-based implicit sounding and calibration for a WLAN in accordance with aspects of the present disclosure.

FIG. 15 shows a diagram of a system including a device 1505 that supports NDP-based implicit sounding and calibration for a WLAN in accordance with aspects of the present disclosure. The device 1505 may be an example of or include the components of device 1205, device 1305, or an AP as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (for example, bus 1550).

The communications manager 1510 may transmit a downlink message directed to a plurality of STAs that includes an uplink null data packet announcement frame, the uplink NDP announcement frame prompting each STA of the set of STAs to transmit an uplink NDP, receive a set of uplink NDPs from the set of STAs based on the uplink NDP announcement frame, and perform an implicit sounding procedure or an implicit sounding calibration procedure based on the received set of uplink NDPs.

The network communications manager 1515 may manage communications with the core network (for example, via one or more wired backhaul links). For example, the network communications manager 1515 may manage the transfer of data communications for client devices, such as one or more STAs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into processor 1540. The processor 1540 may be configured to execute computer-readable instructions stored in a memory to perform various functions (for example, functions or tasks supporting NDP-based implicit sounding and calibration for a WLAN).

The inter-station communications manager 1545 may manage communications with other APs and may include a controller or scheduler for controlling communications with STAs 115 in cooperation with other APs. For example, the inter-station communications manager 1545 may coordinate scheduling for transmissions to STAs 115 for various interference mitigation techniques such as beamforming or joint transmission.

Figure 16:
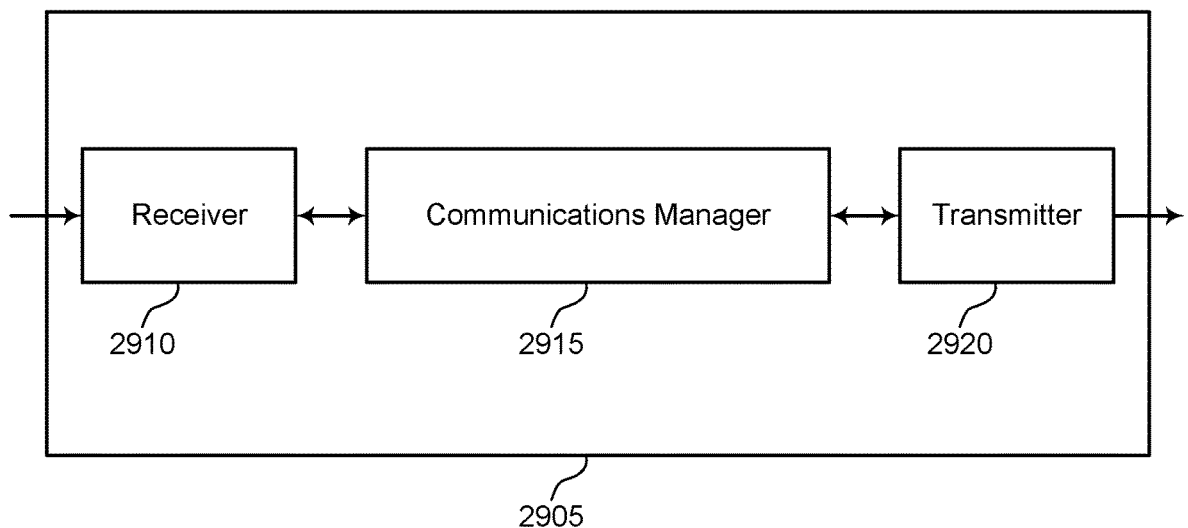
FIGS. 16 and 17 show block diagrams of devices that support NDP-based implicit sounding and calibration for a WLAN in accordance with aspects of the present disclosure.

FIG. 16 shows a block diagram of a device 1605 that supports NDP-based implicit sounding and calibration for a WLAN in accordance with aspects of the present disclosure. The device 1605 may be an example of aspects of a STA as described herein. The device 1605 may include a receiver 1610, a communications manager 1615, and a transmitter 1620. The communications manager 1615 can be implemented, at least in part, by one or both of a modem and a processor. Each of these components may be in communication with one another (for example, via one or more buses).

Receiver 1610 may receive information such as packets, user data, or control information associated with various information channels (for example, control channels, data channels, and information related to NDP-based implicit sounding and calibration for a WLAN, etc.). The receiver 1610 may pass the received information, or information derived from it, to other components of the device 1605. The receiver 1610 may be an example of aspects of the transceiver 1920 described with reference to FIG. 19. The receiver 1610 may utilize a single antenna or a set of antennas.

The communications manager 1615 may receive an uplink NDP announcement frame from an AP, the uplink NDP announcement frame prompting the STA to transmit an uplink NDP and transmit the uplink NDP based on the uplink NDP announcement frame, the transmitting part of an implicit sounding procedure or an implicit calibration procedure at the AP. The communications manager 1615 may be an example of aspects of the communications manager 1910 described herein.

The communications manager 1615, or its sub-components, may be implemented in hardware, code (for example, software or firmware) executed by a processor, or any combination thereof. If implemented in code executed by a processor, the functions of the communications manager 1615, or its sub-components may be executed by a general-purpose processor, a DSP, an -ASIC, an FPGA or other programmable logic device, discrete gate or transistor logic, discrete hardware components, or any combination thereof designed to perform the functions described in the present disclosure.

The communications manager 1615, or its sub-components, may be physically located at different locations, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
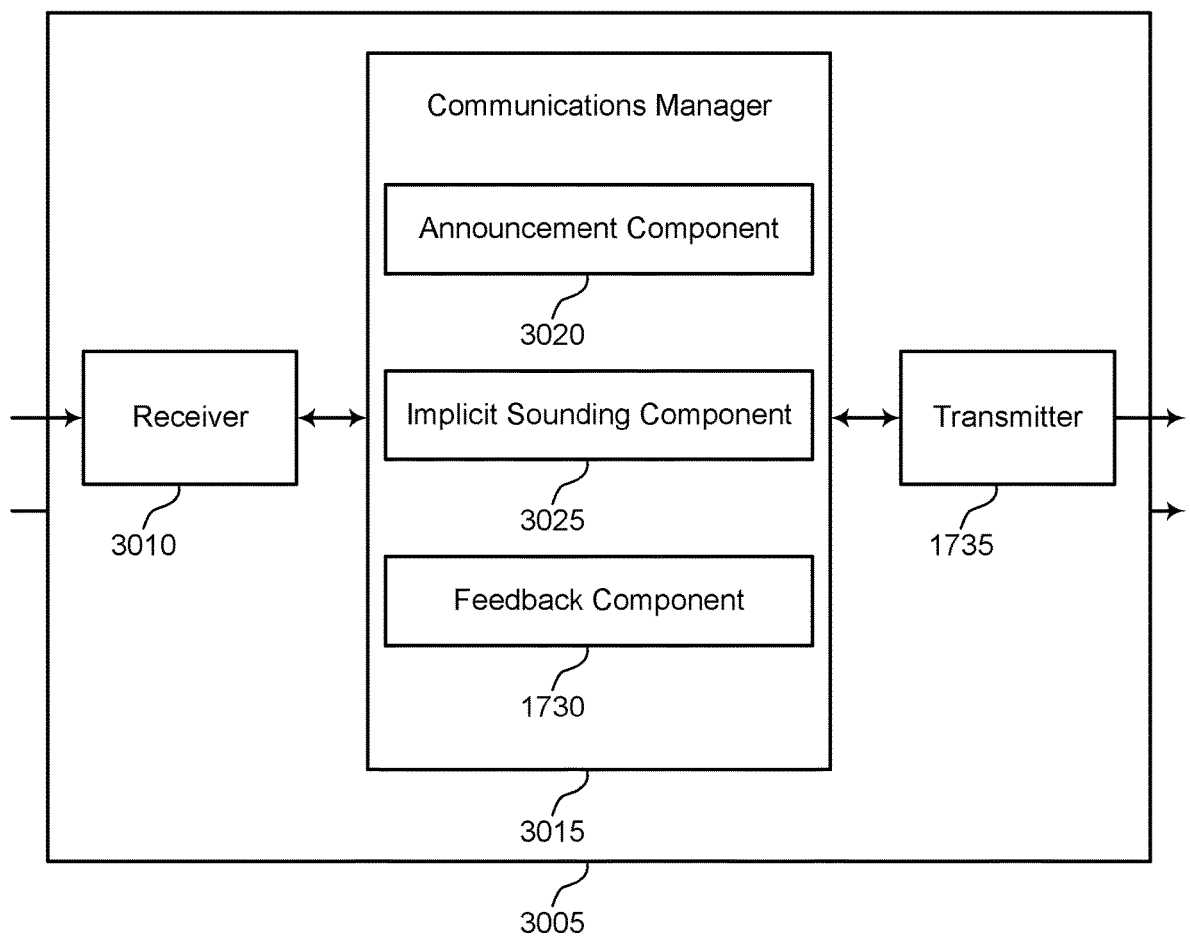

FIG. 17 shows a block diagram of a device 1705 that supports NDP-based implicit sounding and calibration for a WLAN in accordance with aspects of the present disclosure. The device 1705 may be an example of aspects of a device 1605 or a STA 115 as described herein. The device 1705 may include a receiver 1710, a communications manager 1715, and a transmitter 1735. The communications manager 1715 can be implemented, at least in part, by one or both of a modem and a processor. Each of these components may be in communication with one another (for example, via one or more buses).

Receiver 1710 may receive information such as packets, user data, or control information associated with various information channels (for example, control channels, data channels, and information related to NDP-based implicit sounding and calibration for a WLAN, etc.). The receiver 1710 may pass the received information, or information derived from it, to other components of the device. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include an announcement component 1720 and an implicit sounding component 1725. The communications manager 1715 may be an example of aspects of the communications manager 1910 described herein.

The announcement component 1720 may receive an uplink NDP announcement frame from an AP, the uplink NDP announcement frame prompting the STA to transmit an uplink NDP.

The implicit sounding component 1725 may transmit the uplink NDP based on the uplink NDP announcement frame, the transmitting part of an implicit sounding procedure or an implicit calibration procedure at the AP.

The feedback component 1730 may transmit a downlink channel measurement to the AP based at least in part on performing downlink channel measurement of a downlink NDP from the AP.

Transmitter 1735 may transmit signals generated by other components of the device. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
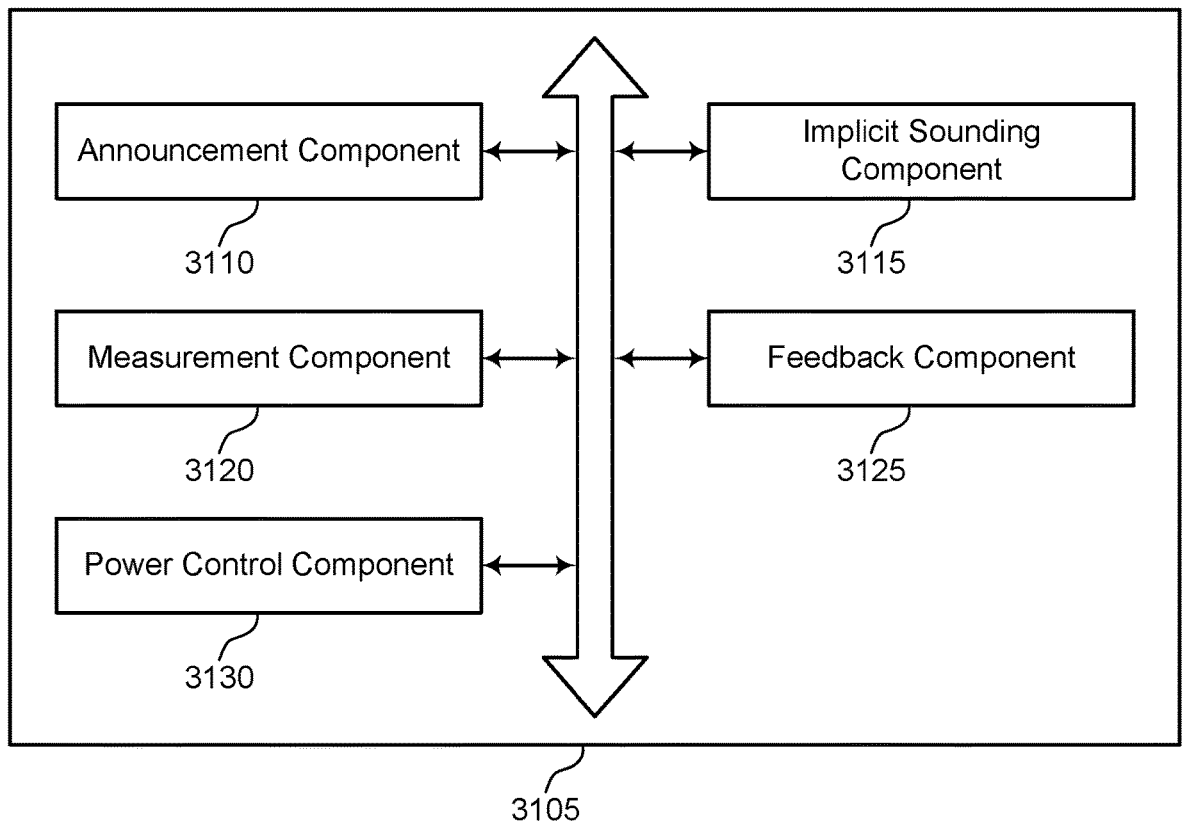
FIG. 18 shows a block diagram of a communications manager that supports NDP-based implicit sounding and calibration for a WLAN in accordance with aspects of the present disclosure.

FIG. 18 shows a block diagram of a communications manager 1805 that supports NDP-based implicit sounding and calibration for a WLAN in accordance with aspects of the present disclosure. The communications manager 1805 may be an example of aspects of a communications manager 1615, a communications manager 1715, or a communications manager 1910 described herein. The communications manager 1805 may include an announcement component 1810, an implicit sounding component 1815, a measurement component 1820, a feedback component 1825, and a power control component 1830. Each of these modules may communicate, directly or indirectly, with one another (for example, via one or more buses).

The announcement component 1810 may receive an uplink NDP announcement frame from an AP, the uplink NDP announcement frame prompting the STA to transmit an uplink NDP.

In some examples, the announcement component 1810 may receive a downlink NDP announcement frame from the AP, the downlink NDP announcement frame prompting the performing. In some cases, the uplink NDP announcement frame and downlink NDP announcement frame are received as a single NDP announcement frame. In some cases, the uplink NDP announcement frame includes an indication for the STA to use a single radio chain for transmit and receive operations during the implicit sounding calibration procedure. In some cases, the uplink NDP announcement frame includes an indication for the STA to use a fixed number of radio chains for transmit and receive operations during the implicit sounding procedure or during the implicit sounding calibration procedure. In some cases, the received uplink NDP announcement includes scheduling information for the uplink NDP.

The implicit sounding component 1815 may transmit the uplink NDP based on the uplink NDP announcement frame, the transmitting part of an implicit sounding procedure or an implicit calibration procedure at the AP.

In some examples, the implicit sounding component 1815 may receive the downlink NDP following receiving the downlink NDP announcement frame. In some examples, the implicit sounding component 1815 may receive a trigger frame requesting the downlink channel measurement. In some examples, the implicit sounding component 1815 may where the transmitting is based on the trigger frame. In some examples, the implicit sounding component 1815 may receive the uplink null packet data announcement frame and transmitting the uplink NDP occurs prior to receiving the downlink NDP announcement frame. In some examples, the implicit sounding component 1815 may receive the uplink NDP announcement frame and transmitting the uplink NDP occurs after transmitting the downlink channel measurement. In some examples, the implicit sounding component 1815 may receive a downlink transmission from the AP, the downlink transmission based on a downlink precoding matrix.

In some examples, the implicit sounding component 1815 may transmit an acknowledgement message to the AP in response to the downlink transmission. In some examples, transmitting the uplink NDP includes transmitting to the AP a number of spatial streams and LTFs based on the fixed number of radio chains. In some examples, the implicit sounding component 1815 may transmit to the AP a radio parameter including one or more of: a maximum number of supported spatial streams, a number of radio chains common to the transmission and reception, or a bitmap indicating a number of transmit antennas or a number of receive antennas; where the fixed number of radio chains is based on the radio parameter. In some cases, the trigger frame includes the uplink NDP announcement frame and the downlink NDP announcement frame. In some cases, the downlink transmission includes a single user beamformed transmission or a --MU-MIMO transmission. In some cases, the uplink NDP is transmitted substantially simultaneously with uplink NDP transmissions of a set of STAs according to an uplink ---MU-MIMO transmission or a distributed OFDMA transmission. In some cases, the STA share spatial streams in the uplink MU-MIMO transmission with the set of STAs.

The measurement component 1820 may perform a downlink channel measurement of a downlink NDP from the AP. In some examples, the measurement component 1820 may where the downlink channel measurement is based on the received downlink NDP.

The feedback component 1825 may transmit a downlink channel measurement to the AP based on the performing. In some cases, the downlink channel measurement includes compressed beamforming feedback.

The power control component 1830 may receive power control information from the AP based on a power imbalance at the STA, the power control information configured to increase a transmit power of one or more radio chains.

In some examples, the power control component 1830 may transmit EVM control information to one or more STAs of the set of STAs, the control information including one or more of: a MCS in conformance with an EVM requirement, an EVM parameter, a power backoff parameter, or a target RSSI.

In some examples, the power control component 1830 may receive from the AP power mismatch control information based on a power imbalance at the STA, the power mismatch control information indicating a number of additional LTF symbols to be included in a headers of the uplink NDP. In some cases, the power control information is configured to match a total transmit power of the STA to a total transmit power of the AP. In some cases, an LTF symbol repetition factor, a total number of spatial streams to transmit the uplink NDP, or a number of LTF symbols in excess of a number of spatial streams to include in the header of the uplink NDP.

Figure 19:
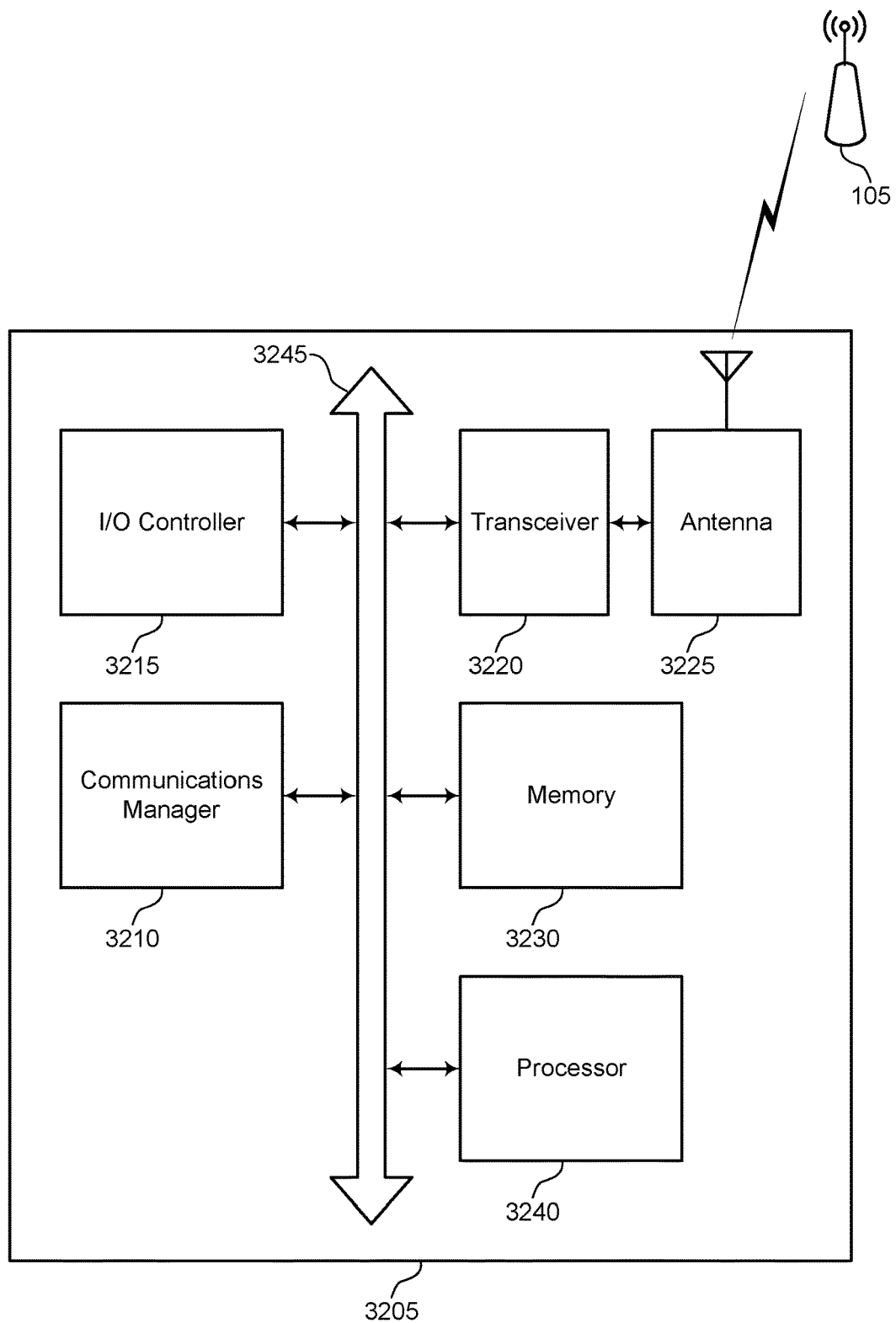
FIG. 19 shows a diagram of a system including a device that supports NDP-based implicit sounding and calibration for a WLAN in accordance with aspects of the present disclosure.

FIG. 19 shows a diagram of a system including a device 1905 that supports NDP-based implicit sounding and calibration for a WLAN in accordance with aspects of the present disclosure. The device 1905 may be an example of or include the components of device 1605, device 1705, or a STA as described herein. The device 1905 may include components for bi-directional voice and data communications including components for transmitting and receiving communications, including a communications manager 1910, an I/O controller 1915, a transceiver 1920, an antenna 1925, memory 1930, and a processor 1940. These components may be in electronic communication via one or more buses (for example, bus 1945).

The communications manager 1910 may receive an uplink NDP announcement frame from an AP, the uplink NDP announcement frame prompting the STA to transmit an uplink NDP and transmit the uplink NDP based on the uplink NDP announcement frame, the transmitting part of an implicit sounding procedure or an implicit calibration procedure at the AP.

The I/O controller 1915 may manage input and output signals for device 1905. I/O controller 1915 may also manage peripherals not integrated into device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with device 1905 via the I/O controller 1915 or via hardware components controlled by I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable software 1935 including instructions that, when executed, cause the processor to perform various functions described herein. In some cases, the memory 1930 may contain, among other things, a BIOS which may control basic hardware or software operation such as the interaction with peripheral components or devices.

The processor 1940 may include a hardware device, (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into processor 1940. The processor 1940 may be configured to execute computer-readable instructions stored in a memory to perform various functions (for example, functions or tasks supporting NDP-based implicit sounding and calibration for a WLAN).

Figure 20:
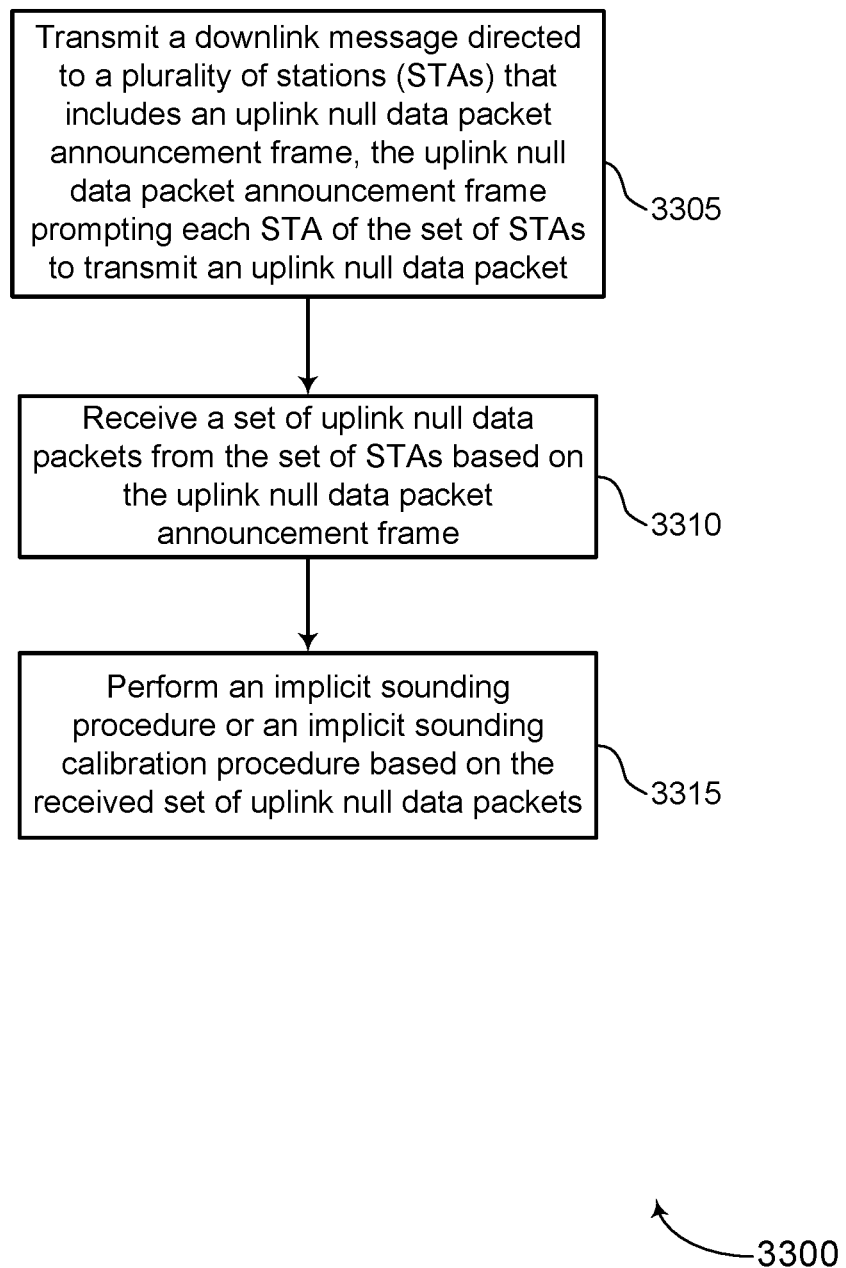
FIGS. 20-23 show flowcharts illustrating methods that support NDP-based implicit sounding and calibration for a WLAN in accordance with aspects of the present disclosure.

FIG. 20 shows a flowchart illustrating a method 2000 that supports NDP-based implicit sounding and calibration for a WLAN in accordance with aspects of the present disclosure. The operations of method 2000 may be implemented by an AP or its components as described herein. For example, the operations of method 2000 may be performed by a communications manager as described with reference to FIGS. 12-15. In some examples, an AP may execute a set of instructions to control the functional elements of the AP to perform the functions described below. Additionally, or alternatively, an AP may perform aspects of the functions described below using special-purpose hardware.

At 2005, the AP may transmit a downlink message directed to a plurality of STAs that includes an uplink NDP announcement frame, the uplink NDP announcement frame prompting each STA of the plurality of STAs to transmit an uplink NDP. The operations of 2005 may be performed according to the methods described herein. In some examples, aspects of the operations of 2005 may be performed by an announcement component as described with reference to FIGS. 12-15.

At 2010, the AP may receive a set of uplink NDPs from the plurality of STAs based on the uplink NDP announcement frame. The operations of 2010 may be performed according to the methods described herein. In some examples, aspects of the operations of 2010 may be performed by an implicit sounding component as described with reference to FIGS. 12-15.

At 2015, the AP may perform an implicit sounding procedure or an implicit sounding calibration procedure based on the received set of uplink NDPs. The operations of 2015 may be performed according to the methods described herein. In some examples, aspects of the operations of 2015 may be performed by an implicit sounding component as described with reference to FIGS. 12-15.

Figure 21:
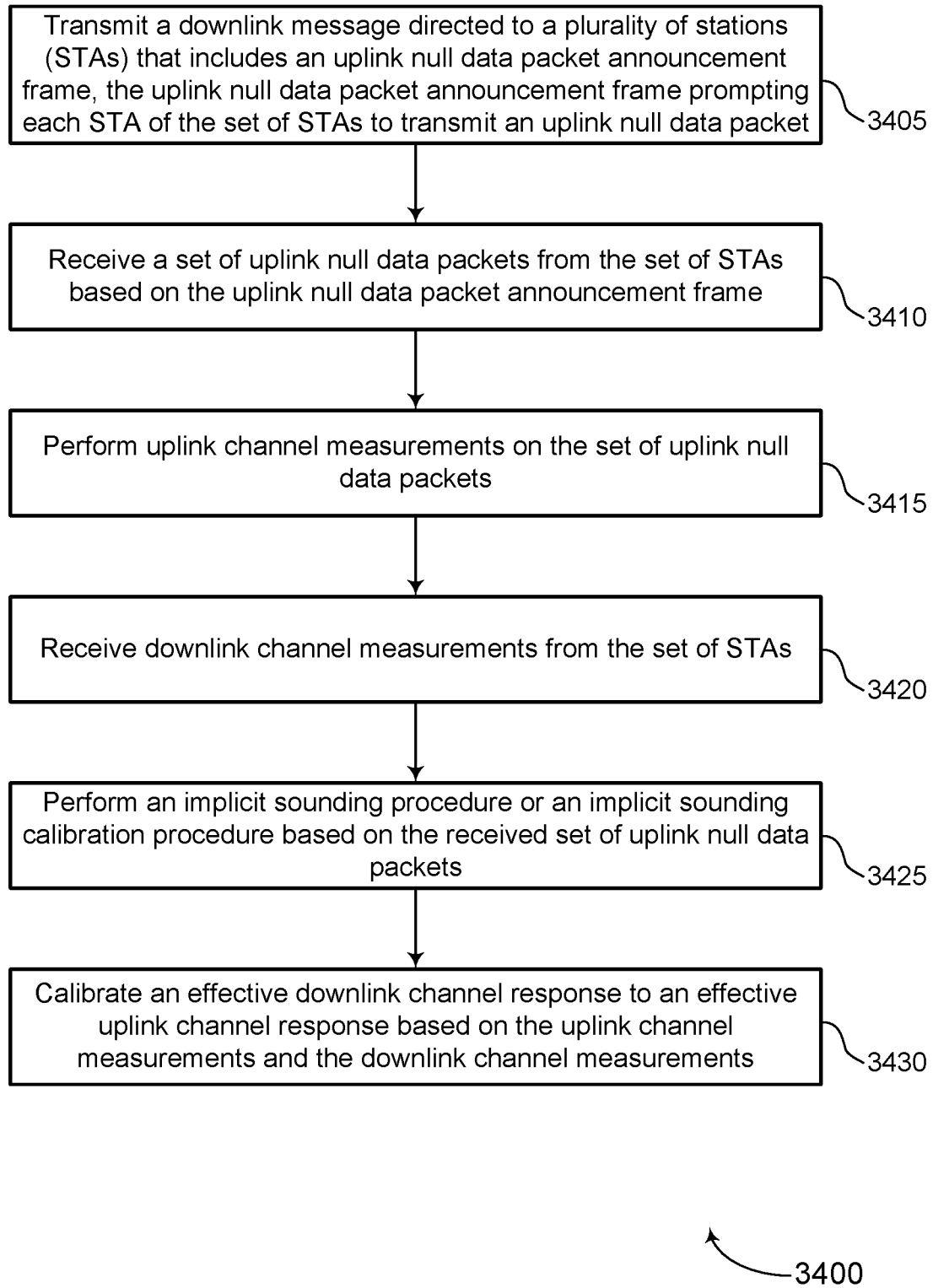

FIG. 21 shows a flowchart illustrating a method 2100 that supports NDP-based implicit sounding and calibration for a WLAN in accordance with aspects of the present disclosure. The operations of method 2100 may be implemented by an AP or its components as described herein. For example, the operations of method 2100 may be performed by a communications manager as described with reference to FIGS. 12-15. In some examples, an AP may execute a set of instructions to control the functional elements of the AP to perform the functions described below. Additionally, or alternatively, an AP may perform aspects of the functions described below using special-purpose hardware.

At 2105, the AP may transmit a downlink message directed to a plurality of STAs that includes an uplink NDP announcement frame, the uplink NDP announcement frame prompting each STA of the plurality of STAs to transmit an uplink NDP. The operations of 2105 may be performed according to the methods described herein. In some examples, aspects of the operations of 2105 may be performed by an announcement component as described with reference to FIGS. 12-15.

At 2110, the AP may receive a set of uplink NDPs from the plurality of STAs based on the uplink NDP announcement frame. The operations of 2110 may be performed according to the methods described herein. In some examples, aspects of the operations of 2110 may be performed by an implicit sounding component as described with reference to FIGS. 12-15.

At 2115, the AP may perform uplink channel measurements on the set of uplink NDPs. The operations of 2115 may be performed according to the methods described herein. In some examples, aspects of the operations of 2115 may be performed by a measurement component as described with reference to FIGS. 12-15.

At 2120, the AP may receive downlink channel measurements from the plurality of STAs. The operations of 2120 may be performed according to the methods described herein. In some examples, aspects of the operations of 2120 may be performed by a feedback component as described with reference to FIGS. 12-15.

At 2125, the AP may perform an implicit sounding procedure or an implicit sounding calibration procedure based on the received set of uplink NDPs. The operations of 2125 may be performed according to the methods described herein. In some examples, aspects of the operations of 2125 may be performed by an implicit sounding component as described with reference to FIGS. 12-15.

At 2130, the AP may calibrate an effective downlink channel response to an effective uplink channel response based on the uplink channel measurements and the downlink channel measurements. The operations of 2130 may be performed according to the methods described herein. In some examples, aspects of the operations of 2130 may be performed by a calibration component as described with reference to FIGS. 12-15.

Figure 22:
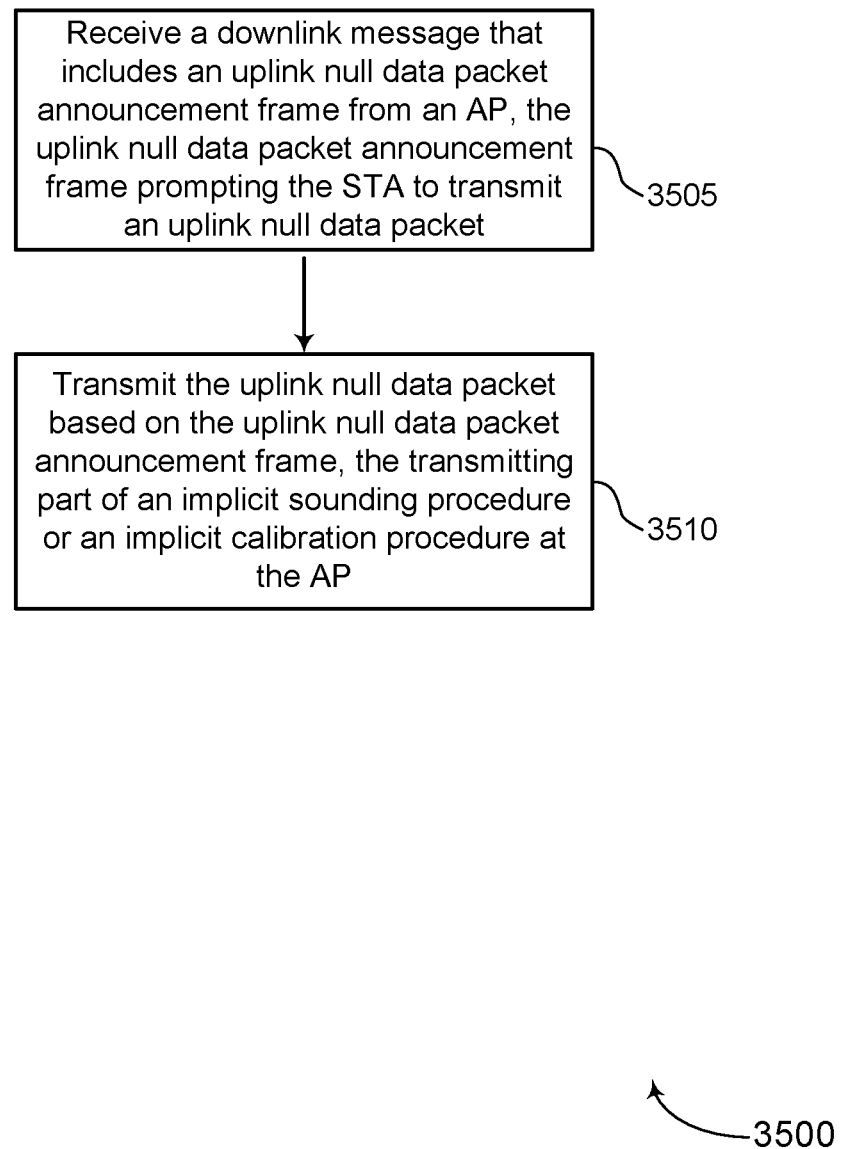

FIG. 22 shows a flowchart illustrating a method 2200 that supports NDP-based implicit sounding and calibration for a WLAN in accordance with aspects of the present disclosure. The operations of method 2200 may be implemented by a STA or its components as described herein. For example, the operations of method 2200 may be performed by a communications manager as described with reference to FIGS. 16-19. In some examples, a STA may execute a set of instructions to control the functional elements of the STA to perform the functions described below. Additionally, or alternatively, a STA may perform aspects of the functions described below using special-purpose hardware.

At 2205, the STA may receive a downlink message that includes an uplink NDP announcement frame from an AP, the uplink NDP announcement frame prompting the STA to transmit an uplink NDP. The operations of 2205 may be performed according to the methods described herein. In some examples, aspects of the operations of 2205 may be performed by an announcement component as described with reference to FIGS. 16-19.

At 2210, the STA may transmit the uplink NDP based on the uplink NDP announcement frame, the transmitting part of an implicit sounding procedure or an implicit calibration procedure at the AP. The operations of 2210 may be performed according to the methods described herein. In some examples, aspects of the operations of 2210 may be performed by an implicit sounding component as described with reference to FIGS. 16-19.

Figure 23:
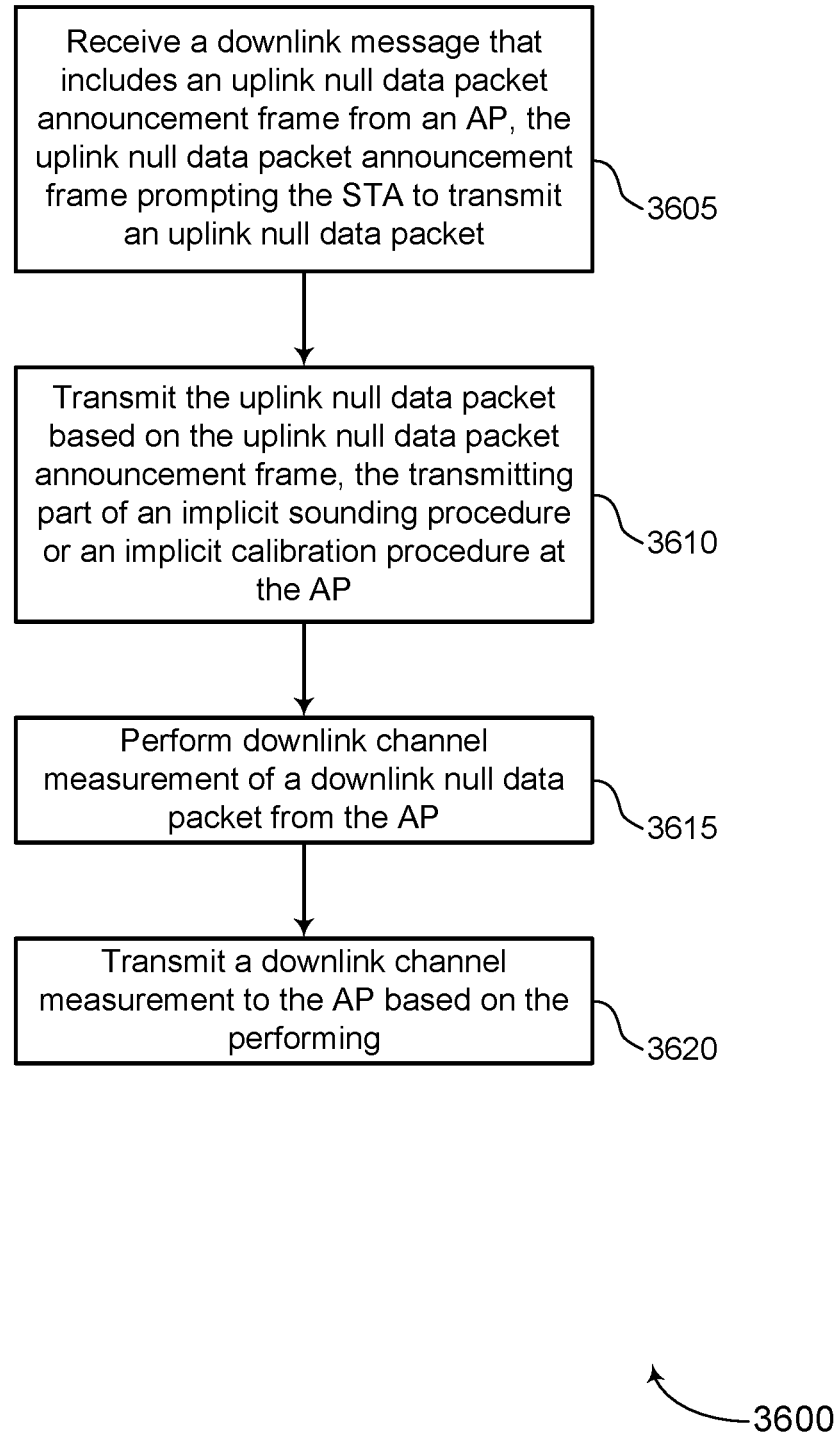

FIG. 23 shows a flowchart illustrating a method 2300 that supports NDP-based implicit sounding and calibration for a WLAN in accordance with aspects of the present disclosure. The operations of method 2300 may be implemented by a STA or its components as described herein. For example, the operations of method 2300 may be performed by a communications manager as described with reference to FIGS. 16-19. In some examples, a STA may execute a set of instructions to control the functional elements of the STA to perform the functions described below. Additionally, or alternatively, a STA may perform aspects of the functions described below using special-purpose hardware.

At 2305, the STA may receive a downlink message that includes an uplink NDP announcement frame from an AP, the uplink NDP announcement frame prompting the STA to transmit an uplink NDP. The operations of 2305 may be performed according to the methods described herein. In some examples, aspects of the operations of 2305 may be performed by an announcement component as described with reference to FIGS. 16-19.

At 2310, the STA may transmit the uplink NDP based on the uplink NDP announcement frame, the transmitting part of an implicit sounding procedure or an implicit calibration procedure at the AP. The operations of 2310 may be performed according to the methods described herein. In some examples, aspects of the operations of 2310 may be performed by an implicit sounding component as described with reference to FIGS. 16-19.

At 2315, the STA may perform downlink channel measurement of a downlink NDP from the AP. The operations of 2315 may be performed according to the methods described herein. In some examples, aspects of the operations of 2315 may be performed by a measurement component as described with reference to FIGS. 16-19.

At 2320, the STA may transmit a downlink channel measurement to the AP based on the performing. The operations of 2320 may be performed according to the methods described herein. In some examples, aspects of the operations of 2320 may be performed by a feedback component as described with reference to FIGS. 16-19.

It should be noted that the methods described above describe possible implementations, and that the operations and the steps may be rearranged or otherwise modified and that other implementations are possible. Furthermore, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single or multi-chip processor, a DSP, an ASIC, an FPGA or other PLD, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor or computer-executable instructions encoded on one or more tangible processor or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes W-CDMA and other variants of CDMA. A TDMA system may implement a radio technology such as GSM. An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communication system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The detailed description includes specific details for the purpose of providing an understanding of the described techniques.

These techniques, however, may be practiced without these specific details. In some instances, structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication at a station (STA), comprising:
    receiving, as part of an implicit sounding calibration procedure between an access point (AP) and the STA, a downlink message comprising an uplink null data packet announcement frame from the AP, the uplink null data packet announcement frame comprising scheduling information for transmission of an uplink null data packet by the STA;
    transmitting the uplink null data packet based at least in part on the uplink null data packet announcement frame as part of the implicit sounding calibration procedure between the AP and the STA; and
    receiving, after the implicit sounding calibration procedure between the AP and the STA, a downlink transmission from the AP as part of an implicit sounding procedure between the AP and the STA, the downlink transmission based at least in part on a downlink precoding matrix associated with the implicit sounding calibration procedure and comprising a single user beamformed transmission or a multi-user multiple-input multiple-output (MU-MIMO) transmission.

2. The method of claim 1, wherein the implicit sounding calibration procedure comprises:
    performing a downlink channel measurement of a downlink null data packet from the AP; and
    transmitting the downlink channel measurement to the AP based at least in part on the performing.

3. The method of claim 2, wherein the implicit sounding calibration procedure further comprises:
receiving a downlink null data packet announcement frame from the AP, the downlink null data packet announcement frame prompting the performing;
receiving the downlink null data packet following receiving the downlink null data packet announcement frame; and
wherein the downlink channel measurement is based at least in part on the received downlink null data packet.

4. The method of claim 3, further comprising:
receiving a trigger frame requesting the downlink channel measurement; and
wherein the transmitting is based at least in part on the trigger frame.

5. The method of claim 4, wherein the trigger frame comprises the uplink null data packet announcement frame and the downlink null data packet announcement frame.

6. The method of claim 3, wherein the uplink null data packet announcement frame and the downlink null data packet announcement frame are received as a single null data packet announcement frame.

7. The method of claim 3, wherein:
receiving the uplink null data packet announcement frame and transmitting the uplink null data packet occurs prior to receiving the downlink null data packet announcement frame.

8. The method of claim 3, wherein:
receiving the uplink null data packet announcement frame and transmitting the uplink null data packet occurs after transmitting the downlink channel measurement.

9. The method of claim 3, wherein the uplink null data packet announcement frame or the downlink null data packet announcement frame include an indication of a single user implicit sounding procedure or a multi user implicit sounding procedure.

10. The method of claim 3, wherein the uplink null data packet announcement frame or the downlink null data packet announcement frame is configured to include a common info field, and the common info field is included as part of an extended STA info field of the uplink null data packet announcement frame or an extended STA info field of the downlink null data packet announcement frame.

11. The method of claim 3, wherein the uplink null data packet announcement frame or the downlink null data packet announcement frame include an indication for the STA to use a single radio chain for transmit and receive operations during the implicit sounding calibration procedure.

12. The method of claim 1, wherein:
the uplink null data packet announcement frame comprises an indication for the STA to use a fixed number of radio chains for transmit and receive operations during the implicit sounding procedure or during the implicit sounding calibration procedure; and
transmitting the uplink null data packet comprises transmitting to the AP a number of spatial streams and long training fields (LTFs) based at least in part on the fixed number of radio chains.

13. The method of claim 12, further comprising:
transmitting to the AP a radio parameter comprising one or more of: a maximum number of supported spatial streams, a number of radio chains common to the transmission and reception, or a bitmap indicating a number of transmit antennas or a number of receive antennas; wherein the fixed number of radio chains is based at least in part on the radio parameter.

14. The method of claim 1, wherein the implicit sounding procedure or the implicit sounding calibration procedure further comprises:
receiving power control information from the AP based at least in part on a power imbalance at the STA, the power control information configured to increase a transmit power of one or more radio chains.

15. The method of claim 14, wherein the power control information is configured to match a total transmit power of the STA to a total transmit power of the AP.

16. The method of claim 1, wherein performing the implicit sounding procedure or the implicit sounding calibration procedure further comprises:
transmitting error vector magnitude (EVM) control information to one or more STAs of a plurality of STAs, the EVM control information comprising one or more of: a modulation and coding scheme (MCS) in conformance with an EVM requirement, an EVM parameter, a power backoff parameter, or a target received signal strength indicator (RSSI).

17. The method of claim 1, wherein the implicit sounding procedure or the implicit sounding calibration procedure further comprises:
receiving from the AP power mismatch control information based at least in part on a power imbalance at the STA, the power mismatch control information indicating a number of additional long training field (LTF) symbols to be included in a header of the uplink null data packet.

18. The method of claim 17, wherein the power mismatch control information comprises one or more of: an LTF symbol repetition factor, a total number of spatial streams to transmit the uplink null data packet, or a number of LTF symbols in excess of a number of spatial streams to include in the header of the uplink null data packet.

19. An apparatus for wireless communication at a station (STA), comprising:
a processor, memory coupled with the processor; and
instructions stored in the memory and executable by the processor to cause the apparatus to:
receive, as part of an implicit sounding calibration procedure between an access point (AP) and the STA, a downlink message comprising an uplink null data packet announcement frame from the AP, the uplink null data packet announcement frame comprising scheduling information for transmission of an uplink null data packet by the STA;
transmit the uplink null data packet based at least in part on the uplink null data packet announcement frame as part of the implicit sounding calibration procedure between the AP and the STA; and
receive, after the implicit sounding calibration procedure between the AP and the STA, a downlink transmission from the AP as part of an implicit sounding procedure between the AP and the STA, the downlink transmission based at least in part on a downlink precoding matrix associated with the implicit sounding calibration procedure and comprising a single user beamformed transmission or a multi-user multiple-input multiple-output (MU-MIMO) transmission.

* * * * *